(12) United States Patent
Amerige et al.

(10) Patent No.: US 9,430,142 B2
(45) Date of Patent: Aug. 30, 2016

(54) TOUCH-BASED GESTURE RECOGNITION AND APPLICATION NAVIGATION

(71) Applicant: Facebook, Inc., Menlo Park, CA (US)

(72) Inventors: Brian Daniel Amerige, Palo Alto, CA (US); Benjamin Grady Cunningham, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 209 days.

(21) Appl. No.: 14/334,588

(22) Filed: Jul. 17, 2014

(65) Prior Publication Data
US 2016/0018981 A1 Jan. 21, 2016

(51) Int. Cl.
*G06F 3/033* (2013.01)
*G06F 3/0488* (2013.01)

(52) U.S. Cl.
CPC ................. *G06F 3/04883* (2013.01)

(58) Field of Classification Search
CPC .................................. G06F 3/04883
USPC ....................................... 715/863
See application file for complete search history.

(56) References Cited

U.S. PATENT DOCUMENTS

| | | | |
|---|---|---|---|
| 8,368,723 B1 * | 2/2013 | Gossweiler, III .. | G06K 9/00261 345/428 |
| 8,416,217 B1 * | 4/2013 | Eriksson ............... | G06F 1/1616 178/18.09 |
| 8,527,909 B1 * | 9/2013 | Mullany ............... | G06F 3/0484 345/173 |
| 8,826,178 B1 * | 9/2014 | Zhang ................... | G06F 1/1694 345/173 |
| 8,847,992 B2 * | 9/2014 | Kornmann ............ | G06F 1/1626 345/158 |
| 9,229,632 B2 * | 1/2016 | Walkin ................. | G06F 3/04883 |
| 9,235,321 B2 | 1/2016 | Matas | |
| 9,245,312 B2 | 1/2016 | Matas | |
| 9,310,992 B2 * | 4/2016 | Kornmann .......... | G06F 3/04883 |
| 2006/0271867 A1 | 11/2006 | Wang et al. | |
| 2010/0045666 A1 * | 2/2010 | Kornmann ............ | G06F 1/1626 345/419 |
| 2010/0309147 A1 * | 12/2010 | Fleizach ............. | G06F 3/04883 345/173 |
| 2012/0327009 A1 * | 12/2012 | Fleizach ............. | G06F 3/04883 345/173 |
| 2013/0016103 A1 * | 1/2013 | Gossweiler, III .. | G06K 9/00261 345/428 |

(Continued)

OTHER PUBLICATIONS

Event Handling Guide for iOS, Developer, Copyright © 2013 Apple Inc., 74 pgs.

(Continued)

*Primary Examiner* — William Titcomb
(74) *Attorney, Agent, or Firm* — Morgan, Lewis & Bockius LLP

(57) ABSTRACT

An electronic device includes a display, a touch-sensitive surface, one or more processors, and memory storing one or more programs. The device displays a first user interface of a hierarchy of user interfaces of a software application associated with first and second pan gesture recognizers. The first pan gesture recognizer is configured to recognize a pan gesture that has an initial direction along a first axis and/or a first direction. The second pan gesture recognizer is configured to recognize a pan gesture that has an initial direction along a second axis and/or a second direction distinct from the first direction. The device detects a first pan gesture in an initial direction across the touch-sensitive surface while displaying the first user interface. The device identifies a pan gesture recognizer configured to recognize the first pan gesture, and processes the first pan gesture using the identified pan gesture recognizer.

20 Claims, 44 Drawing Sheets

(56) References Cited

U.S. PATENT DOCUMENTS

| | | | |
|---|---|---|---|
| 2013/0016129 A1* | 1/2013 | Gossweiler, III | G06F 3/012 345/667 |
| 2013/0067390 A1* | 3/2013 | Kwiatkowski | G06F 9/4443 715/784 |
| 2013/0067398 A1* | 3/2013 | Pittappilly | G06F 3/0482 715/800 |
| 2013/0067399 A1* | 3/2013 | Elliott | G06F 3/0482 715/800 |
| 2013/0067420 A1* | 3/2013 | Pittappilly | G06F 3/0236 715/863 |
| 2013/0198661 A1 | 8/2013 | Matas | |
| 2014/0002494 A1* | 1/2014 | Cunningham | G09G 5/00 345/633 |
| 2014/0237415 A1 | 8/2014 | Amerige | |

OTHER PUBLICATIONS

UIPanGestureRecognizer—Only vertical or Horizontal, Aug. 17, 2011, http://stackoverflow.com/questions/7100884/uipangesturerecognizer-only-vertical-or-horizontal, 7 pgs.

UISwipeGestureRecognizer—Configuring the gesture, Mar. 23, 2010, https://developer.apple.com/library/ios/documentation/uikit/reference/UISwipeGestureRecognizer_Class/Reference/Reference.html, 2 pgs.

UIPanGestureRecognizer—Configuring the Gesture Recognizer, Mar. 23, 2010, https://developer.apple.com/library/ios/documentation/uikit/reference/UIPanGestureRecognizer_Class/Reference/Reference.html, 2 pgs.

How can I capture which direction is being panned using UIPanGestureRecognizer?, Dec. 18, 2013, http://stackoverflow.com/questions/5187502/how-can-i-capture-which-direction-is-being-panned-using-uipangesturerecognizer, 2 pgs.

UIGestureRecognizer—Tutorial-in-iOS 5: Pinches, Pans, and More!, Nov. 30, 2011, http://www.raywenderlich.com/6567/uigesturerecognizer-tutorial-in-ios-5-pinches-pans-and-more, 14 pgs.

Event-Handling Guide for iOS: GestureRecognizers, Jan. 28, 2013, https://developer.apple.com/library/ios/documentation/EventHandling/Conceptual/EventhandlingiPhoneOS/GestureRecognizer_basics/GestureRecognizer_basics.html, 16 pgs.

UISwipeGestureRecognizer Class Reference, May 1, 2014, https://developer.apple.com/library/ios/documentation/UIKit/Reference/UISwipeGestureRecognizer_Class/Reference/Reference.html#//apple_ref/occ/cl/UISwipeGestureRecognizer, 3 pgs.

SimpleGestureRecognizers/APLGestureRecognizerViewController.m, Apr. 29, 2014, https://developer.apple.com/library/ios/samplecode/SimpleGestureRecognizers/Listings/SimpleGestureRecognizers_AP LGestureRecognizerViewController_m.html, 6 pgs.

* cited by examiner

600 ⟶

602 Display a first user interface of a software application. The software application has a hierarchy of user interfaces. The first user interface is associated with at least a first pan gesture recognizer and a second pan gesture recognizer. The first pan gesture recognizer is configured to recognize a pan gesture that has an initial direction along a first axis on the touch-sensitive surface in a plurality of predefined axes and/or a first direction on the touch-sensitive surface in a plurality of predefined directions. The second pan gesture recognizer is configured to recognize a pan gesture that has an initial direction along a second axis on the touch-sensitive surface in the plurality of predefined axes and/or a second direction on the touch-sensitive surface distinct from the first direction, in the plurality of predefined directions.

> 604 The first pan gesture recognizer is configured to recognize a pan gesture that has an initial direction along the first axis and the second pan gesture recognizer is configured to recognize a pan gesture that has an initial direction along the second axis, distinct from the first axis > 606 The first pan gesture recognizer is configured to recognize a pan gesture that has an initial direction along the first direction and the second pan gesture recognizer is configured to recognize a pan gesture that has an initial direction along the second direction, distinct from the first direction > 608 The first user interface includes a plurality of views. The first pan gesture recognizer and the second pan gesture recognizer are attached to a same view of the plurality of views.

> 610 The first user interface includes a plurality of views. The first pan gesture recognizer is attached to a first view of the plurality of views and the second pan gesture recognizer is attached to a second view of the plurality of views, distinct from the first view.

612 Detect a first pan gesture on the touch-sensitive surface while displaying the first user interface. The first pan gesture has an initial direction across the touch-sensitive surface.

FIGURE 6A

622 The software application is configured to access a hierarchy of content items. The hierarchy of content items includes at least a first parent content item and a plurality of child content items of the first parent content item. The first user interface includes a concurrent display of a first image that represents the first parent content item and a first set of thumbnail images that correspond to two or more child content items of the plurality of child content items of the first parent content item. The first pan gesture is detected initially at a location, on the touch-sensitive surface, that corresponds to a respective thumbnail image of the first set of thumbnail images. Determine an initial direction of the first pan gesture. In accordance with a determination that the initial direction of the first pan gesture is horizontal, replace, using the first pan gesture recognizer, a display of the first set of thumbnail images with a display of a second set of thumbnail images that correspond to two or more child content items of the plurality of child content items. The thumbnail images in the first set are distinct from the thumbnail images in the second set. In accordance with a determination that the initial direction of the first pan gesture is vertical, replace, using the second pan gesture recognizer, the first user interface with a second user interface that includes at least a portion of a child content item that corresponds to the respective thumbnail image.

624 The hierarchy of content items includes a second parent content item, distinct from the first parent content item, and a plurality of child content items of the second parent content item. Detect a second pan gesture initially at a location, on the touch-sensitive surface, that corresponds to the first image that represents the first parent content item. Determine an initial direction of the second pan gesture. In accordance with a determination that the initial direction of the second pan gesture is horizontal, replace the first user interface with a third user interface that includes a concurrent display of a second image that represents the second parent content item and a set of thumbnail images that correspond to two or more child content items of the plurality of child content items of the second parent content item.

626 The first image that represents the first parent content item is selected from images in the plurality of child content items of the first parent content item 628 The hierarchy of content items includes a second parent content item, distinct from the first parent content item, and a plurality of child content items of the second parent content item. Detect a second pan gesture initially at a location, on the touch-sensitive surface, that corresponds to the first image that represents the first parent content item. Determine an initial direction of the second pan gesture. In accordance with a determination that the initial direction of the second pan gesture is horizontal, replace the first user interface with a third user interface that includes a concurrent display of a second image that represents the second parent content item and a set of thumbnail images that correspond to two or more child content items of the plurality of child content items of the second parent content item. In accordance with a determination that the initial direction of the second pan gesture is vertical, display a user interface for the software application that includes a search input area.

FIGURE 6C

630 The software application is configured to access a hierarchy of content items. The hierarchy of content items includes at least a parent content item and a plurality of child content items of the parent content item. The first user interface includes a display of at least a portion of a first child content item of the plurality of child content items without displaying the parent content item or any child content item, other than the first child content item, of the plurality of child content items. Determine the initial direction of the first pan gesture. In accordance with a determination that the initial direction of the first pan gesture is horizontal, replace, using the first pan gesture recognizer, the first user interface with a second user interface that includes a display of at least a portion of a second child content item without displaying the parent content item or any child content item, other than the second child content item, of the plurality of child content items. In accordance with a determination that the initial direction of the first pan gesture is vertical, replace, using the second pan gesture recognizer, the first user interface with a third user interface that includes a concurrent display of an image that represents the parent content item and a set of thumbnail images that correspond to two or more child content items of the plurality of child content items of the parent content item.

632 The set of thumbnail images includes a first thumbnail image that corresponds to the first child content item. Subsequent to the determination that the initial direction of the first pan gesture is vertical, detect a movement, of the first pan gesture across the touch-sensitive surface, that is in a non-vertical direction. In response to detecting the movement, of the first pan gesture across the touch-sensitive surface, that is in a non-vertical direction, move the first thumbnail image, using the second pan gesture recognizer, in a horizontal direction in accordance with a horizontal movement of the first pan gesture across the touch-sensitive surface.

634 While displaying the second user interface, detect a touch input on the second child content item. In response to detecting the touch input on the second child content item, replace the second user interface with a fourth user interface that provides additional information in the second child content item. While displaying the fourth user interface, detect a touch input on the second child content item. In response to detecting the touch input on the second child content item, replace the fourth user interface with the second user interface.

FIGURE 6D

636 The software application is configured to access a hierarchy of content items. The hierarchy of content items includes at least a parent content item and a plurality of child content items of the parent content item. The first user interface includes a display of at least a portion of a first child content item of the plurality of child content items without displaying the parent content item or any child content item, other than the first child content item, of the plurality of child content items. Determine the initial direction of the first pan gesture. In accordance with a determination that the initial direction of the first pan gesture is horizontal, replace, using the first pan gesture recognizer, the first user interface with a second user interface that includes a display of a second child content item without displaying the parent content item or any child content item, other than the second child content item, of the plurality of child content items. In accordance with a determination that the initial direction of the first pan gesture is vertical, replace, using the second pan gesture recognizer, the first user interface with a third user interface that includes at least a portion of the parent content item.

638 While the first pan gesture is detected on the touch-sensitive surface, after determining that the initial direction of the first pan gesture is vertical: display at least a portion of the parent content item overlaid by the first child content item; and move the first child content item in accordance with the first pan gesture. Determine that the first pan gesture has ceased to be detected on the touch-sensitive surface. In response to determining that the first pan gesture has ceased to be detected on the touch-sensitive surface, replace the first user interface with the third user interface.

640 The software application is configured to access a hierarchy of content items. The hierarchy of content items includes at least first and second content items. The first user interface includes a display of at least a portion of the first content item overlaid by a popover view. Determine the initial direction of the first pan gesture. In accordance with a determination that the initial direction of the first pan gesture is horizontal, replace, using the first pan gesture recognizer, the first user interface with a display of at least a portion of the second content item without displaying the first content item or the popover view. In accordance with a determination that the initial direction of the first pan gesture is vertical, cease to display, using the second pan gesture recognizer, the popover view.

642 The software application is configured to access a hierarchy of content items. The hierarchy of content items includes at least a parent content item and a plurality of child content items of the parent content item, the plurality of child content items being in a sequence. The first user interface includes a display of a first child content item in the sequence of child content items, without displaying the parent content item. The first pan gesture is detected while the first child content item in the sequence of child content items is displayed. Determine the initial direction of the first pan gesture. In accordance with a determination that the initial direction of the first pan gesture is downward, display a representation of the parent content item.

702 Display a first user interface of a software application. The software application is configured to access a hierarchy of content items. The hierarchy of content items includes at least a first parent content item and a plurality of child content items of the first parent content item. The first user interface includes a concurrent display of a first image that represents the first parent content item and a first set of thumbnail images that correspond to two or more child content items of the plurality of child content items of the first parent content item.

704 Detect a first pan gesture initially at a location, on the touch-sensitive surface, that corresponds to a respective thumbnail image of the first set of thumbnail images

706 Determine an initial direction of the first pan gesture

708 In accordance with a determination that the initial direction of the first pan gesture is horizontal, replace a display of the first set of thumbnail images with a display of a second set of thumbnail images that correspond to two or more child content items of the plurality of child content items. The thumbnail images in the first set are distinct from the thumbnail images in the second set.

710 In accordance with a determination that the initial direction of the first pan gesture is vertical, replace the first user interface with a second user interface that includes at least a portion of a child content item that corresponds to the respective thumbnail image See Figures 7B-7D

FIGURE 7A

712 The hierarchy of content items includes a second parent content item, distinct from the first parent content item, and a plurality of child content items of the second parent content item. Detect a second pan gesture initially at a location, on the touch-sensitive surface, that corresponds to the first image that represents the first parent content item. Determine an initial direction of the second pan gesture. In accordance with a determination that the initial direction of the second pan gesture is horizontal, replace the first user interface with a third user interface that includes a concurrent display of a second image that represents the second parent content item and a set of thumbnail images that correspond to two or more child content items of the plurality of child content items of the second parent content item.

714 The first image that represents the first parent content item is selected from images in the plurality of child content items of the first parent content item 716 The hierarchy of content items includes a second parent content item, distinct from the first parent content item, and a plurality of child content items of the second parent content item. Detect a second pan gesture initially at a location, on the touch-sensitive surface, that corresponds to the first image that represents the first parent content item. Determine an initial direction of the second pan gesture. In accordance with a determination that the initial direction of the second pan gesture is horizontal, replace the first user interface with a third user interface that includes a concurrent display of a second image that represents the second parent content item and a set of thumbnail images that correspond to two or more child content items of the plurality of child content items of the second parent content item. In accordance with a determination that the initial direction of the second pan gesture is vertical, display a user interface for the software application that includes a search input area.

FIGURE 7B

718 The second user interface includes a display of at least a portion of a first child content item of the plurality of child content items without displaying the first parent content item or any child content item, other than the first child content item, of the plurality of child content items. Detect a second pan gesture. Determine an initial direction of the second pan gesture. In accordance with a determination that the initial direction of the second pan gesture is horizontal, replace the second user interface with a third user interface that includes a display of at least a portion of a second child content item without displaying the parent content item or any child content item, other than the second child content item, of the plurality of child content items. In accordance with a determination that the initial direction of the second pan gesture is vertical, replace the second user interface with a fourth user interface that includes a concurrent display of an image that represents the first parent content item and a set of thumbnail images that correspond to two or more child content items of the plurality of child content items of the first parent content item.

720 The set of thumbnail images in the fourth user interface includes the respective thumbnail image. Subsequent to the determination that the initial direction of the second pan gesture is vertical, detect a movement, of the second pan gesture across the touch-sensitive surface, that is in a non-vertical direction. In response to detecting the movement, of the second pan gesture across the touch-sensitive surface, that is in a non-vertical direction, move the respective thumbnail image in a horizontal direction in accordance with a horizontal movement of the second pan gesture across the touch-sensitive surface.

722 While displaying the third user interface, detect a touch input on the second child content item. In response to detecting the touch input on the second child content item, replace the third user interface with a fifth user interface that provides additional information in the second content item. While displaying the fifth user interface, detect a touch input on an icon. In response to detecting the touch input on the icon, replace the fourth user interface with the third user interface.

FIGURE 7C

724 Display a third user interface that includes at least a portion of a first grandchild content of the first parent content item without displaying the first parent content item, any child content item of the first parent content item, or any grandchild content item, other than the first grandchild content item, of a plurality of grandchild content items of the first parent content item. Detect a second pan gesture. Determine an initial direction of the second pan gesture. In accordance with a determination that the initial direction of the second pan gesture is horizontal, replace the third user interface with a fourth user interface that includes a display of a second grandchild content item of the first parent content item without displaying the first parent content item, any child content item of the first parent content item, or any grandchild content item, other than the second grandchild content item, of the plurality of grandchild content items of the first parent content item. The first grandchild content item and the second grandchild content item are child content items of a same child content item of the first parent content item. In accordance with a determination that the initial direction of the second pan gesture is vertical, replace the third user interface with a fifth user interface that includes at least a portion of the child content item.

726 While the second pan gesture is detected on the touch-sensitive surface, after determining that the initial direction of the second pan gesture is vertical, display at least a portion of the child content item overlaid by the first grandchild content item. Move the first grandchild content item in accordance with the second pan gesture. Determine that the second pan gesture has ceased to be detected on the touch-sensitive surface. In response to determining that the second pan gesture has ceased to be detected on the touch-sensitive surface, replace the third user interface with the fifth user interface.

728 The hierarchy of content items includes at least a first content item and a second content item. Display a third user interface that includes a display of at least a portion of the first content item overlaid by a popover view. Detecting a second pan gesture. Determine an initial direction of the second pan gesture. In accordance with a determination that the initial direction of the second pan gesture is horizontal, replace the third user interface with a display of at least a portion of a second content item without displaying the first content item or the popover view. In accordance with a determination that the initial direction of the second pan gesture is vertical, cease to display the popover view.

FIGURE 7D

TOUCH-BASED GESTURE RECOGNITION AND APPLICATION NAVIGATION

RELATED APPLICATION

This application is related to U.S. application Ser. No. 14/334,604, filed Jul. 17 2014, entitled "Touch-Based Gesture Recognition and Application Navigation," which is incorporated by reference herein in its entirety.

TECHNICAL FIELD

This relates generally to touch-based gesture recognition and application navigation, including but not limited to recognizing pan gestures and navigating in a software application that has a hierarchy of user interfaces.

BACKGROUND

Touch-sensitive devices, such as tablets and smart phones with touch screens, have become popular in recent years. Many touch-sensitive devices are configured to detect touch-based gestures (e.g., tap, pan, swipe, pinch, depinch, and rotate gestures). Touch-sensitive devices often use the detected gestures to manipulate user interfaces and to navigate between user interfaces in software applications on the device.

However, there is an ongoing challenge to properly recognize and respond to touch-based gestures. Incorrect recognition of a touch gesture typically requires a user to undo any actions performed in response to the misinterpreted gesture and to repeat the touch gesture, which can be tedious, time-consuming, and inefficient. In addition, there is an ongoing challenge to make navigation in software applications via touch gestures more efficient and intuitive for users.

SUMMARY

Accordingly, there is a need for more efficient devices and methods for recognizing touch-based gestures. Such devices and methods optionally complement or replace conventional methods for recognizing touch-based gestures.

Moreover, there is a need for more efficient devices and methods for navigating in software applications via touch gestures. Such devices and methods optionally complement or replace conventional methods for navigating in software applications via touch gestures.

In accordance with some embodiments, a method is performed at an electronic device having a display, a touch-sensitive surface, one or more processors, and memory. The memory stores one or more programs for execution by the one or more processors. The method includes displaying a first user interface of a software application. The software application has a hierarchy of user interfaces. The first user interface is associated with at least a first pan gesture recognizer and a second pan gesture recognizer. The first pan gesture recognizer is configured to recognize a pan gesture that has an initial direction along a first axis on the touch-sensitive surface in a plurality of predefined axes and/or a first direction on the touch-sensitive surface in a plurality of predefined directions. The second pan gesture recognizer is configured to recognize a pan gesture that has an initial direction along a second axis on the touch-sensitive surface in the plurality of predefined axes and/or a second direction on the touch-sensitive surface distinct from the first direction, in the plurality of predefined directions. The method also includes detecting a first pan gesture on the touch-sensitive surface while displaying the first user interface. The first pan gesture has an initial direction across the touch-sensitive surface. The method further includes, while detecting the first pan gesture on the touch-sensitive surface, identifying, between the first pan gesture recognizer and the second pan gesture recognizer, a pan gesture recognizer that is configured to recognize the first pan gesture based at least on the initial direction of the first pan gesture; and processing the first pan gesture using the identified pan gesture recognizer.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a display, a touch-sensitive surface, a memory, and one or more processors to execute one or more programs stored in the memory includes one or more of the elements displayed in the method described above, which are updated in response to processes, as described in the method described above. In accordance with some embodiments, a computer readable storage medium has stored therein instructions, which, when executed by an electronic device with a display, a touch-sensitive surface, and one or more processors, cause the device to perform the operations of the method described above. In accordance with some embodiments, an electronic device includes: a display, a touch-sensitive surface, and means for performing the operations of the method described above.

Thus, electronic devices with displays, touch-sensitive surfaces, and one or more processors are provided with more efficient methods for recognizing touch-based gestures, thereby increasing the effectiveness, efficiency, and user satisfaction of and with such devices. Such methods and interfaces may complement or replace conventional methods for recognizing touch-based gestures.

In accordance with some embodiments, a method is performed at an electronic device having a display, a touch-sensitive surface, one or more processors, and memory. The memory stores one or more programs for execution by the one or more processors. The method includes displaying a first user interface of a software application. The software application is configured to access a hierarchy of content items. The hierarchy of content items includes at least a first parent content item and a plurality of child content items of the first parent content item. The first user interface includes a concurrent display of a first image that represents the first parent content item and a first set of thumbnail images that correspond to two or more child content items of the plurality of child content items of the first parent content item. The method also includes detecting a first pan gesture initially at a location, on the touch-sensitive surface, that corresponds to a respective thumbnail image of the first set of thumbnail images; and determining an initial direction of the first pan gesture. The method further includes, in accordance with a determination that the initial direction of the first pan gesture is horizontal, replacing a display of the first set of thumbnail images with a display of a second set of thumbnail images that correspond to two or more child content items of the plurality of child content items, wherein the thumbnail images in the first set are distinct from the thumbnail images in the second set; and, in accordance with a determination that the initial direction of the first pan gesture is vertical, replacing the first user interface with a second user interface that includes at least a portion of a child content item that corresponds to the respective thumbnail image.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a display, a touch-sensitive surface, a memory, and one or more processors to execute one or more programs stored in the memory includes one or more of the elements displayed in the method described above, which are updated in response to processes, as described in the method described above. In accordance with some embodiments, a computer readable storage medium has stored therein instructions, which, when executed by an electronic device with a display, a touch-sensitive surface, and one or more processors, cause the device to perform the operations of the method described above. In accordance with some embodiments, an electronic device includes: a display, a touch-sensitive surface, and means for performing the operations of the method described above.

Thus, electronic devices with displays, touch-sensitive surfaces, and one or more processors are provided with more efficient methods for navigating in a software application that has a hierarchy of user interfaces, thereby increasing the effectiveness, efficiency, and user satisfaction of and with such devices. Such methods and interfaces may complement or replace conventional methods for navigating in a software application that has a hierarchy of user interfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6E are flow diagrams illustrating a method of processing touch-based gestures in accordance with some embodiments.

FIGS. 7A-7D are flow diagrams illustrating a method of navigating in a software application via touch gestures in accordance with some embodiments.

DESCRIPTION OF EMBODIMENTS

The devices and methods described herein improve recognition of pan gestures and use pan gestures to easily and efficiently navigate in a software application (e.g., a social networking application) that has a hierarchy of user interfaces.

A pan gesture may include movements of a finger touch input in both horizontal and vertical directions. Thus, it may be difficult to distinguish two different pan gestures using pan gesture recognizers. For example, two pan gesture recognizers, located in a same view, may conflict with each other in trying to recognize a pan gesture in the same view.

To address this problem, methods are described herein to identify the correct pan gesture recognizer to process a particular pan gesture based on the initial direction of the particular pan gesture. For example, when a user at an electronic device provides a pan gesture that is initially horizontal, the initially-horizontal pan gesture can be distinguished from a pan gesture that is initially vertical. Because the initial direction of the pan gesture is used to determine which gesture recognizer processes the pan gesture, after the initial direction of the pan gesture is identified, subsequent movements in the pan gesture may be provided in any direction (e.g., an initially-horizontal pan gesture may include a subsequent horizontal or diagonal movement). Thus, the combination of a constrained initial direction and subsequent free movement (e.g., movement in any direction on a touch screen) in a pan gesture provides the flexibility associated with pan gestures while allowing the use of multiple pan gesture recognizers, because a matching (e.g., a recognizing) gesture recognizer can be identified based on the initial direction.

Methods are also described herein that use pan gestures to navigate in a software application that has a hierarchy of user interfaces. For example, a user can use various pan gestures to easily move between content items (e.g., stories) in a single content section, between individual stories and multiple stories and a representative image of the content section, and between different content sections. These methods reduce the time spent navigating through a large number of content items to find the desired content, thereby providing a more efficient and intuitive human-machine interface and reducing power consumption by the electronic device.

Figure 1:
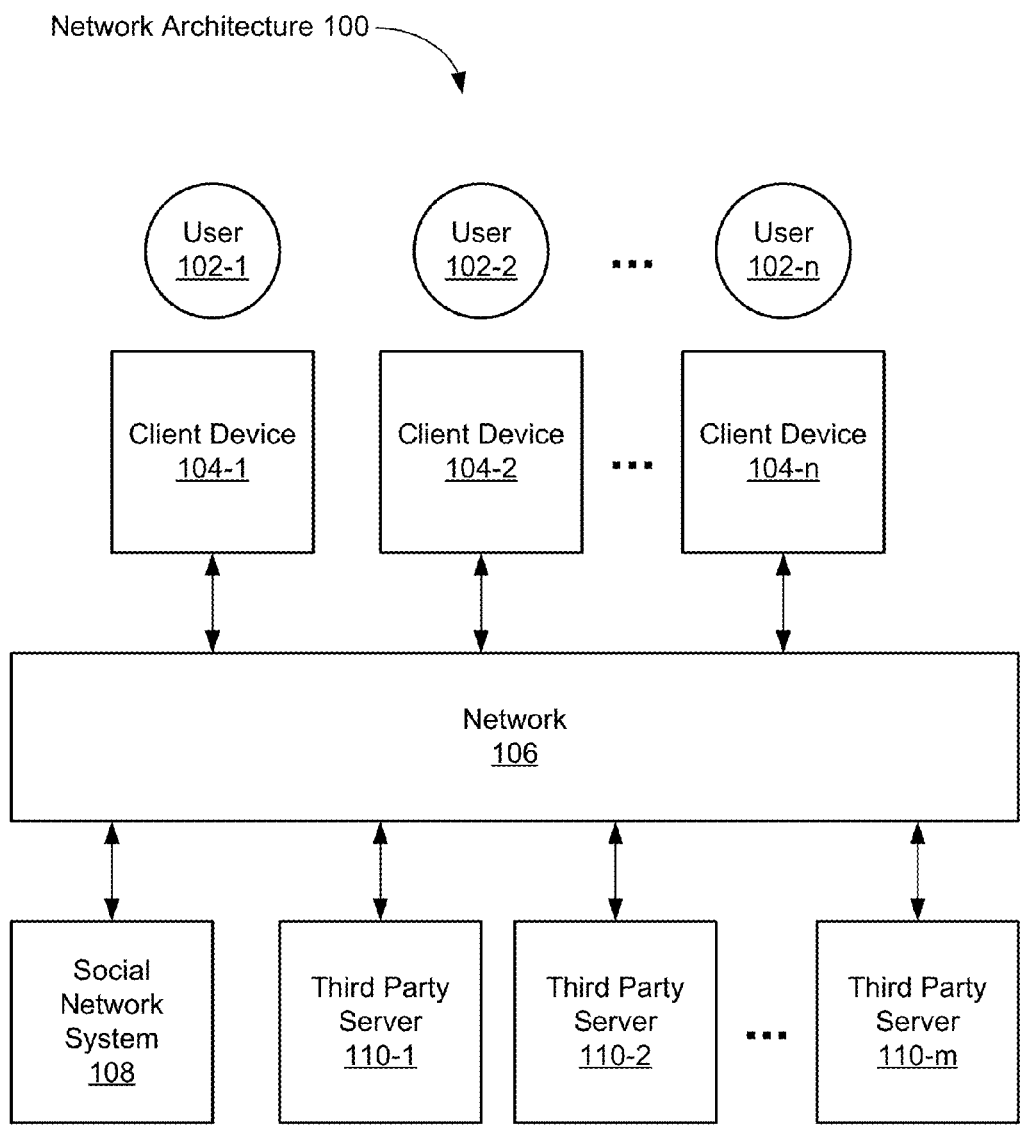
FIG. 1 is a block diagram illustrating an exemplary network architecture of a social network in accordance with some embodiments.
Figure 2:
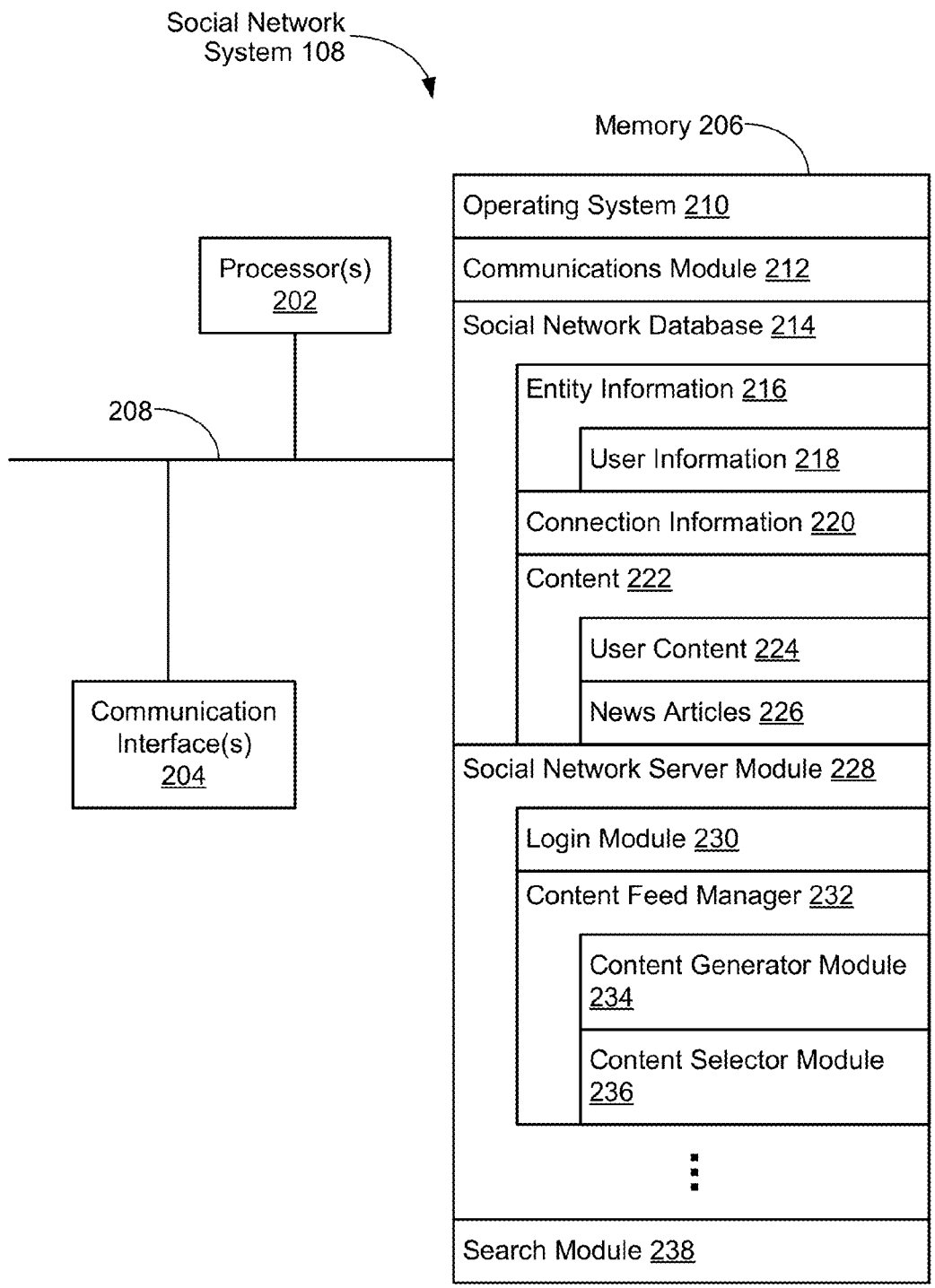
FIG. 2 is a block diagram illustrating an exemplary social network system in accordance with some embodiments.
Figure 3:
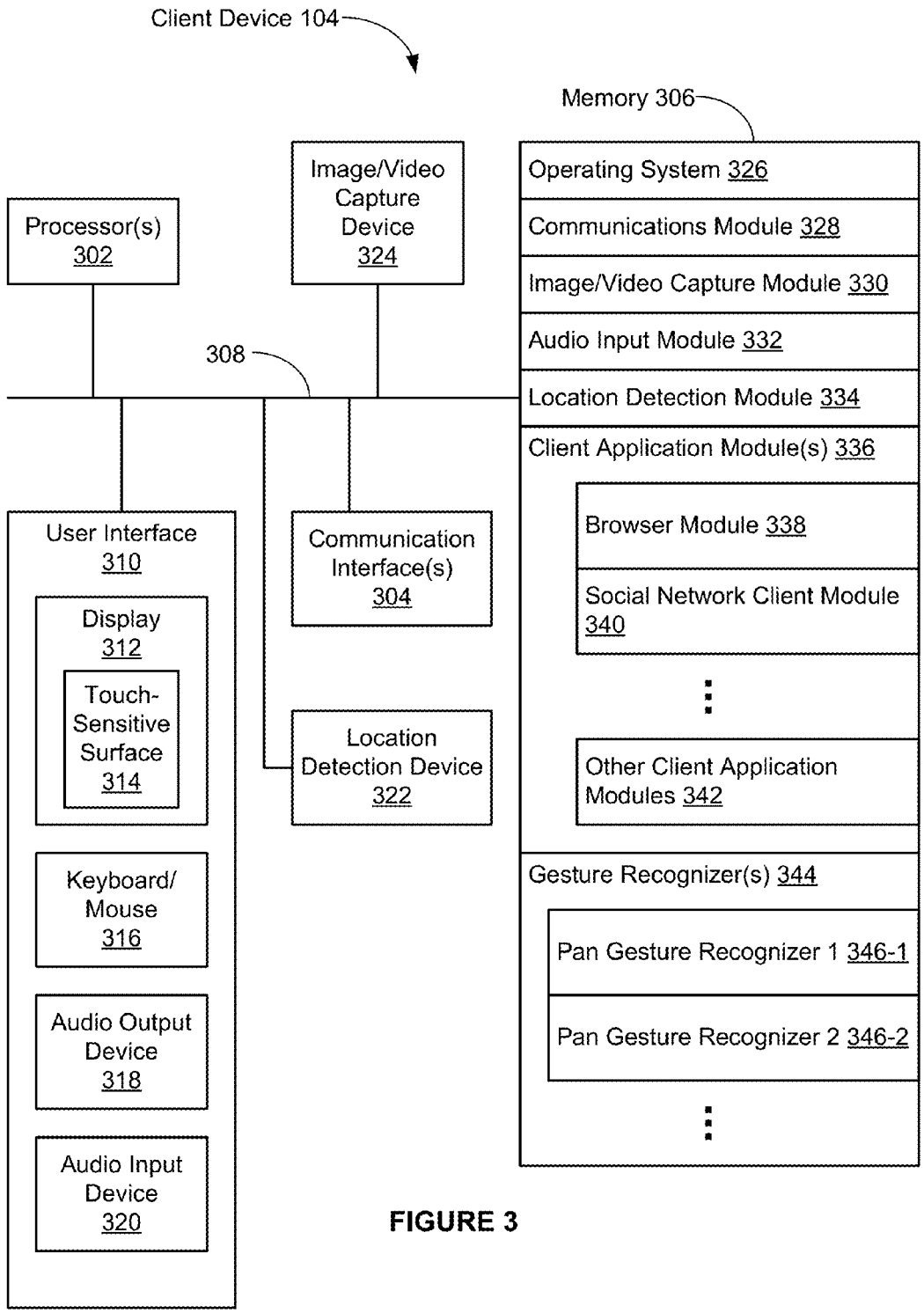
FIG. 3 is a block diagram illustrating an exemplary client device in accordance with some embodiments.
Figure 4A:
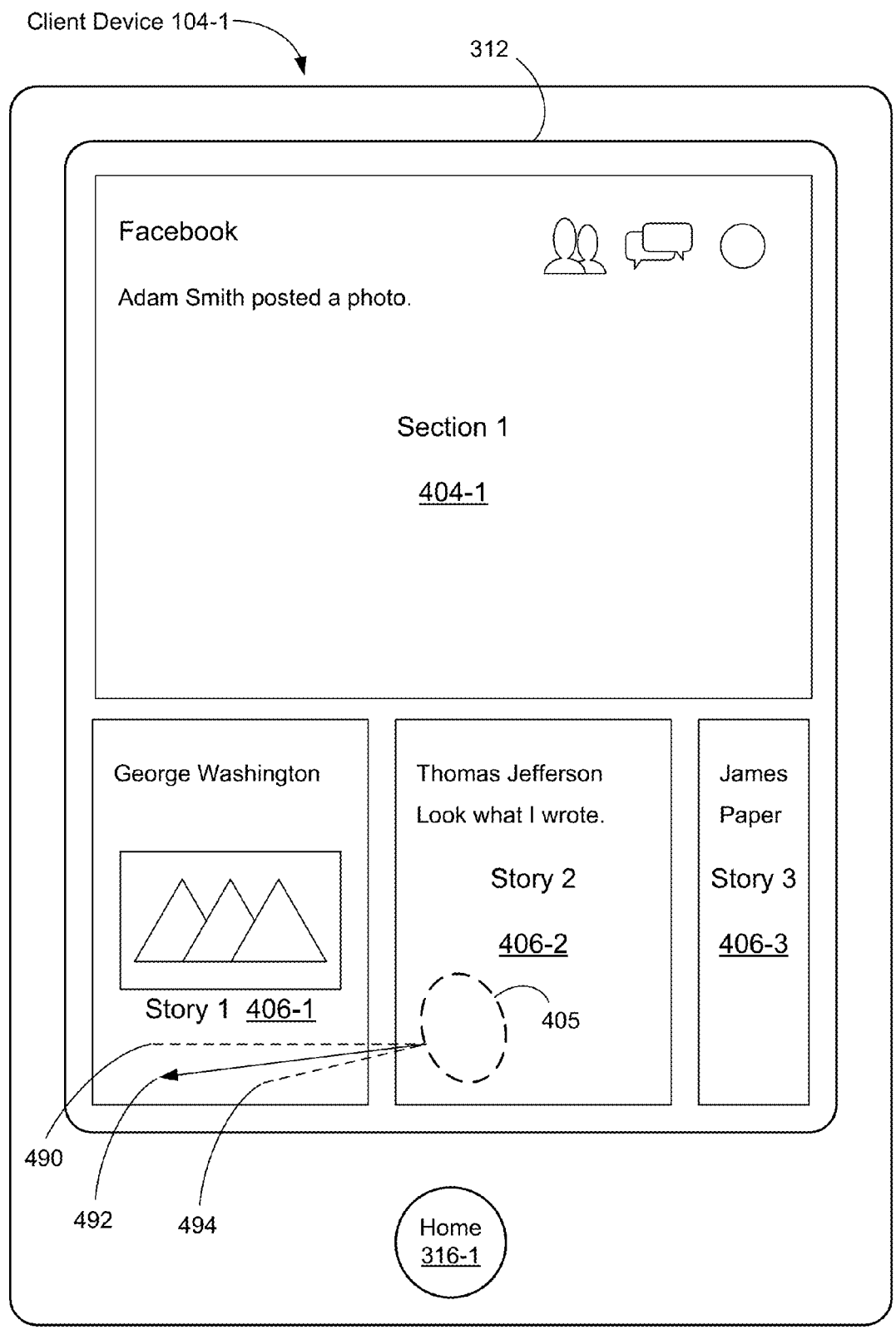
FIGS. 4A-4CC illustrate exemplary user interfaces in a software application with a hierarchy of user interfaces, in accordance with some embodiments.
Figure 4B:
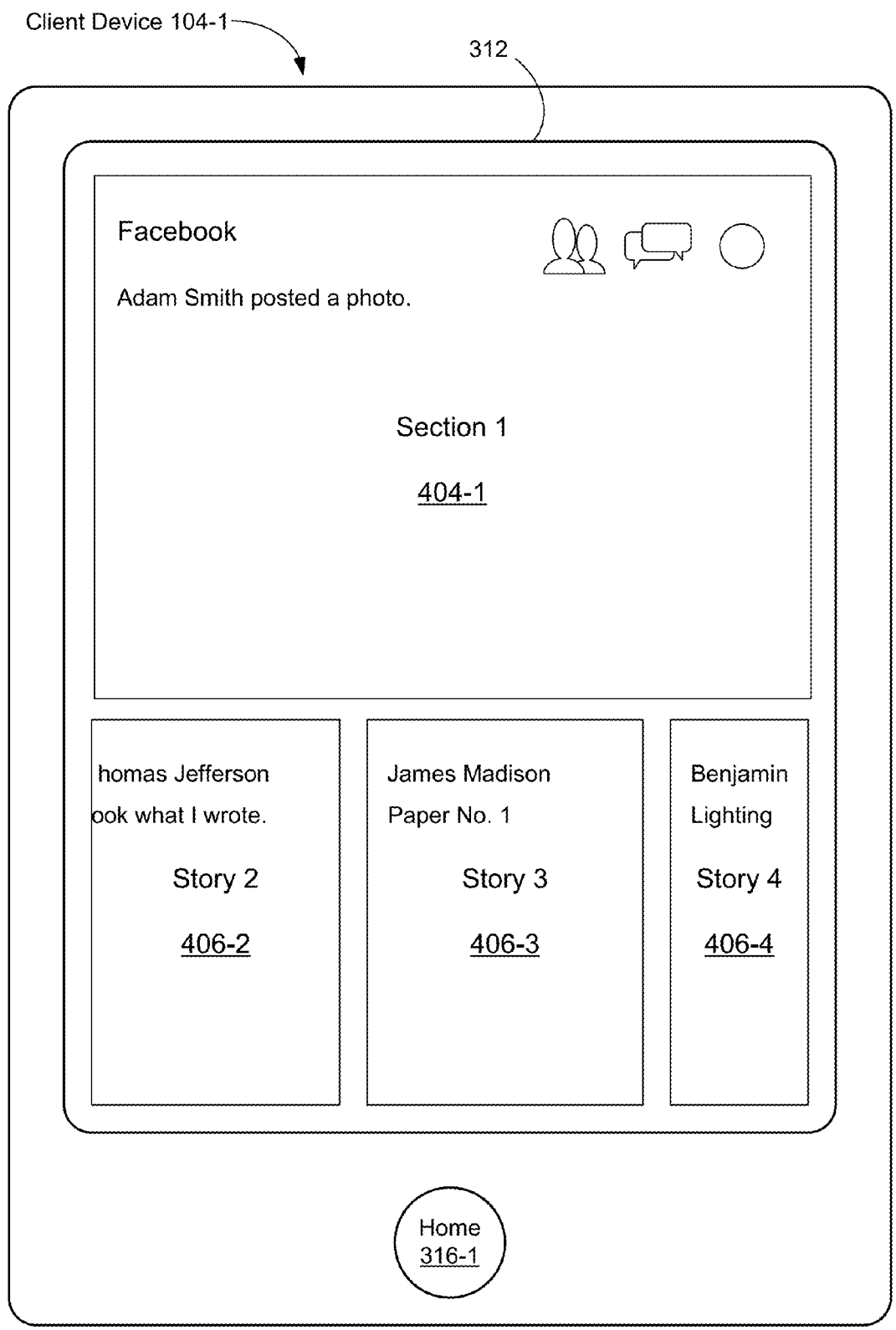
Figure 4C:
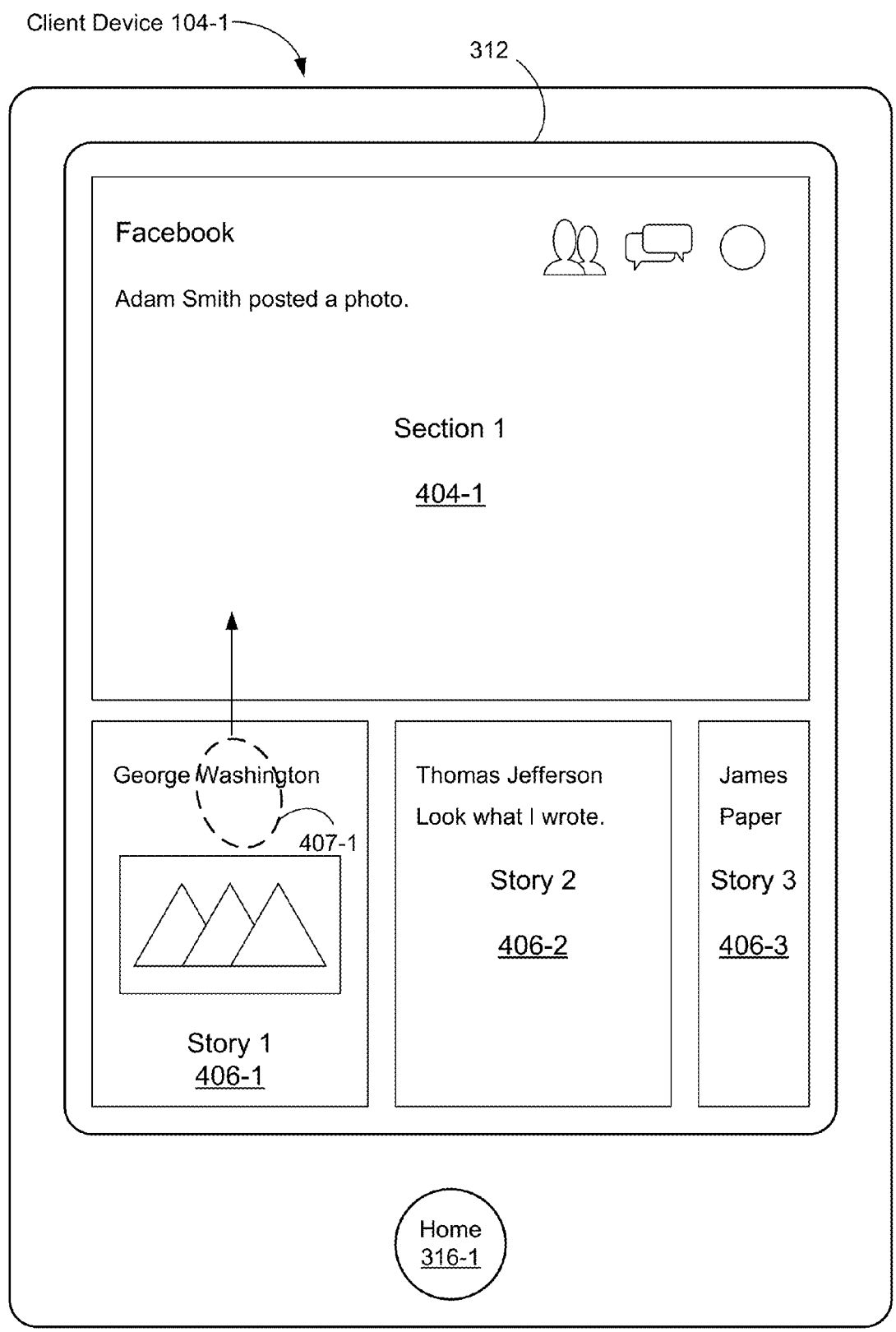
Figure 5A:
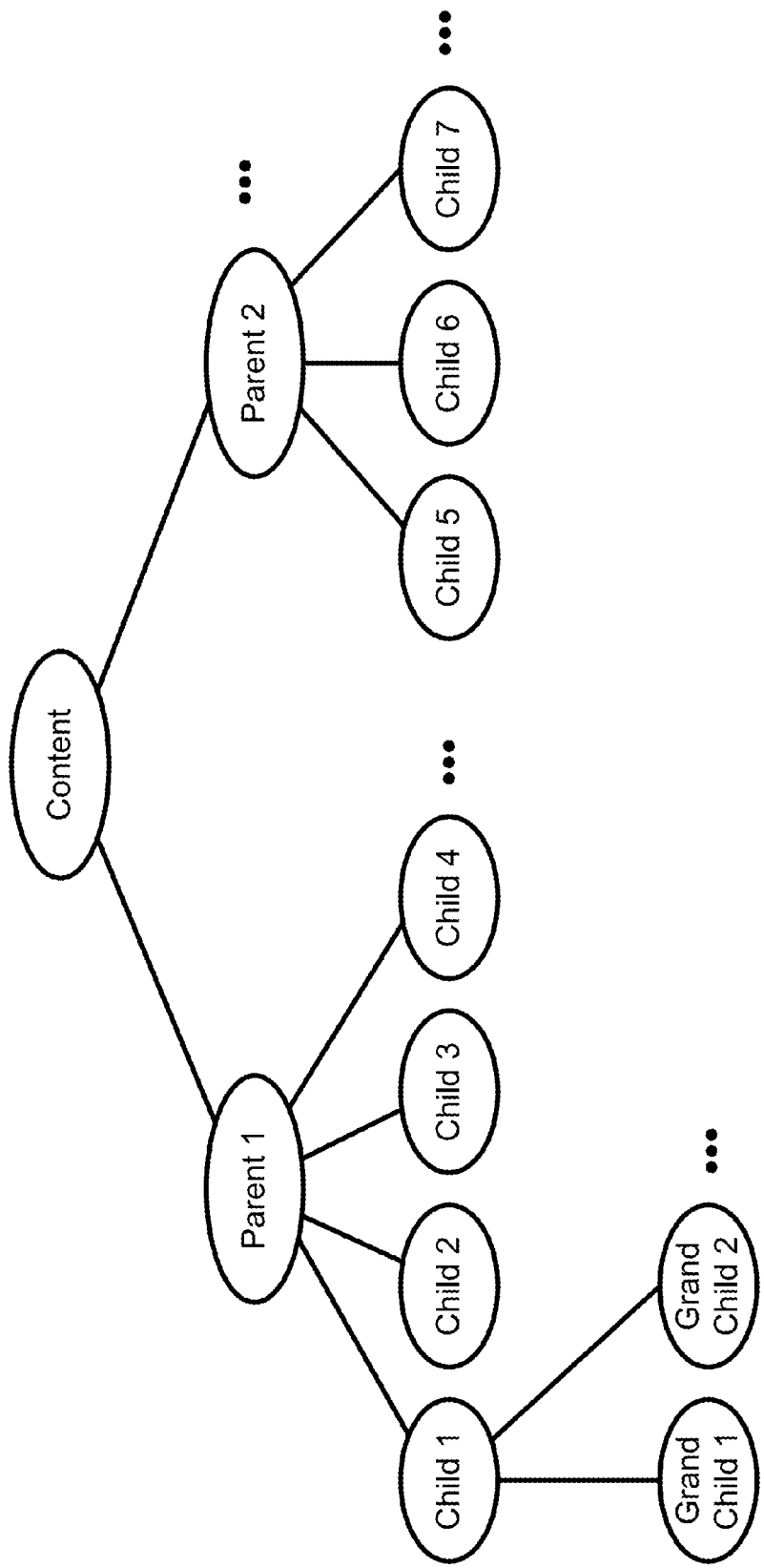
FIG. 5A is a diagram illustrating an exemplary hierarchy of content items in accordance with some embodiments.
Figure 5B:
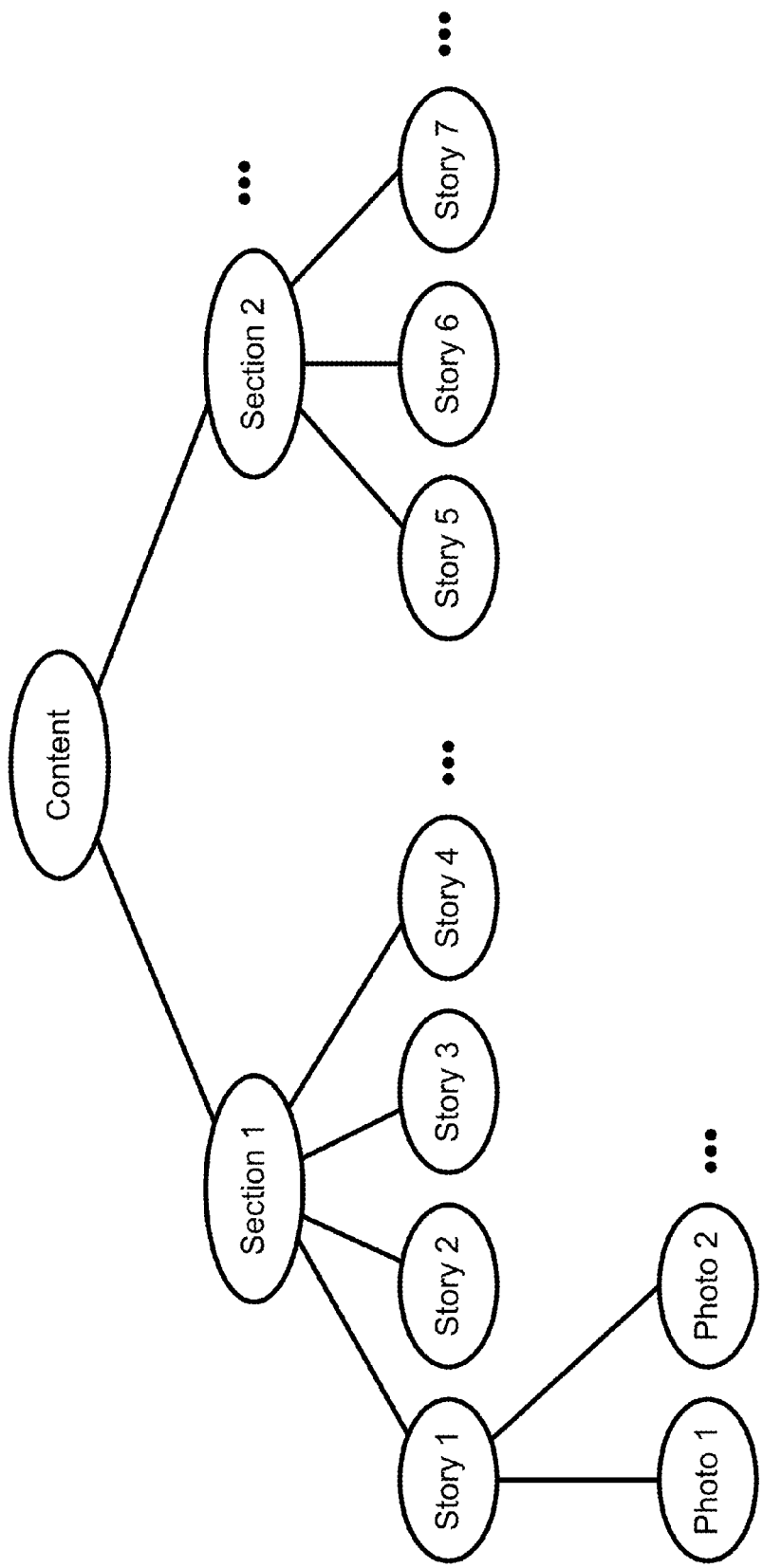
FIG. 5B is a diagram illustrating an exemplary hierarchy of content items in accordance with some embodiments.
Figure 5C:
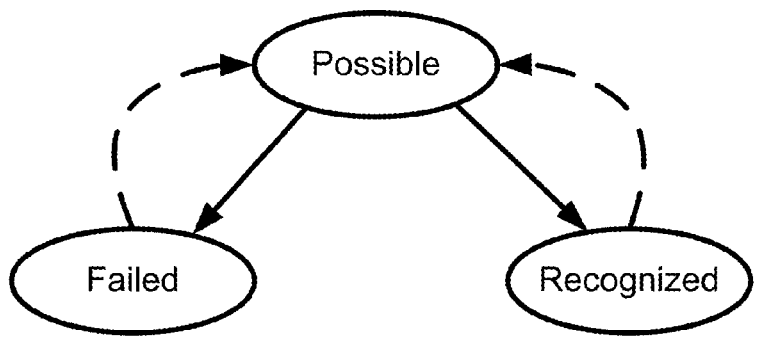
FIG. 5C illustrates an exemplary state machine for discrete gesture recognizers in accordance with some embodiments.
Figure 5D:
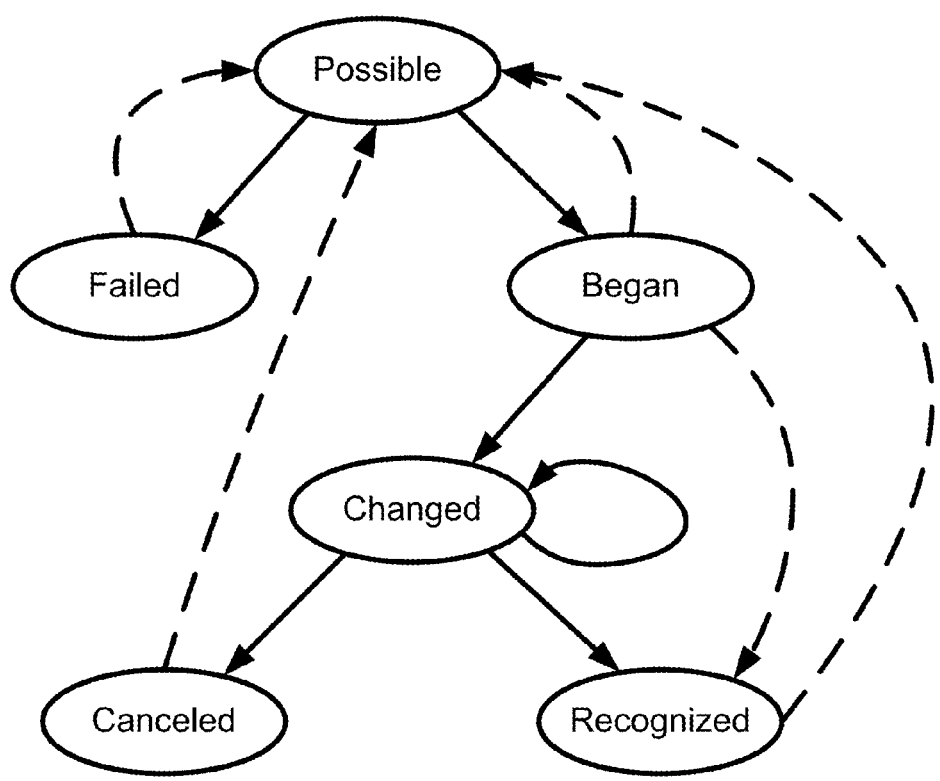
FIG. 5D illustrates an exemplary state machine for continuous gesture recognizers in accordance with some embodiments.
Figure 6B:
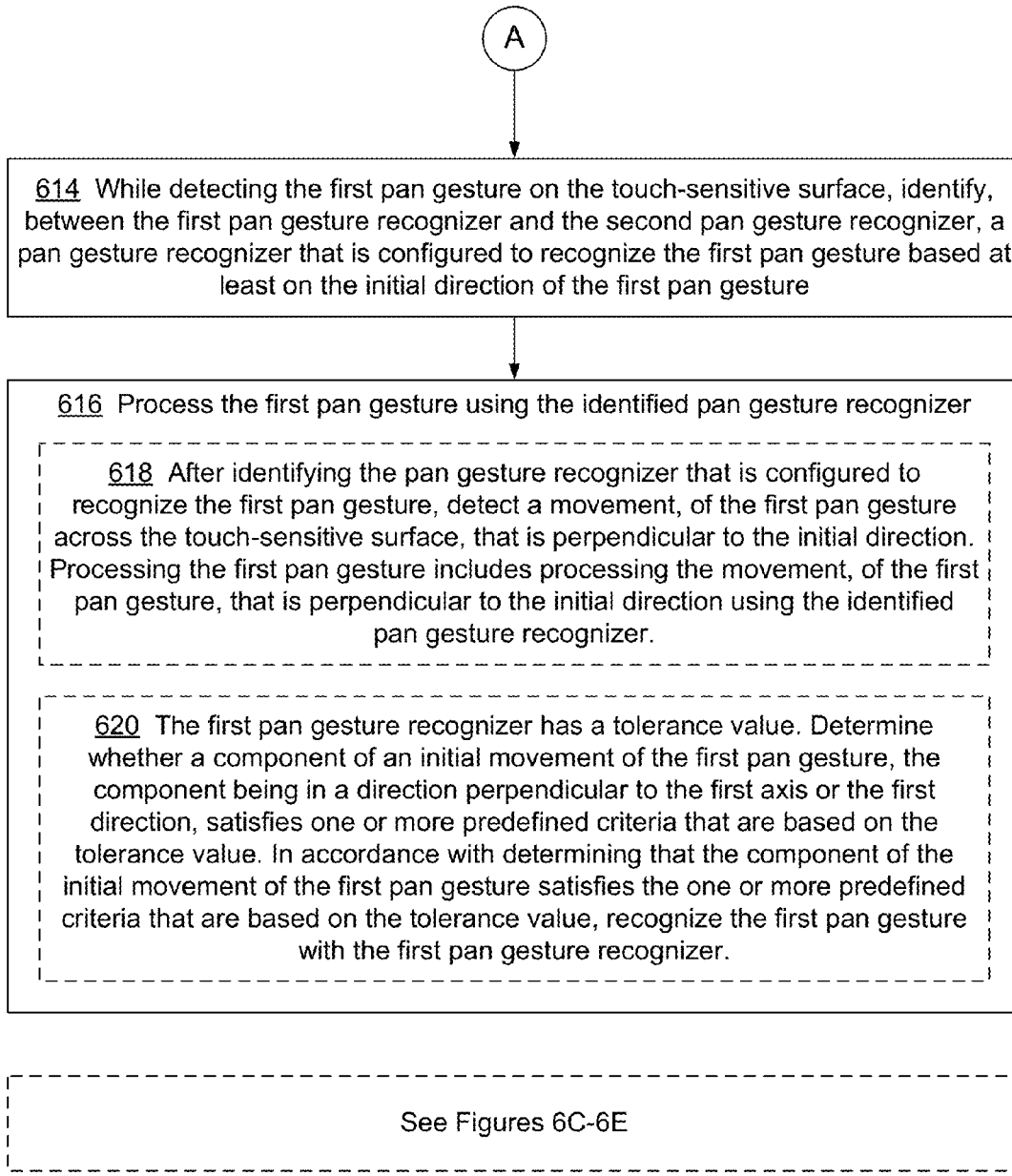

Below, FIGS. 1-3 provide a description of devices used for providing social network content (e.g., client devices and social network servers). FIGS. 4A-4CC illustrate exemplary user interfaces in a software application with a hierarchy of user interfaces (e.g., a social networking application). FIG. 5A-5B are diagrams illustrating exemplary hierarchies of content items. FIG. 5C illustrates an exemplary state machine for discrete gesture recognizers in accordance with some embodiments. FIG. 5D illustrates an exemplary state machine for continuous gesture recognizers in accordance with some embodiments. FIGS. 6A-6E are flow diagrams illustrating a method of processing touch-based gestures on an electronic device. FIGS. 7A-7D are flow diagrams illustrating a method of navigating in a software application via touch gestures. The user interfaces in FIGS. 4A-4CC, the diagrams in FIGS. 5A-5B, and the state machines in FIGS. 5C-5D are used to illustrate the processes in FIGS. 6A-6E and 7A-7D.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user interface could be termed a second user interface, and, similarly, a second user interface could be termed a first user interface, without departing from the scope of the various described embodiments. The first user interface and the second user interface are both user interfaces, but they are not the same user interface.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

FIG. 1 is a block diagram illustrating an exemplary network architecture of a social network in accordance with some embodiments. The network architecture 100 includes a number of client devices (also called "client systems," "client computers," or "clients") 104-1, 104-2, . . . 104-n communicably connected to a social network system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social network system. In some embodiments, the social network system 108 is a single computing device such as a computer server, while in other embodiments, the social network system 108 is implemented by multiple computing devices working together to perform the actions of a server system (e.g., cloud computing). In some embodiments, the network 106 is a public communication network (e.g., the Internet or a cellular data network) or a private communications network (e.g., private LAN or leased lines) or a combination of such communication networks.

Users 102-1, 102-2, . . . 102-n employ the client devices 104-1, 104-2, . . . 104-n to access the social network system 108 and to participate in a social networking service. For example, one or more of the client devices 104-1, 104-2, . . . 104-n execute web browser applications that can be used to access the social networking service. As another example, one or more of the client devices 104-1, 104-2, . . . 104-n execute software applications that are specific to the social network (e.g., social networking "apps" running on smart phones or tablets, such as a Facebook social networking application running on an iPhone, Android, or Windows smart phone or tablet).

Users interacting with the client devices 104-1, 104-2, . . . 104-n can participate in the social networking service provided by the social network system 108 by posting information, such as text comments (e.g., updates, announcements, replies), digital photos, videos, audio files, links, and/or other electronic content. Users of the social networking service can also annotate information posted by other users of the social networking service (e.g., endorsing or "liking" a posting of another user, or commenting on a posting by another user). In some embodiments, information can be posted on a user's behalf by systems and/or services external to the social network or the social network system 108. For example, the user may post a review of a movie to a movie review website, and with proper permissions that website may cross-post the review to the social network on the user's behalf. In another example, a software application executing on a mobile client device, with proper permissions, may use global positioning system (GPS) or other geo-location capabilities (e.g., Wi-Fi or hybrid positioning systems) to determine the user's location and update the social network with the user's location (e.g., "At Home," "At Work," or "In San Francisco, Calif."), and/or update the social network with information derived from and/or based on the user's location. Users interacting with the client devices 104-1, 104-2, . . . 104-n can also use the social network provided by the social network system 108 to define groups of users. Users interacting with the client devices 104-1, 104-2, . . . 104-n can also use the social network provided by the social network system 108 to communicate and collaborate with each other.

In some embodiments, the network architecture 100 also includes third-party servers 110-1, 110-2, . . . 110-m. In some embodiments, a given third-party server is used to host third-party websites that provide web pages to client devices 104, either directly or in conjunction with the social network system 108. In some embodiments, the social network system 108 uses iframes to nest independent websites within a user's social network session. In some embodiments, a given third-party server is used to host third-party applications that are used by client devices 104, either directly or in conjunction with the social network system 108. In some embodiments, social network system 108 uses iframes to enable third-party developers to create applications that are hosted separately by a third-party server 110, but operate within a social networking session of a user and are accessed through the user's profile in the social network system. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server is used to host enterprise systems, that are used by client devices 104, either directly or in conjunction with the social network system 108. In some embodiments, a given third-party server is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

FIG. 2 is a block diagram illustrating an exemplary social network system 108 in accordance with some embodiments. The social network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social network system 108 to other computers via the one or more communication network interfaces 204 (wired or wireless) and one or more communication networks, such as the Internet, cellular telephone networks, mobile data networks, other wide area networks, local area networks, metropolitan area networks, and so on;
- a social network database 214 for storing data associated with the social network, such as:
    - entity information 216, such as user information 218;
    - connection information 220; and
    - content 222, such as user content 224 and/or news articles 226;
- a social network server module 228 for providing social networking services and related features, in conjunction with browser module 338 or social network client module 340 on the client device 104, which includes:
    - a login module 230 for logging a user 102 at a client 104 into the social network system 108; and
    - a content feed manager 232 for providing content to be sent to clients 104 for display, which includes:
        - a content generator module 234 for describing objects in the social network database 214, such as images, videos, audio files, comments, status messages, links, applications, and/or other entity information 216, connection information 220, or content 222; and
        - a content selector module 236 for choosing the information/content to be sent to clients 104 for display; and
- a search module 238 for enabling users of the social network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social network system 108 transmits a "friend request" to the second user. If the second user confirms the "friend request," the social network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like," "attended," "played," "listened," "cooked," "worked at," or "watched" the entity at the other node. The page in the social networking service that corresponds to the entity at the other node may include, for example, a selectable "like," "check in," or "add to favorites" icon. After the user clicks one of these icons, the social network system 108 may create a "like" edge, a "check in" edge, or a "favorites" edge in response to the corresponding user action. As another example, the user may listen to a particular song using a particular application (e.g., an online music application). In this case, the social network system 108 may create a "listened" edge and a "used" edge between the user node that corresponds to the user and the entity nodes that correspond to the song and the application, respectively, to indicate that the user listened to the song and used the application. In addition, the social network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tiff and gif), graphics (vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device includes inputs such as a keyboard, mouse, other input buttons 316, and/or a touch-sensitive surface 314 (e.g., a touch pad). In some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the processor(s) 302. Memory 306, or alternately the non-volatile memory device(s) within memory 306, includes a non-transitory computer readable storage medium. In some embodiments, memory 306 or the computer readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social network system 108;
- an audio input module 332 (e.g., a microphone module) for processing audio captured by the audio input device 320, where the respective audio may be sent or streamed (e.g., by a client application module) to the social network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340);

one or more client application modules 336, including the following modules (or sets of instructions), or a subset or superset thereof:
- a web browser module 338 (e.g., Internet Explorer by Microsoft, Firefox by Mozilla, Safari by Apple, or Chrome by Google) for accessing, viewing, and interacting with web sites (e.g., a social networking web site such as www.facebook.com),
- a social network client module 340 (e.g., Paper by Facebook) for providing an interface to a social network (e.g., a social network provided by social network system 108) and related features; and/or
- other optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support; and one or more gesture recognizers 344 for processing gestures (e.g., touch gestures, such as pan, swipe, pinch, depinch, rotate, etc.), including the following gesture recognizers, or a subset or superset thereof:
- a pan gesture recognizer 1 (346-1), which is also called herein a first pan gesture recognizer, that is configured to recognize a pan gesture;
- a pan gesture recognizer 2 (346-2), which is also called herein a second pan gesture recognizer, that is configured to recognize a pan gesture; and
- one or more other gesture recognizers (not shown), each of which is configured to recognize a respective gesture (e.g., tap, swipe, pan, pinch, depinch, rotate, etc.).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. For example, in some embodiments, at least a subset of the gesture recognizers 344 (e.g., pan gesture recognizer 1 (346-1) and pan gesture recognizer 2 (346-2)) is included in the operating system 326. In some other embodiments, at least a subset of the gesture recognizers 344 (e.g., pan gesture recognizer 1 (346-1) and pan gesture recognizer 2 (346-2)) is included in the social network client module 340. In some embodiments, memory 206 and/or 306 store a subset of the modules and data structures identified above. Furthermore, memory 206 and/or 306 optionally store additional modules and data structures not described above.

Attention is now directed towards embodiments of user interfaces ("UI") and associated processes that may be implemented on a client device (e.g., client device 104 in FIG. 3).

FIGS. 4A-4CC illustrate exemplary user interfaces in a software application with a hierarchy of user interfaces, in accordance with some embodiments. The user interfaces in these figures are used to illustrate the processes described below, including the processes in FIGS. 6A-6E and 7A-7D.

FIGS. 4A-4B and 4F-4G illustrate exemplary user interfaces associated with a section view mode in accordance with some embodiments.

FIGS. 4A-4B illustrate exemplary user interfaces associated with a horizontal pan gesture on a story thumbnail image in accordance with some embodiments.

FIG. 4A illustrates that the client device 104-1 includes a display 312. The client device 104-1 includes a touch-sensitive surface. In some embodiments, the display 312 includes the touch-sensitive surface, and the display 312 is a touch-sensitive display (also called herein a touch screen). In some embodiments, the portable electronic device 104-1 also includes one or more physical buttons (e.g., a home button 316-1, etc.).

In FIG. 4A, the display 312 displays a user interface that includes a plurality of user interface elements, including a plurality of images. In some embodiments, the plurality of images includes a first section image 401-1 that represents a first section (e.g., a social networking content section in the social network client module 340, which also contains other content sections). The plurality of images also includes thumbnail images 406-1, 406-2, and 406-3 that correspond to stories in the first section (e.g., comments or postings by users who are connected to a user of the client device 104-1 in a social networking service (so-called "friends" of the user)).

FIG. 4A also illustrates that a horizontal pan gesture 405 (e.g., a leftward pan gesture) is detected initially at a location on the touch-sensitive surface that corresponds to the thumbnail image 406-2 (which corresponds to Story 2) on the display 312.

As shown in FIG. 4A, the horizontal pan gesture 405 includes a substantially horizontal movement of a touch. In other words, the horizontal pan gesture 405 need not be perfectly horizontal, and need not be perfectly linear. Regardless, in some cases, the horizontal pan gesture 405 is recognized as a horizontal gesture in accordance with a determination that the horizontal pan gesture 405 satisfies predefined criteria. In some embodiments, the predefined criteria include that an angle formed by an initial direction 492 of the horizontal pan gesture 405 and a reference axis 490 (e.g., a horizontal axis on the display 312) is within a predefined angle. In some embodiments, the predefined angle corresponds to an angle formed by a predefined threshold direction 494 and the reference axis 490. In some other embodiments, the predefined criteria include that a ratio of a vertical component of an initial movement of the horizontal pan gesture 405 (e.g., vertical distance traversed by the horizontal pan gesture 405) and a horizontal component of the initial movement of the horizontal pan gesture 405 (e.g., horizontal distance traversed by the horizontal pan gesture 405) is less than a predefined threshold value. In some embodiments, an initial velocity of the horizontal pan gesture 405 is used instead of, or in addition to, an initial distance traversed by the pan gesture.

Although FIG. 4A is used to describe a horizontal pan gesture, a vertical pan gesture can be recognized in a similar manner. For example, a vertical pan gesture need not be perfectly vertical and need not be perfectly linear. For brevity, such details are not repeated here.

FIG. 4B illustrates that, in response to the horizontal pan gesture 405, the thumbnail images are scrolled. For example, the thumbnail images 406-1, 406-2, and 406-3 illustrated in FIG. 4A are scrolled horizontally so that the thumbnail image 406-1 ceases to be displayed. The thumbnail image 406-3, which is partially included in the user interface illustrated in FIG. 4A, is included in its entirety in the user interface illustrated in FIG. 4B. FIG. 4B also illustrates that the user interface includes at least a portion of a new thumbnail image 406-4.

Figure 4D:
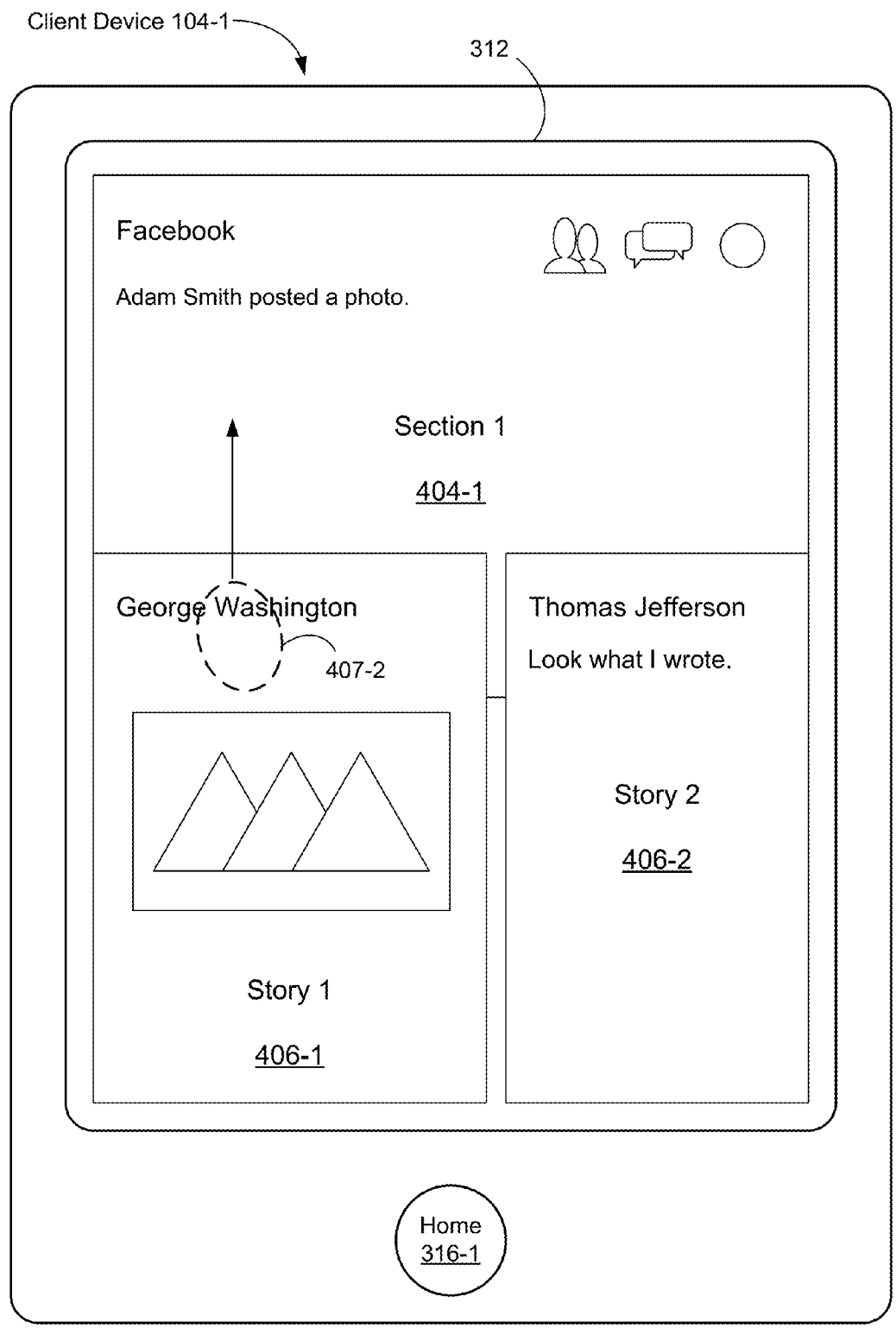
Figure 4E:
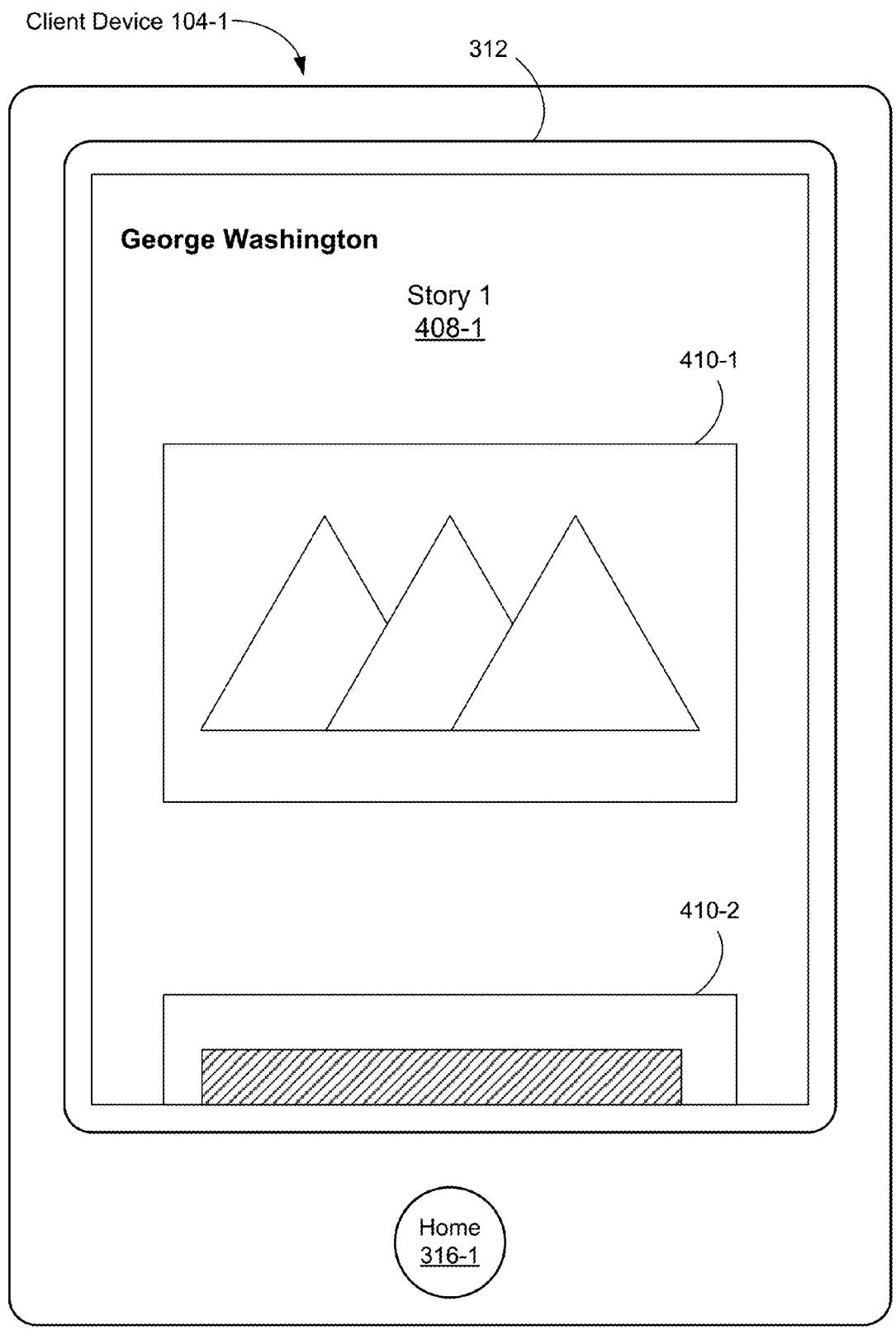

FIGS. 4C-4E illustrate exemplary user interfaces associated with a vertical pan gesture on a story thumbnail image in accordance with some embodiments.

FIG. 4C illustrates that a vertical pan gesture (e.g., an upward pan gesture) is detected initially at a location 407-1 on the touch-sensitive surface that corresponds to the thumbnail image 406-1 (which corresponds to Story 1) on the display 312.

FIG. 4D illustrates that the vertical pan gesture remains in contact with the display 312 and has moved to a location 407-2. FIG. 4D also illustrates that, in response to the movement of a touch in the vertical pan gesture from the location 407-1 (FIG. 4C) to the location 407-2 (FIG. 4D), one or more thumbnail images are enlarged. For example, in FIG. 4D, the thumbnail images 406-1 and 406-2 have been enlarged in accordance with the movement of the touch from the location 407-1 to the location 407-2 (e.g., a vertical distance from the location 407-1 to the location 407-2). In FIG. 4D, the thumbnail image 406-3 (FIG. 4C) ceases to be displayed.

FIG. 4E illustrates that in response to a further upward movement of the vertical pan gesture or in response to a release of the vertical pan gesture from the display 312 (e.g., the vertical pan gesture ceases to be detected on the display 312), the thumbnail image 406-1 is further enlarged to become a full-screen-width image 408-1 that corresponds to Story 1. In FIG. 4E, a width of the image 408-1 corresponds substantially to a full width of the display 312 (e.g., the width of the image 408-1 corresponds 70, 75, 80, 90 or 95 percent or more of the full width of the display 312). As used herein, a display that includes a full-screen-width image that corresponds to a story is called a story view.

FIG. 4E also illustrates that the full scale image 408-1 includes one or more photos, such as photos 410-1 and 410-2.

Figure 4F:
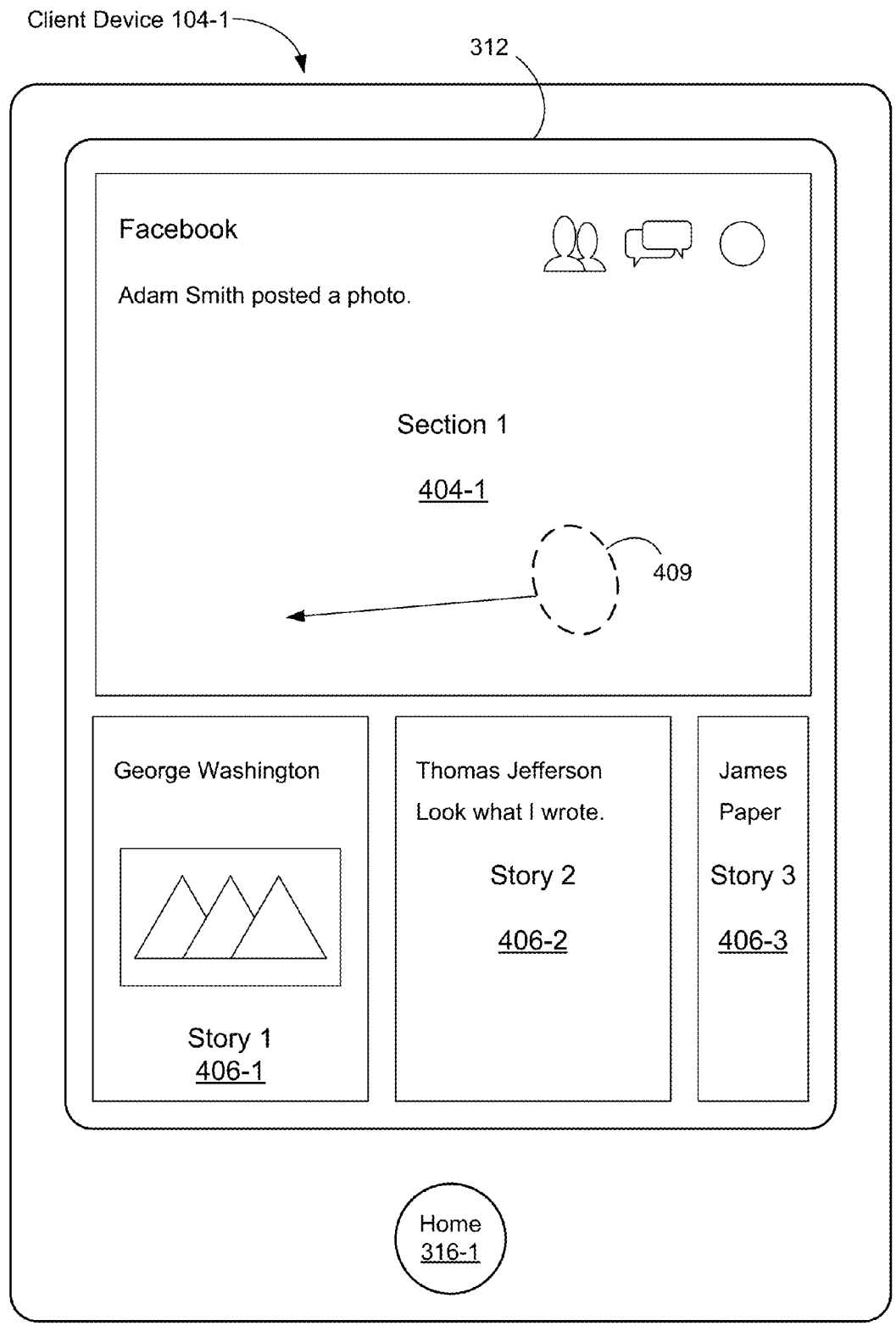
Figure 4G:
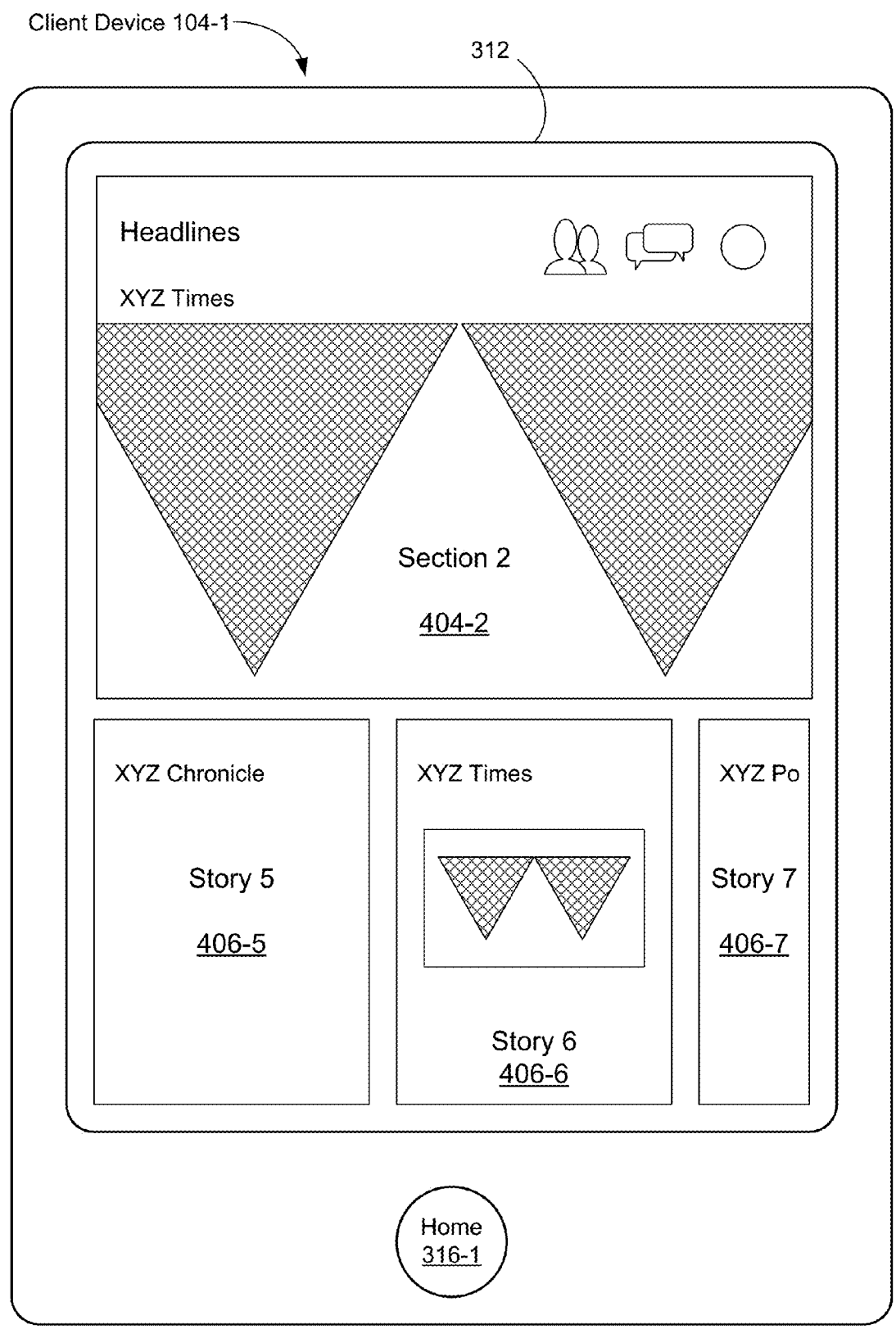

FIGS. 4F-4G illustrate exemplary user interfaces associated with a horizontal pan gesture on a section image in accordance with some embodiments.

In FIG. 4F, a horizontal pan gesture 409 (e.g., a left pan gesture) is detected initially at a location that corresponds to the first section image 404-1.

FIG. 4G illustrates that, in response to the horizontal pan gesture 409, the first section image 404-1 is scrolled and replaced with a second section image 404-2 that corresponds to a second section (e.g., a headline news section). For example, the first section image 404-1 is scrolled horizontally in a same direction as the horizontal pan gesture 409 and the second section image 404-2 is scrolled in horizontally in the same direction to replace the first section image 404-1.

FIG. 4G also illustrates that, in response to the horizontal pan gesture 409, the thumbnail images 406-1, 406-2, and 406-3 (FIG. 4F) that correspond to stories in the first section are replaced with thumbnail images that correspond to stories in the second section (e.g., news articles). For example, the thumbnail images 406-1, 406-2, and 406-3 are scrolled horizontally in a same direction as the horizontal pan gesture 409 and thumbnail images 406-5, 406-6, and 406-7 are scrolled in horizontally in the same direction to replace the thumbnail images 406-1, 406-2, and 406-3.

In some embodiments, a section image for a particular section is selected from images in stories in the particular section. For example, in FIG. 4G, the second section image 404-2 corresponds to an image in Story 2, which is shown in the thumbnail image 406-6.

Figure 4H:
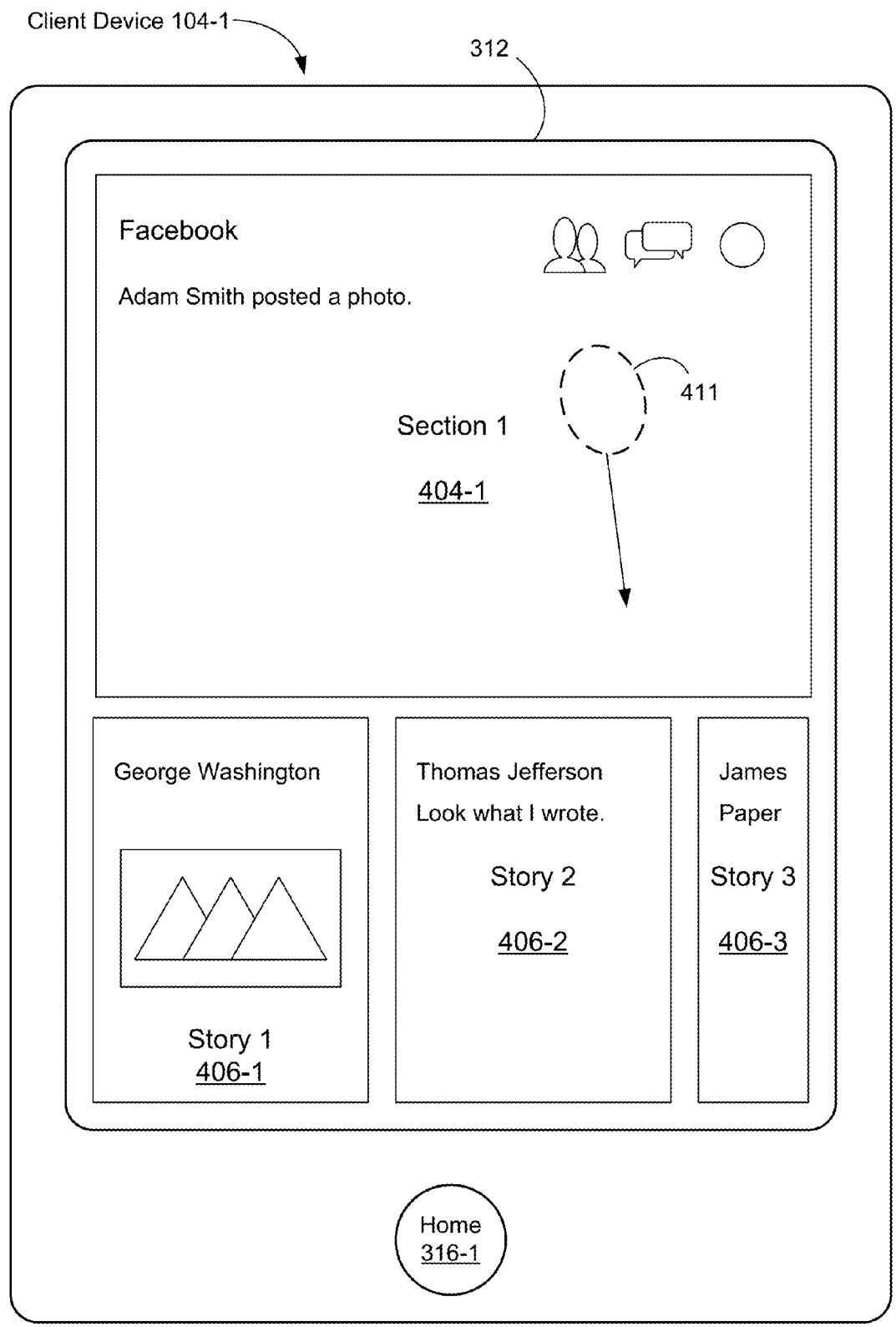
Figure 4I:
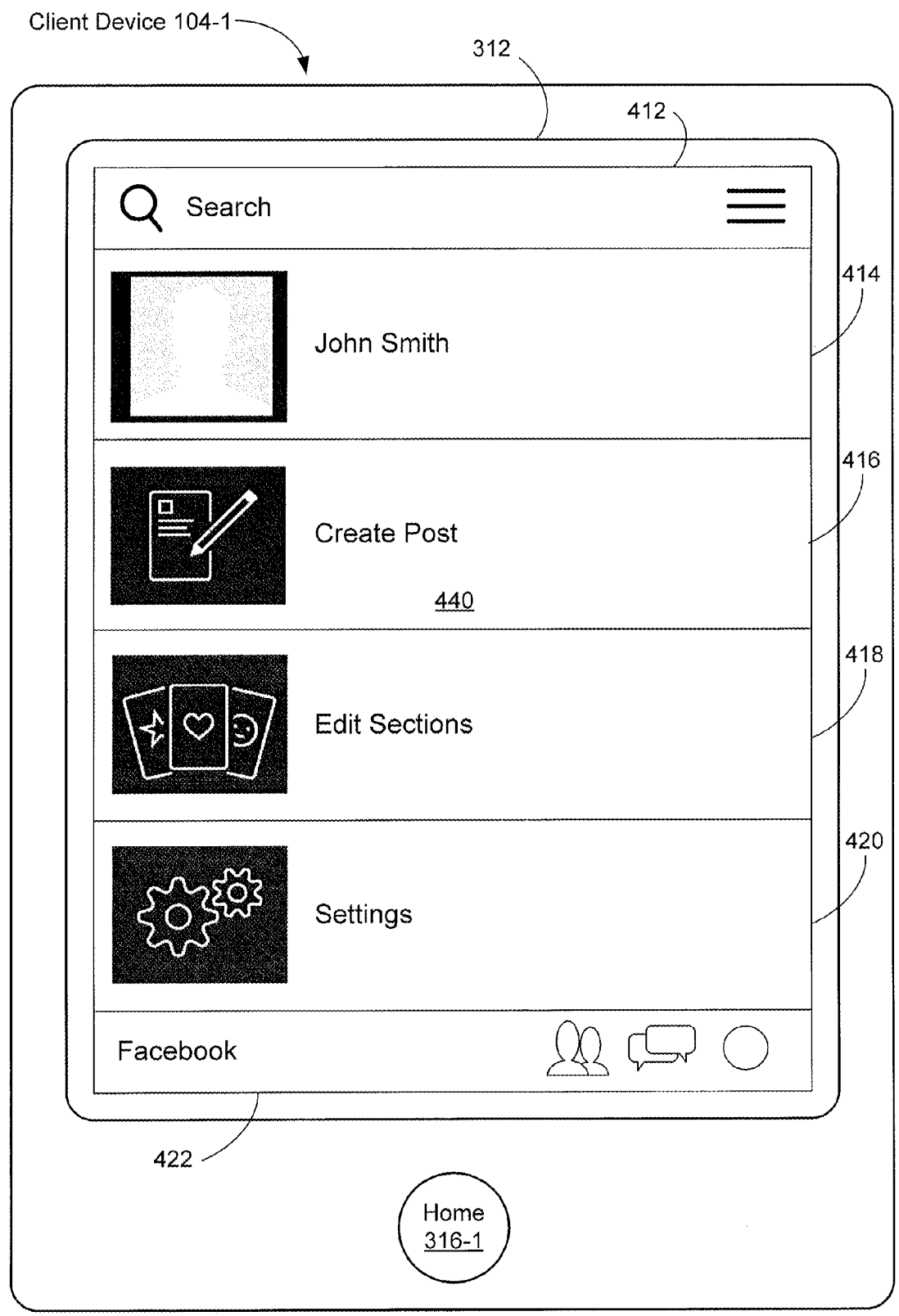

FIGS. 4H-4I illustrate exemplary user interfaces associated with a vertical pan gesture on a section image in accordance with some embodiments.

In FIG. 4H, a vertical pan gesture 411 (a downward pan gesture) is detected initially at a location that corresponds to the first section image 404-1.

FIG. 4I illustrates that, in response to the vertical pan gesture 411, the user interface illustrated in FIG. 4H is scrolled (e.g., downward) and a user interface 440 for the social networking application is displayed. The user interface 440 illustrated in FIG. 4I includes a search input area 412. In some embodiments, the user interface 440 for the social networking application includes a user interface icon 414, which, when selected (e.g., with a tap gesture), initiates display of a home page of a user associated with the client device 104-1. In some embodiments, the user interface 440 for the social networking application includes a user interface icon 416, which, when selected (e.g., with a tap gesture), initiates display of a user interface for composing a message for the social networking application. In some embodiments, the user interface 440 for the social networking application includes a user interface icon 418, which, when selected (e.g., with a tap gesture), initiates display of a user interface for selecting and/or deselecting sections for the social networking application. In some embodiments, the user interface 440 for the social networking application includes a user interface icon 420, which, when selected (e.g., with a tap gesture), initiates display of a user interface for adjusting settings in the social networking application.

FIG. 4I also illustrates that a portion 422 of the user interface illustrated in FIG. 4H remains on the display 312. In some embodiments, the portion 422, when selected (e.g., with a tap gesture on the portion 422), causes the client device 104-1 to cease to display the user interface 440 for the social networking application and redisplay the user interface illustrated in FIG. 4H in its entirety.

FIGS. 4J-4R illustrate exemplary user interface associated with a story view mode in accordance with some embodiments.

Figure 4J:
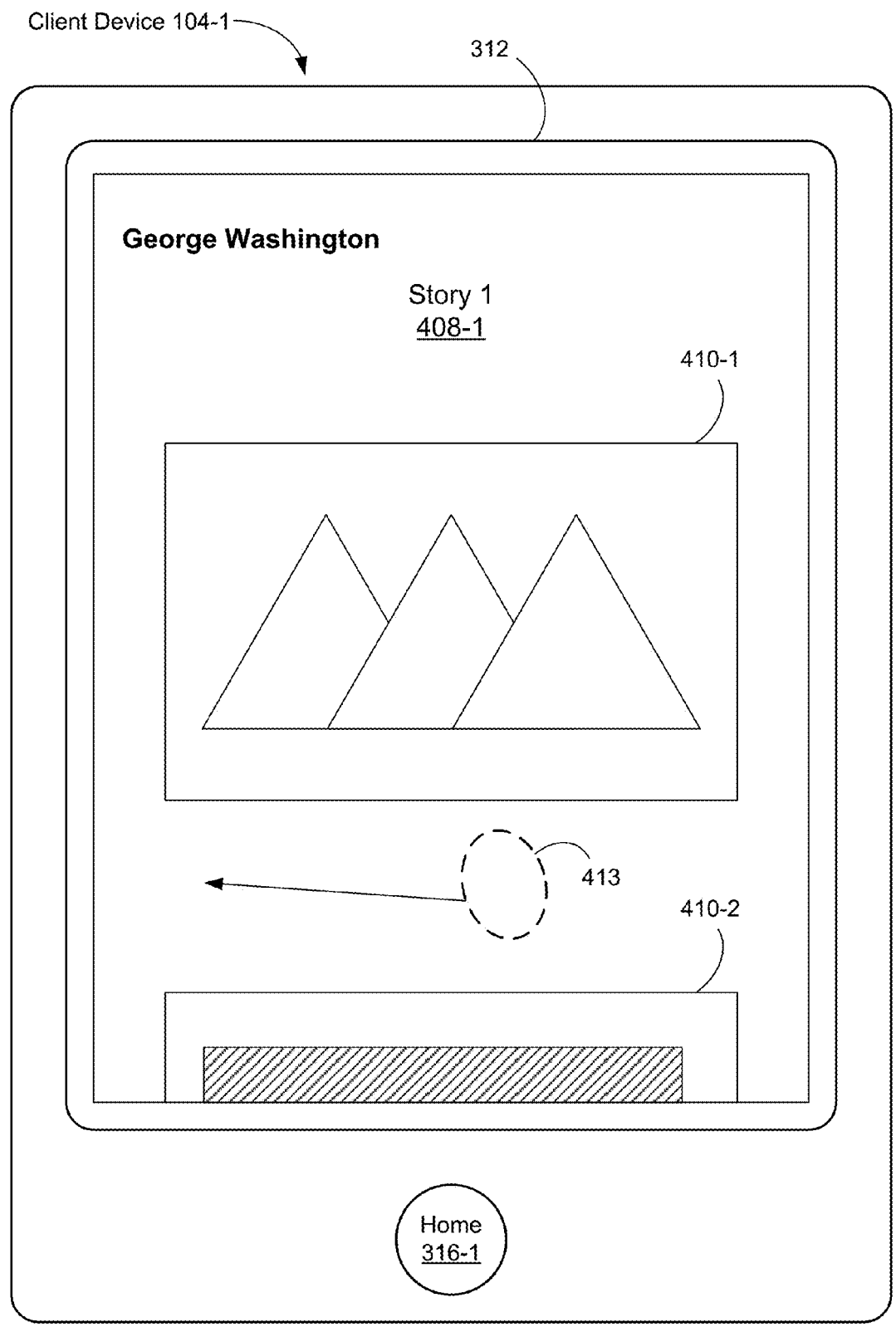
Figure 4K:
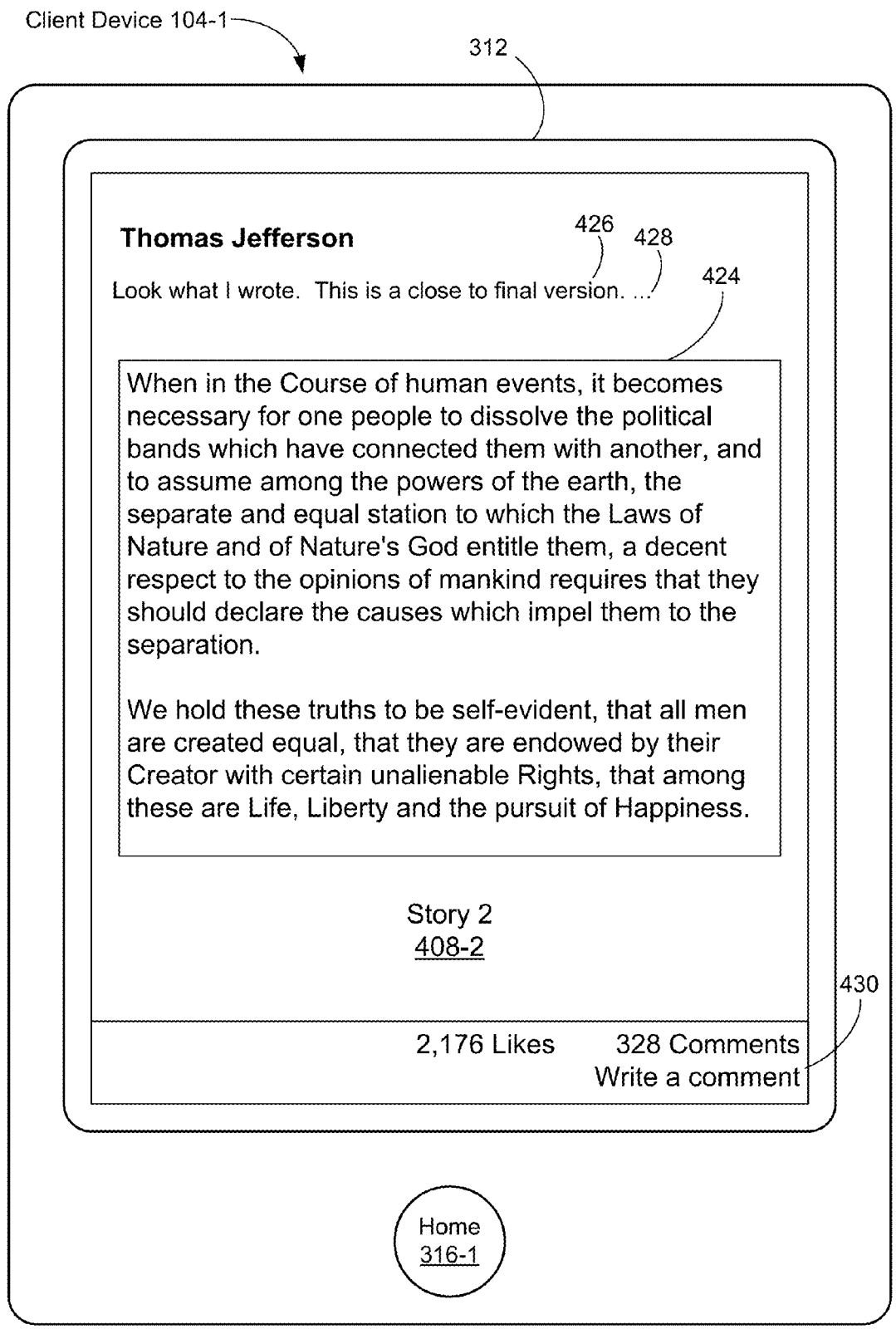

FIGS. 4J-4K illustrate exemplary user interfaces associated with a horizontal pan gesture on an image that corresponds to a story (e.g., a full-screen-width image) in accordance with some embodiments.

FIG. 4J illustrates that a horizontal pan gesture 413 (e.g., a leftward pan gesture) is detected at a location on the touch-sensitive surface that corresponds to the image 408-1 on the display 312.

FIG. 4K illustrates that, in response to the horizontal pan gesture 413, a full-screen-width image 408-2 that corresponds to Story 2 is displayed. In FIG. 4K, a width of the image 408-2 corresponds substantially to a full width of the display 312 (e.g., the width of the image 408-2 corresponds 70, 75, 80, 90 or 95 percent or more of the full width of the display 312).

In some embodiments, Story 1 and Story 2 are adjacent to each other in a sequence of stories in the social networking content section. In some embodiments, Story 2 is subsequent to Story 1 in the sequence of stories.

In FIG. 4K, the image 402-8 includes a user interface icon 424 for displaying an embedded content item.

FIG. 4K also illustrates that the image 408-2 includes a comment 426 from an author of Story 2 (e.g., Thomas Jefferson). In FIG. 4K, a portion of the comment 426 is truncated and displayed with a user interface icon 428 (e.g., ellipsis), which, when selected (e.g., with a tap gesture), initiates display of the truncated portion of the comment 426. In some embodiments, in response to selecting the user interface icon 428, the user interface icon 428 is replaced with the truncated portion of the comment 426.

In FIG. 4K, the image 408-2 is displayed with a user interface icon 430 that includes one or more feedback indicators. For example, the user interface icon 430 indicates how many users like Story 2 (e.g., 2,176 users) and how many comments have been made for Story 2 (e.g., 328 comments).

FIGS. 4L-4O illustrate exemplary user interfaces associated with a vertical pan gesture on an image that corresponds to a story (e.g., a full-screen-width image) in accordance with some embodiments. The vertical pan gesture in this instance results in a story view mode being changed to a section view mode.

Figure 4L:
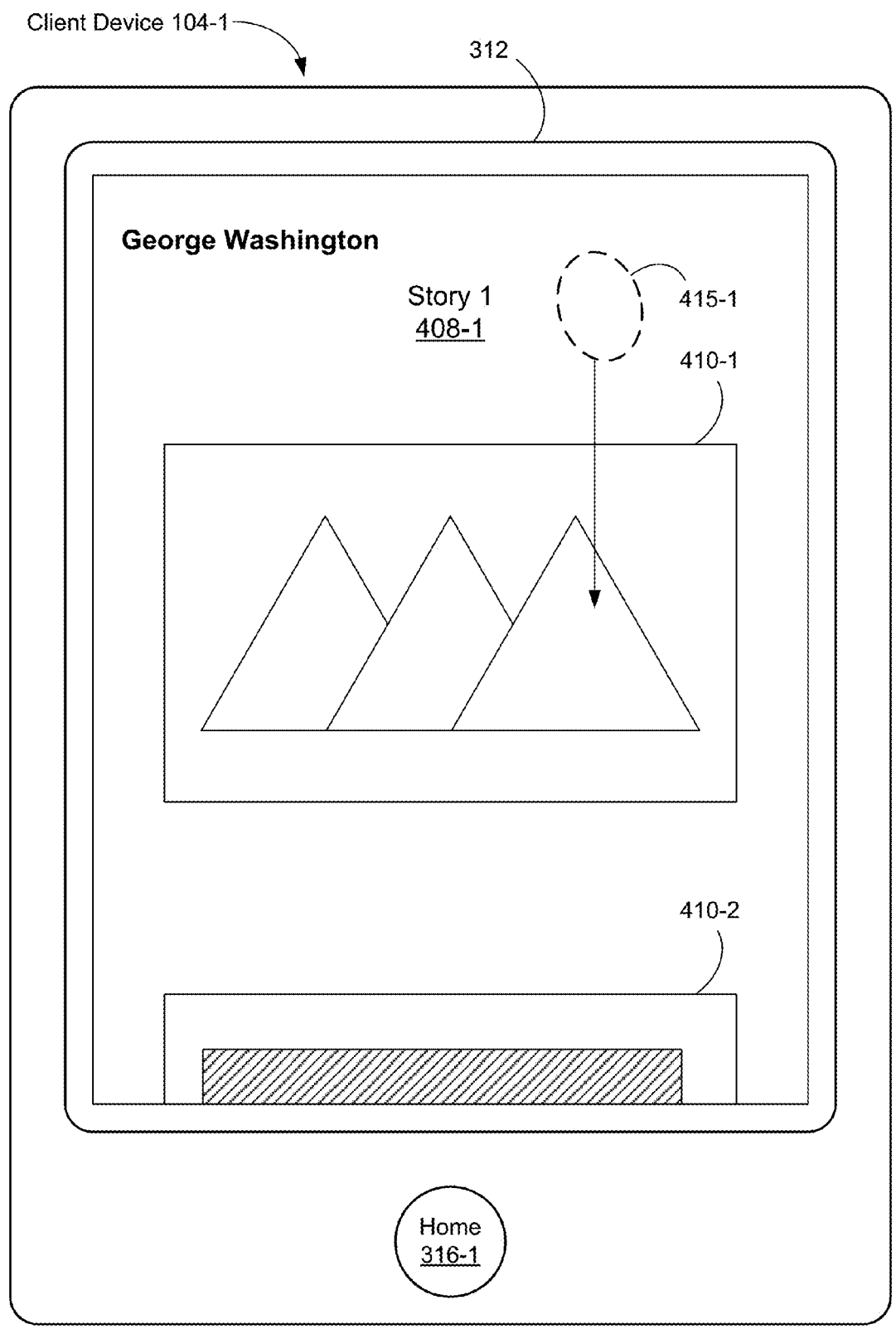

FIG. 4L illustrates that a vertical pan gesture is detected at a location 415-1 on the touch-sensitive surface that corresponds to the full-screen-width image 408-1 of Story 1.

Figure 4M:
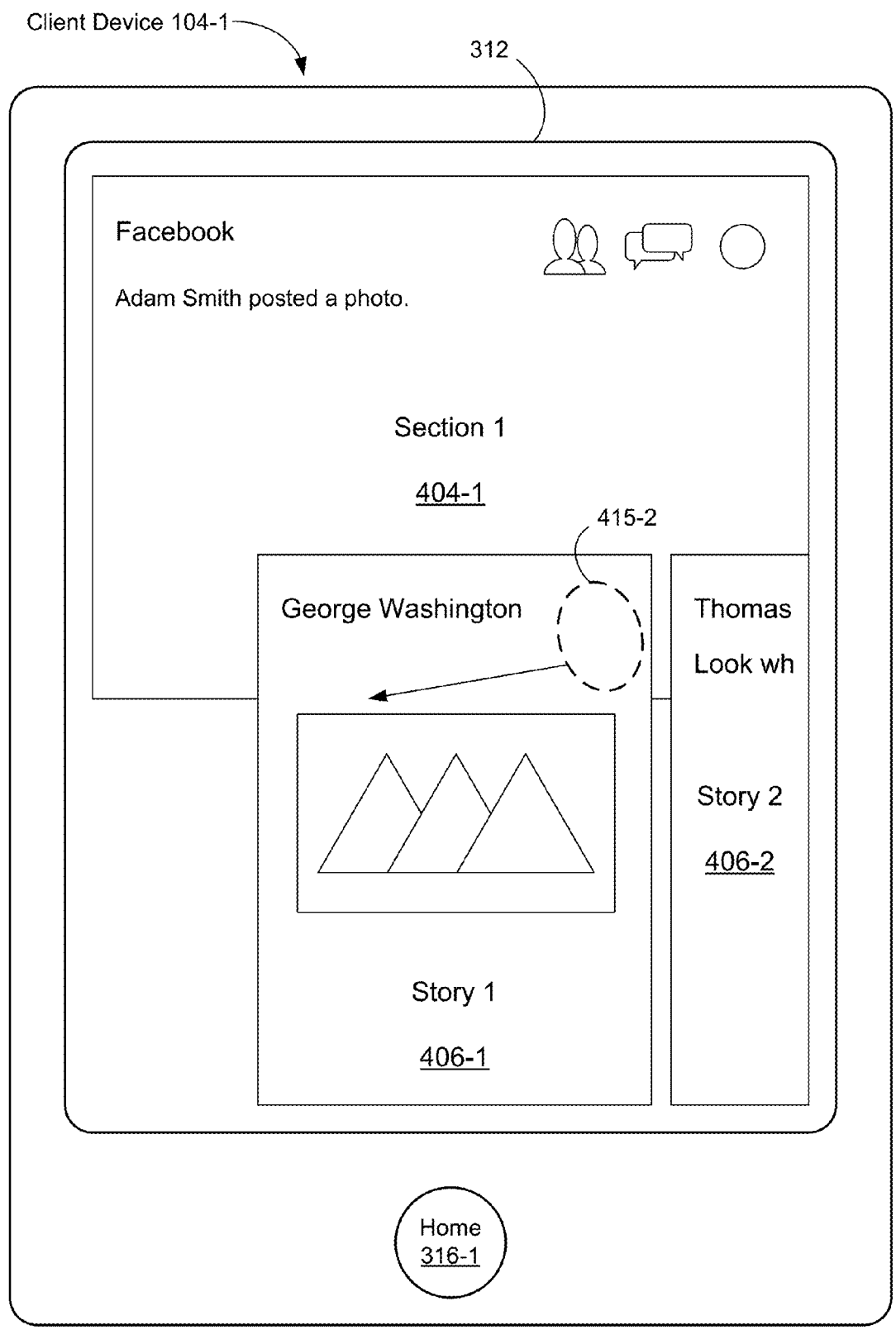

FIG. 4M illustrates that the vertical pan gesture remains in contact with the display 312 and has moved to a location 415-2. FIG. 4M also illustrates that, in response to the movement of a touch in the vertical pan gesture from the location 415-1 (FIG. 4L) to the location 415-2 (FIG. 4M), the full-screen-width image 408-1 is reduced to become the thumbnail image 406-1. In addition, at least a portion of the thumbnail image 406-2 is displayed. In FIG. 4M, the thumbnail images 406-1 and 406-2 at least partially overlay the image 404-1.

FIG. 4M also illustrates that the vertical pan gesture continues to move in a direction that is not perfectly vertical (e.g., diagonal).

Figure 4N:
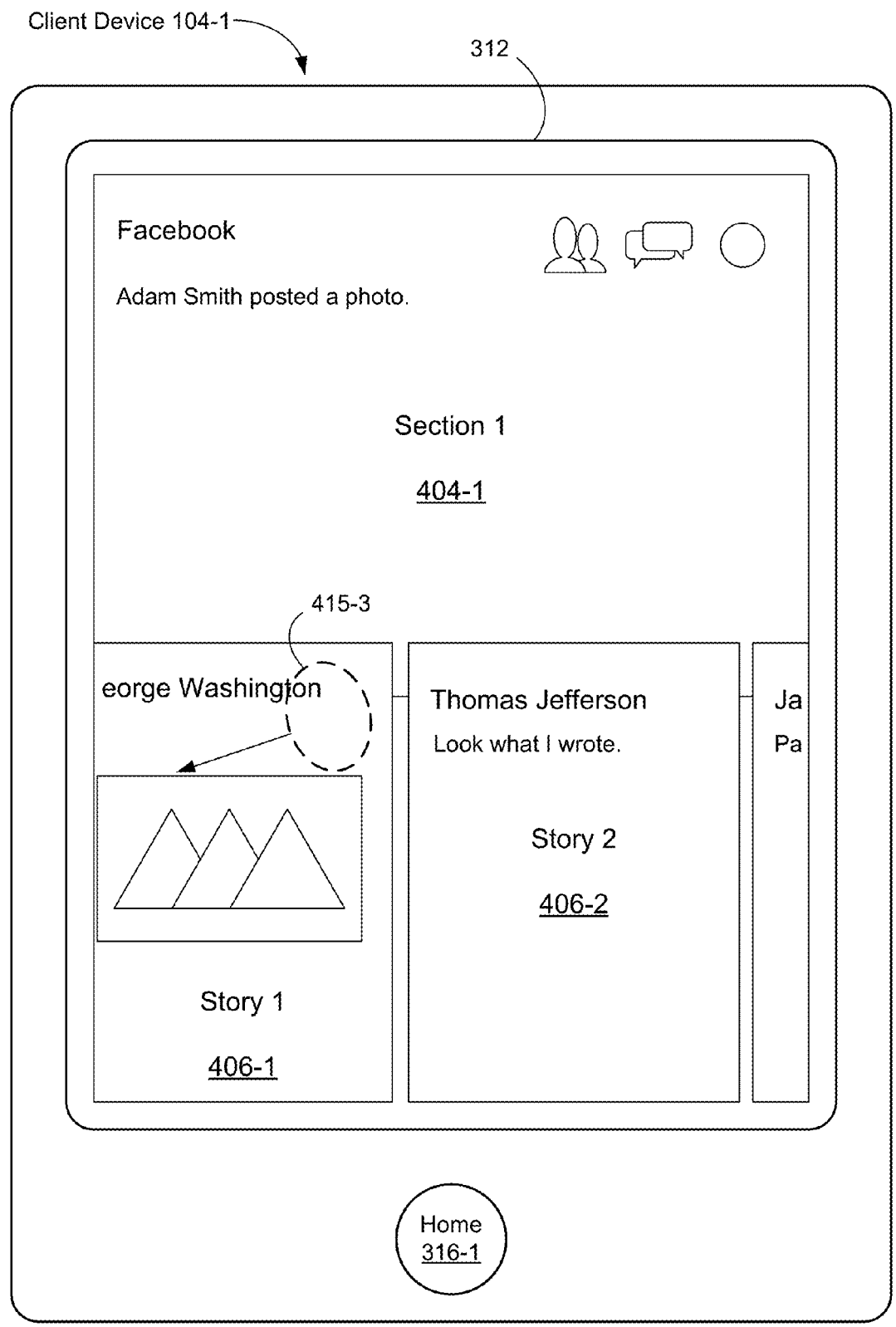

FIG. 4N illustrates that the vertical pan gesture remains in contact with the display 312 and has moved to a location 415-3. FIG. 4N also illustrates that, in response to the movement of the touch from the location 415-2 (FIG. 4M) to the location 415-3 (FIG. 4N), the thumbnail image 406-1 and the thumbnail image 406-2 are further reduced. In addition, in response to the movement of the touch from the location 415-2 (FIG. 4M) to the location 415-3 (FIG. 4N), which includes a horizontal movement of the touch, the thumbnail images 406-1 and the thumbnail image 406-2 are scrolled horizontally in accordance with the horizontal movement of the touch. In FIG. 4N, the thumbnail images 406-1 and 406-2 at least partially overlay the image 404-1.

Figure 4O:
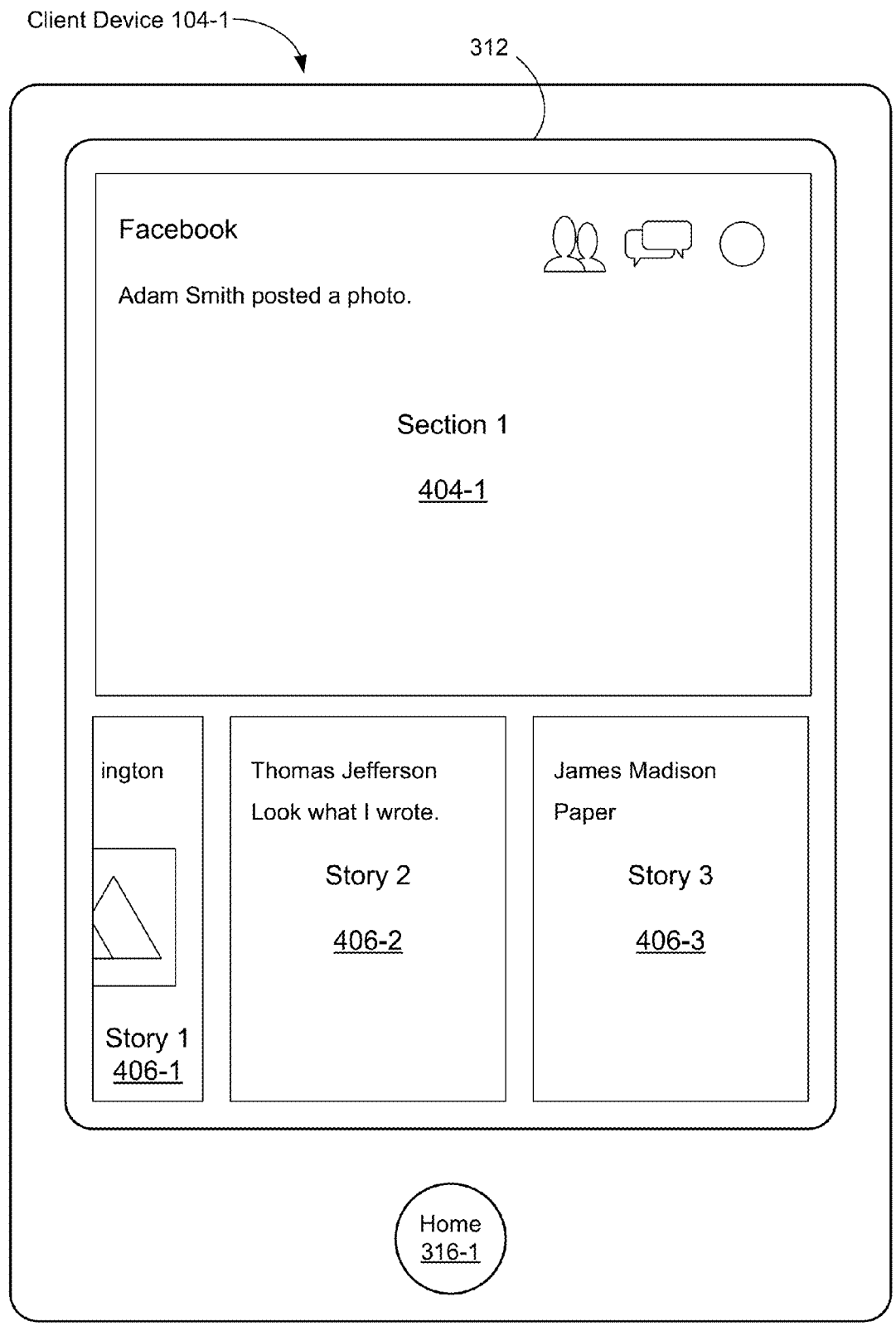

FIG. 4O illustrates that, in response to a further downward movement of the touch or in response to a release of the touch from the touch-sensitive surface (e.g., the touch ceases to be detected on the touch-sensitive surface), the thumbnail images 406-1, 406-2, and 406-3 are further reduced so that the thumbnail images 406-1, 406-2, and 406-3 cease to overlay the image 404-1.

Figure 4P:
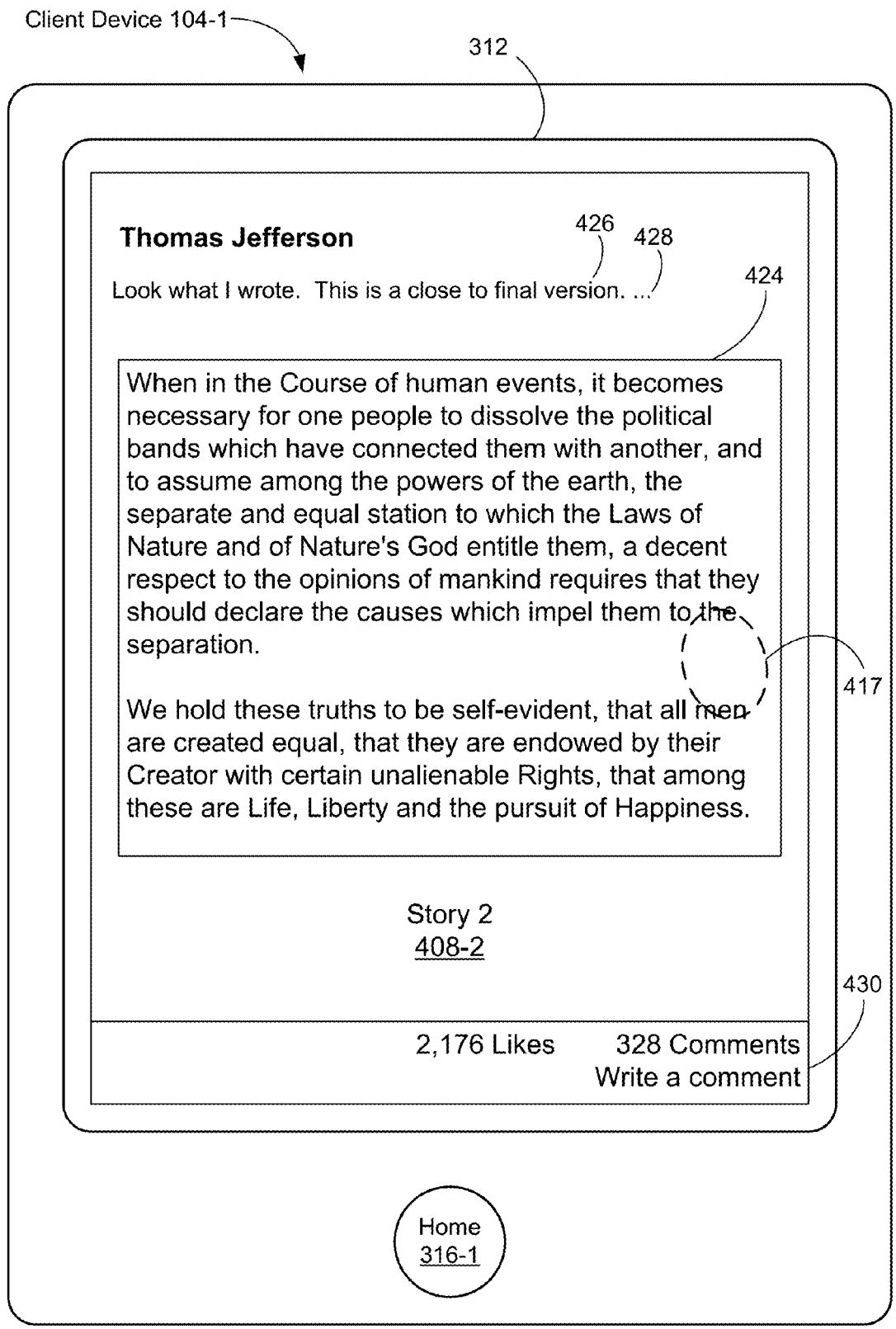
Figure 4Q:
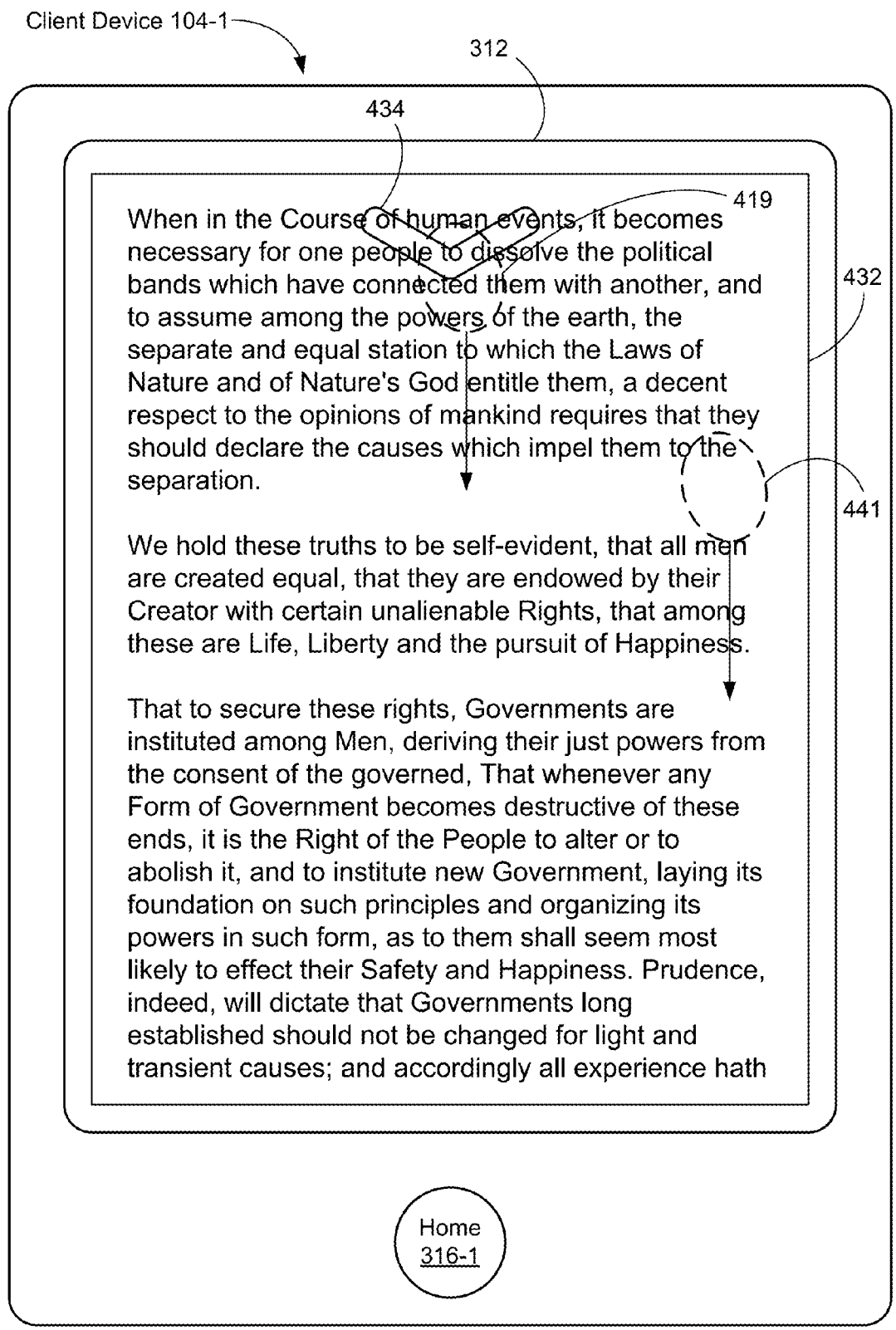

FIGS. 4P-4Q illustrate exemplary user interfaces associated with a user interface icon for displaying an embedded content item in accordance with some embodiments.

FIG. 4P illustrates that a touch input 417 (e.g., a tap gesture) is detected at a location on the touch-sensitive surface that corresponds to the user interface icon 424 for displaying an embedded content item.

FIG. 4Q illustrates that, in response to detecting the touch input 417, the user interface illustrated in FIG. 4P is replaced with a user interface that includes a full-screen-width display 432 of additional information embedded in Story 2. In some embodiments, an animation in which the user interface icon 424 expands, opens, and/or unfolds, to become the full-screen-width display 432 of the additional information is displayed in replacing the user interface illustrated in FIG. 4P with the user interface that includes the full-screen-width display 432 of additional information embedded in Story 2.

In FIG. 4Q, a user interface icon 434 (e.g., a downward arrow icon) is displayed, overlaying the full-screen-width display 432 of additional information. The user interface icon 434, when selected (e.g., with a tap gesture on the icon 434 or a downward swipe or pan gesture 419 that starts on icon 434), initiates replacing the full-screen-width display 432 of the additional information with the user interface that includes the user interface icon 424 (FIG. 4P). In some embodiments, the user interface icon 434 is transparent or translucent. In some embodiments, the user interface icon 434 is displayed in accordance with a determination that the full-screen-width display 432 of the additional information is scrolled (e.g., downward) at a speed that exceeds a predetermined speed. In some embodiments, the user interface icon 434 is displayed in accordance with a determination that the full-screen-width display 432 of the additional information includes a display of a last portion (e.g., a bottom portion) of the additional information. In some embodiments, an upward arrow, instead of a downward arrow, is displayed over the additional information. In some embodiments, the downward arrow is displayed adjacent to a top portion of the display 312. In some embodiments, the user interface icon 434 is displayed in accordance with a determination that the full-screen-width display 432 of the additional information includes a display of an initial portion (e.g., a top portion) of the additional information.

FIG. 4Q also illustrates that a downward gesture 419 (e.g., a downward swipe gesture or a downward pan gesture that starts on icon 434 or an activation region for icon 434) is detected while the additional information is displayed. Alternatively, FIG. 4Q also illustrates that a downward gesture 441 (e.g., a downward swipe gesture or a downward pan gesture that starts on the additional information, but away from icon 434 or an activation region for icon 434) is detected while the additional information is displayed.

Figure 4R:
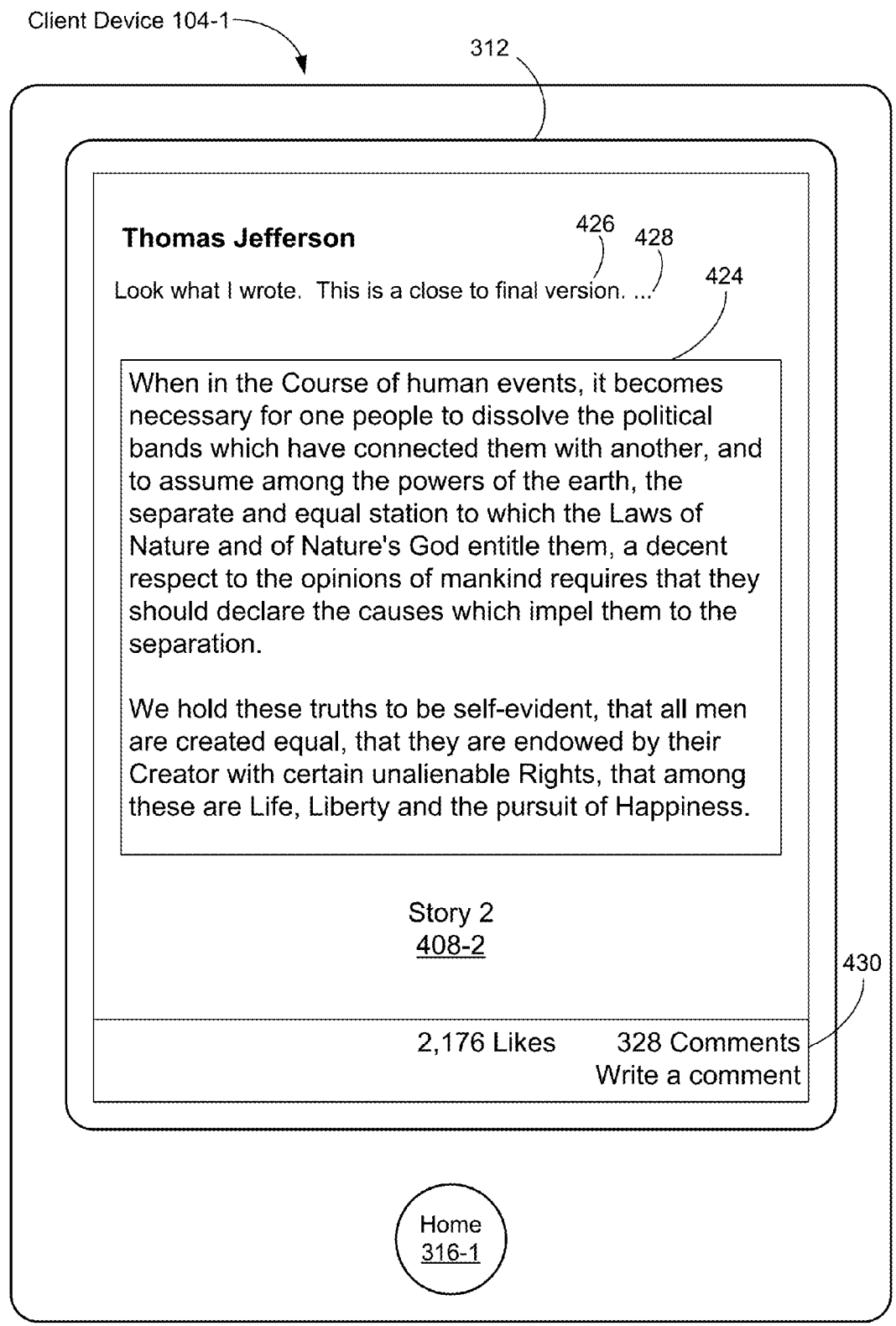

FIG. 4R illustrates that, in response to detecting the downward gesture 419, the full-screen-width display 432 of the additional information (FIG. 4Q) is replaced with the user interface that includes the user interface icon 424. In some embodiments, an animation in which the full-screen-width display 432 of the additional information shrinks, closes, and/or folds, to become the user interface icon 424 is displayed in replacing the full-screen-width display 432 of the additional information with the user interface that includes the user interface icon 424.

If gesture 441 was detected in FIG. 4Q, instead of gesture 419, then the additional information would be scrolled (not shown) instead of ceasing to show the additional information. Thus, depending on where the swipe or pan gesture is applied to the additional information, the additional information either scrolls or ceases to be displayed. This provides an easy way to navigate with swipe or pan gestures within the application.

FIGS. 4S-4X illustrate exemplary user interfaces associated with a photo view mode in accordance with some embodiments.

Figure 4S:
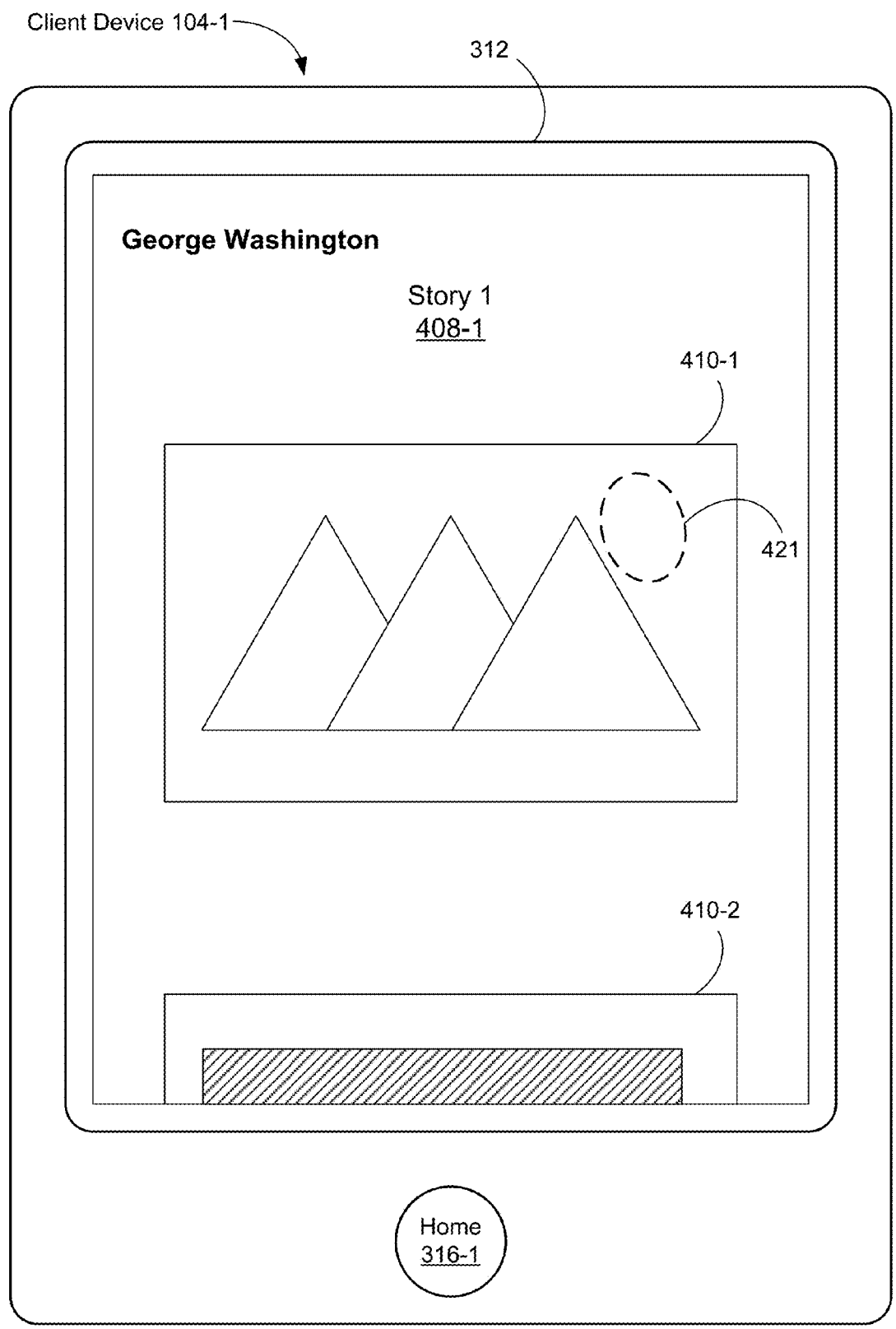

FIG. 4S illustrates that a touch input 421 (e.g., a tap gesture) is detected at a location on the touch-sensitive surface that corresponds to a photo 410-1 in the full-screen-width image 408-1 on the display 312.

Figure 4T:
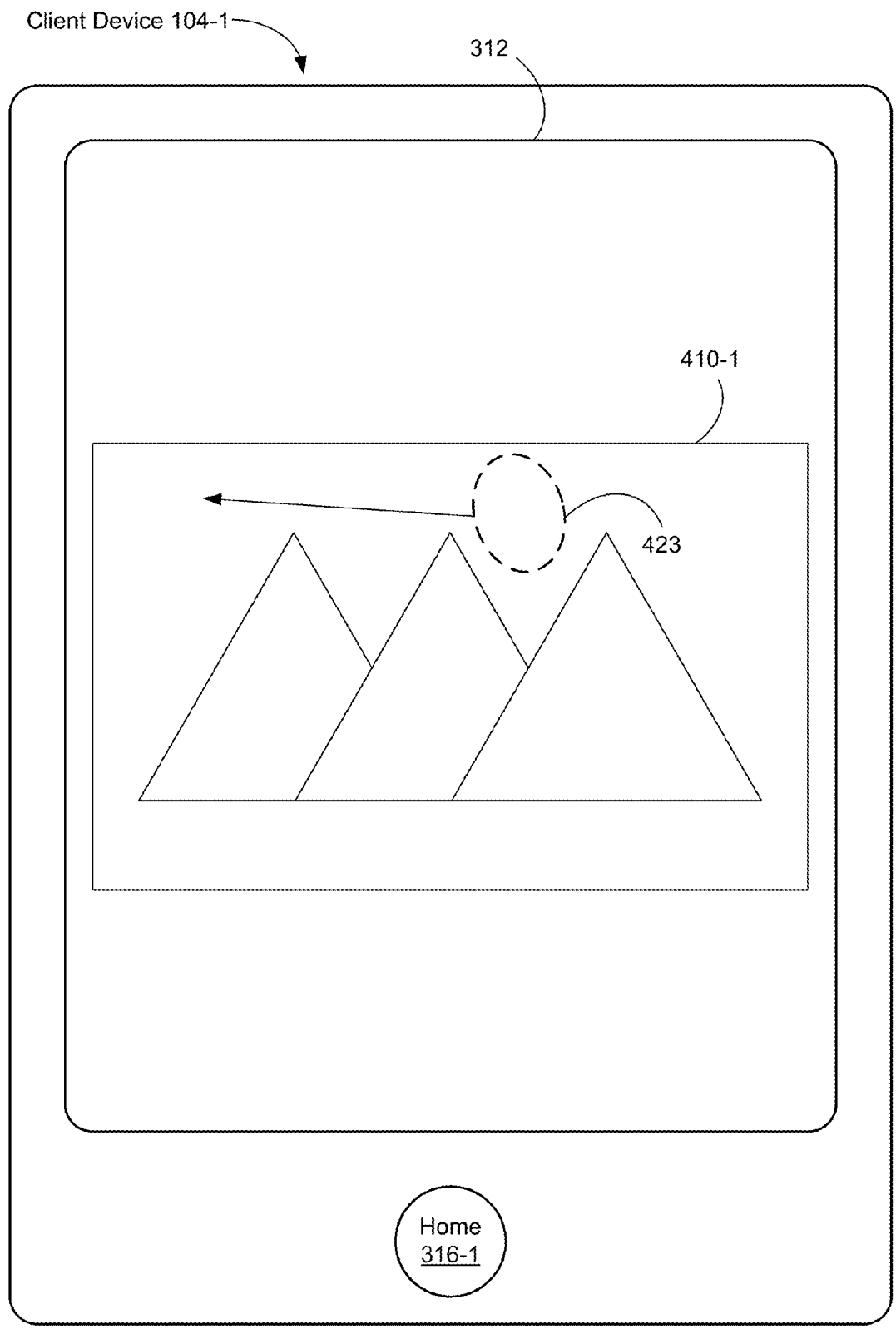

FIG. 4T illustrates that, in response to detecting the touch input 421, the photo 410-1 is displayed in a photo view mode. In FIG. 4T, the photo 410-1 is displayed without any other photo or text in the full-screen-width image 408-1. In FIG. 4T, a width of the photo 410-1 corresponds substantially to a full width of the display 312 (e.g., the width of the photo 410-1 corresponds 70, 75, 80, 90 or 95 percent or more of the full width of the display 312). As used herein, a user interface that includes a full-screen-width image of a single photo is called a photo view.

Figure 4U:
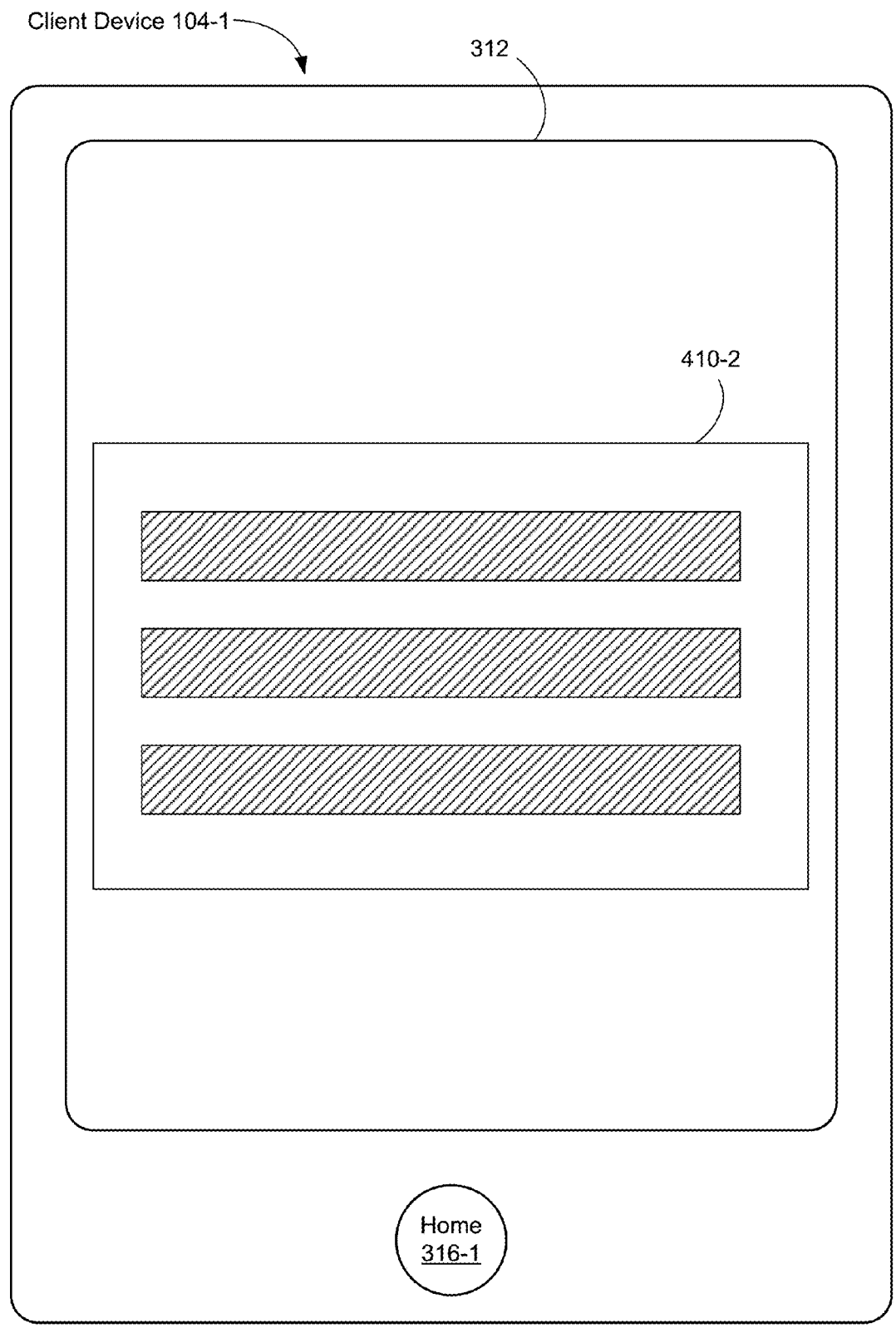

FIGS. 4T-4U illustrate exemplary user interfaces associated with a horizontal pan gesture on a photo in a photo view in accordance with some embodiments.

FIG. 4T illustrates that a horizontal pan gesture 423 (e.g., a leftward pan gesture) is detected at a location on the touch-sensitive surface that corresponds to the photo 410-1.

FIG. 4U illustrates that, in response to the horizontal pan gesture 423, the photo 410-1 is replaced with the photo 410-2. In some embodiments, in Story 2, the photo 410-1 and the photo 410-2 are adjacent to each other in a sequence of photos (e.g., the photo 410-1 and the photo 410-2 are displayed adjacent to each other in FIG. 4S). In some embodiments, the photo 410-2 is subsequent to photo 410-1 in the sequence of photos.

Figure 4V:
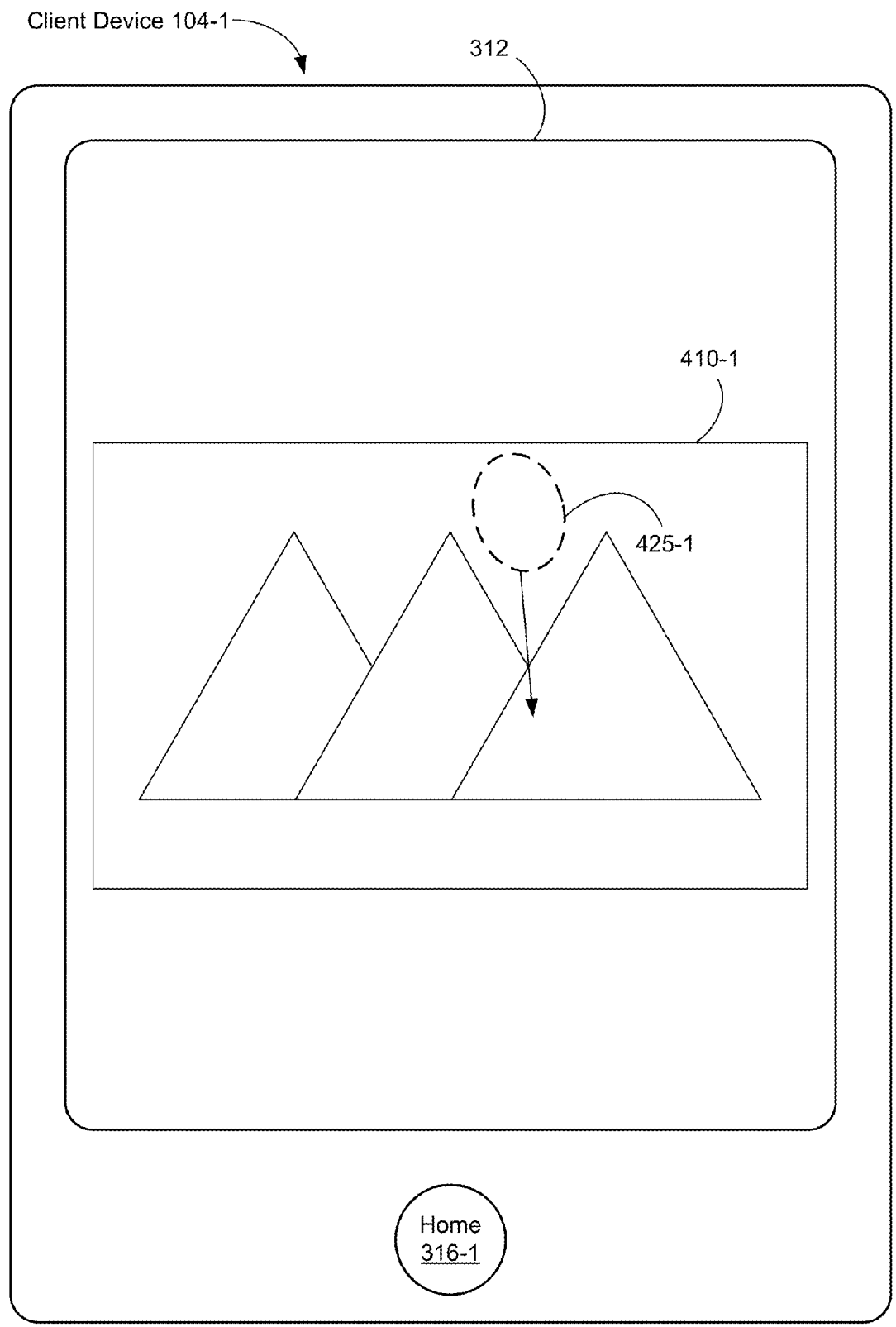
Figure 4W:
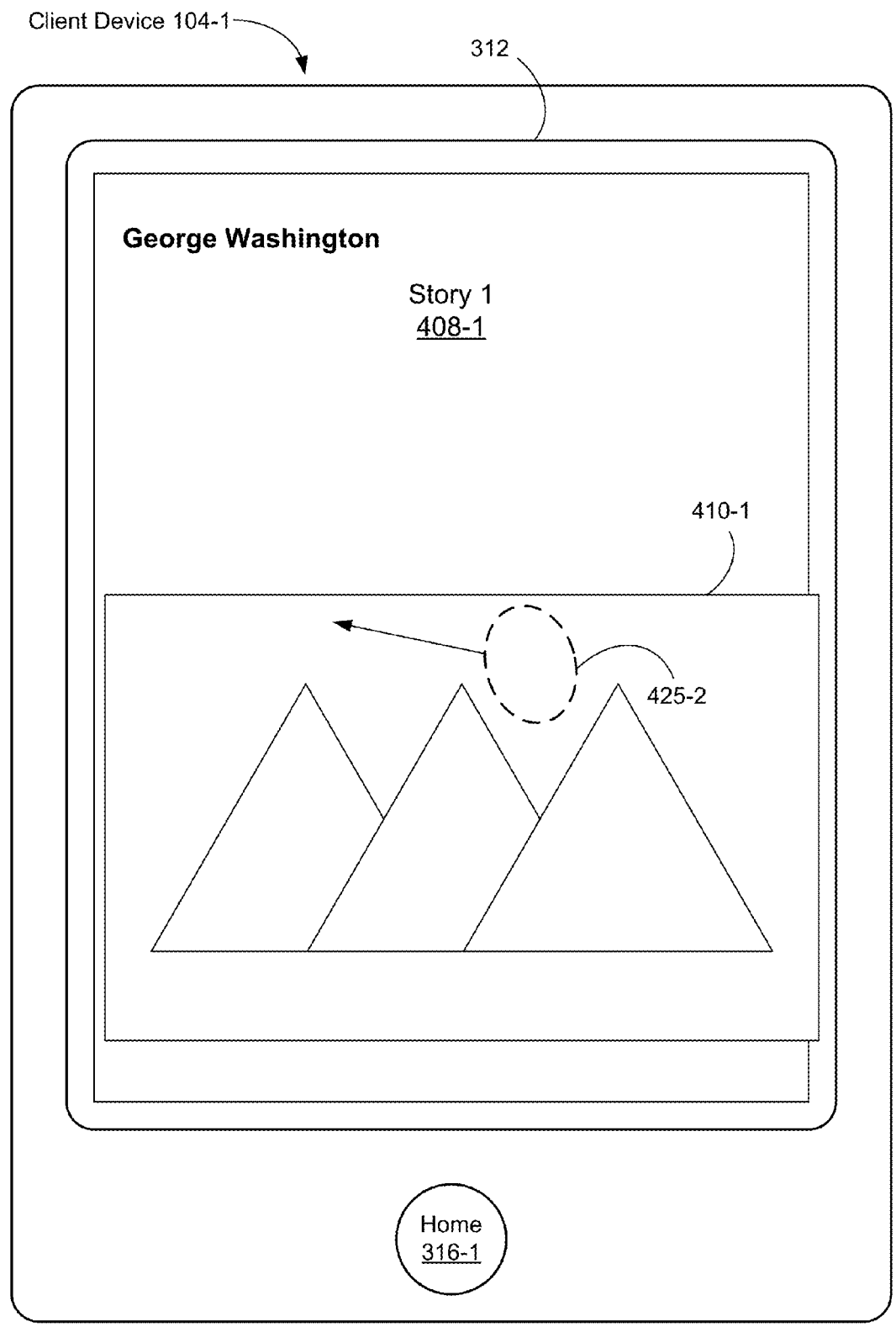
Figure 4X:
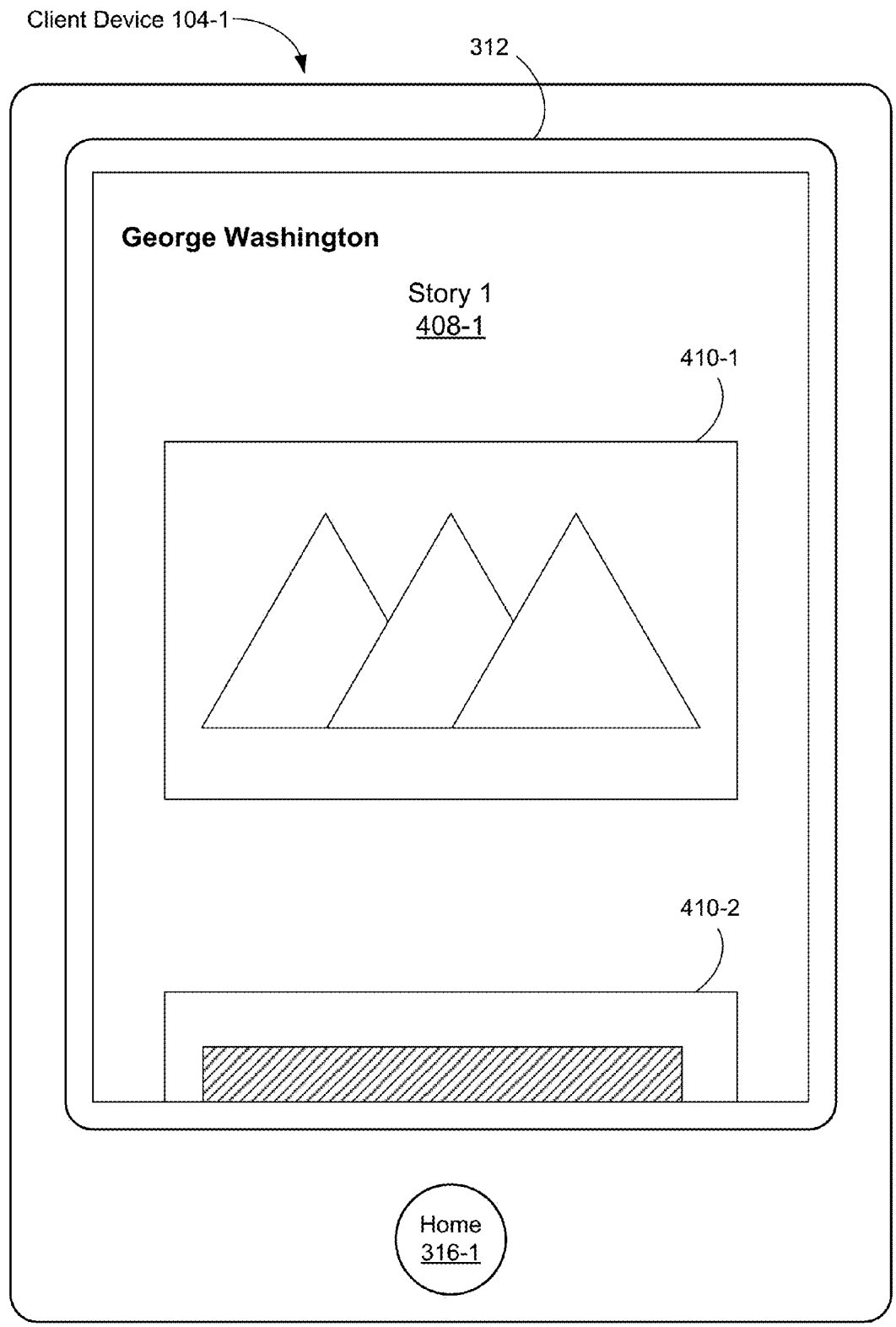

FIGS. 4V-4X illustrate exemplary user interfaces associated with an initially vertical pan gesture on a photo in a photo view that changes direction in accordance with some embodiments.

FIG. 4V illustrates that an initially vertical pan gesture 425 (e.g., a downward pan gesture that is vertical or substantially vertical) is detected at a location 425-1 on the touch-sensitive surface that corresponds to the photo 410-1.

FIG. 4W illustrates that the pan gesture 425 remains in contact with the touch-sensitive surface and has moved to a location 425-2. FIG. 4W also illustrates that, in response to the movement of a touch in the pan gesture from the location 425-1 (FIG. 4V) to the location 425-2 (FIG. 4W), the photo 410-1 moves in accordance with the movement of the touch from the location 425-1 to the location 425-2, and the full-screen-width image 408-1 reappears and is overlaid with the photo 410-1.

In addition, FIG. 4W illustrates that the touch in the pan gesture 425 continues to move on display 312, but changes direction (e.g., from vertical to horizontal or diagonal). In some embodiments, the photo 410-1 moves in accordance with the touch in the pan gesture (e.g., when the touch moves horizontally, the photo 410-1 moves horizontally).

FIG. 4X illustrates that the pan gesture 425 ceases to be detected on the touch-sensitive surface. FIG. 4X also illustrates that, in response to the pan gesture 425 ceasing to be detected on the touch-sensitive surface, the full-screen-width image 408-1 is displayed without an overlay.

Figure 4Y:
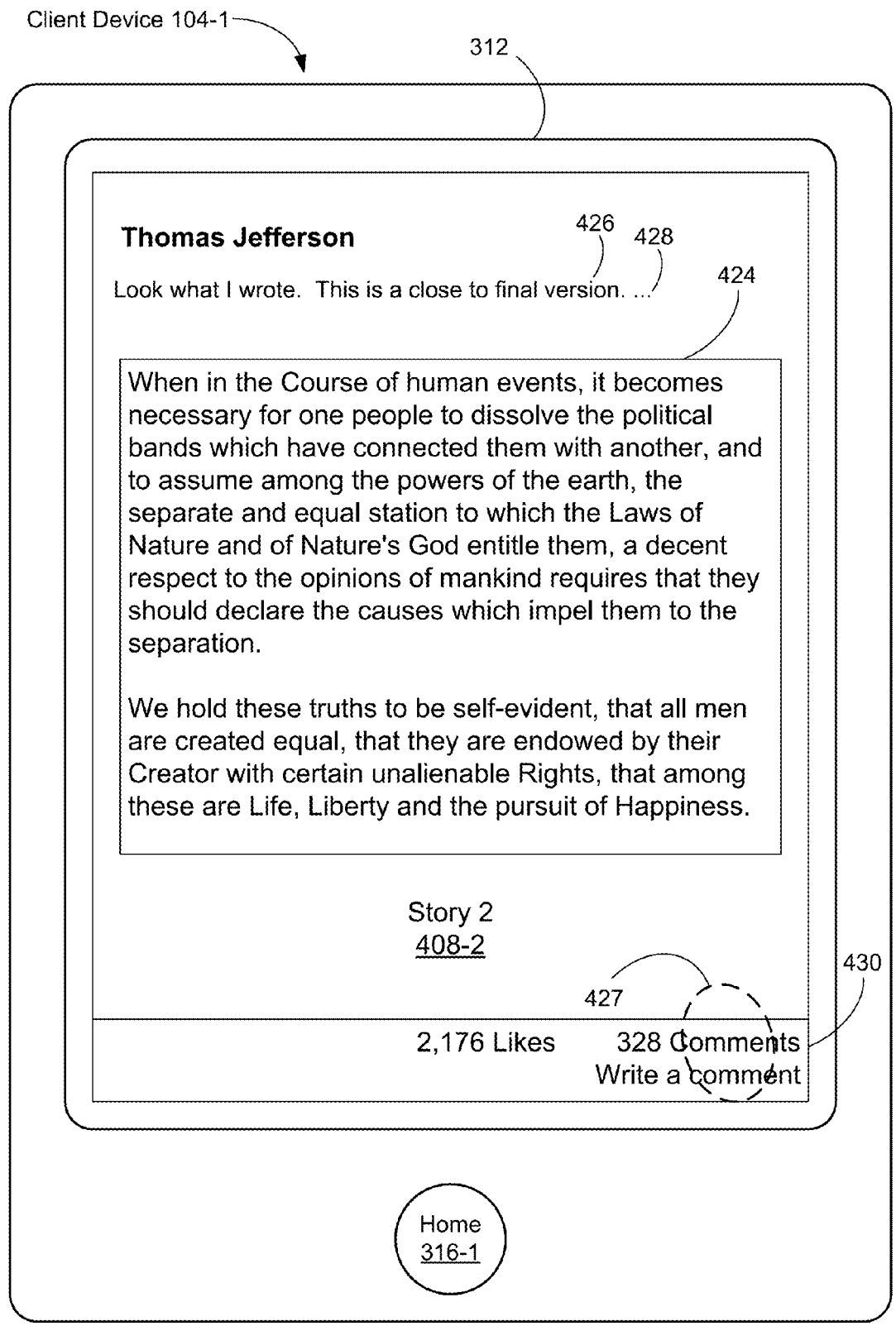

FIGS. 4Y-4CC illustrate exemplary user interfaces associated with a comments popover view in accordance with some embodiments.

FIG. 4Y illustrates that a touch input 427 (e.g., a tap gesture) is detected at a location that corresponds to the user interface icon 430 that includes one or more feedback indicators.

Figure 4Z:
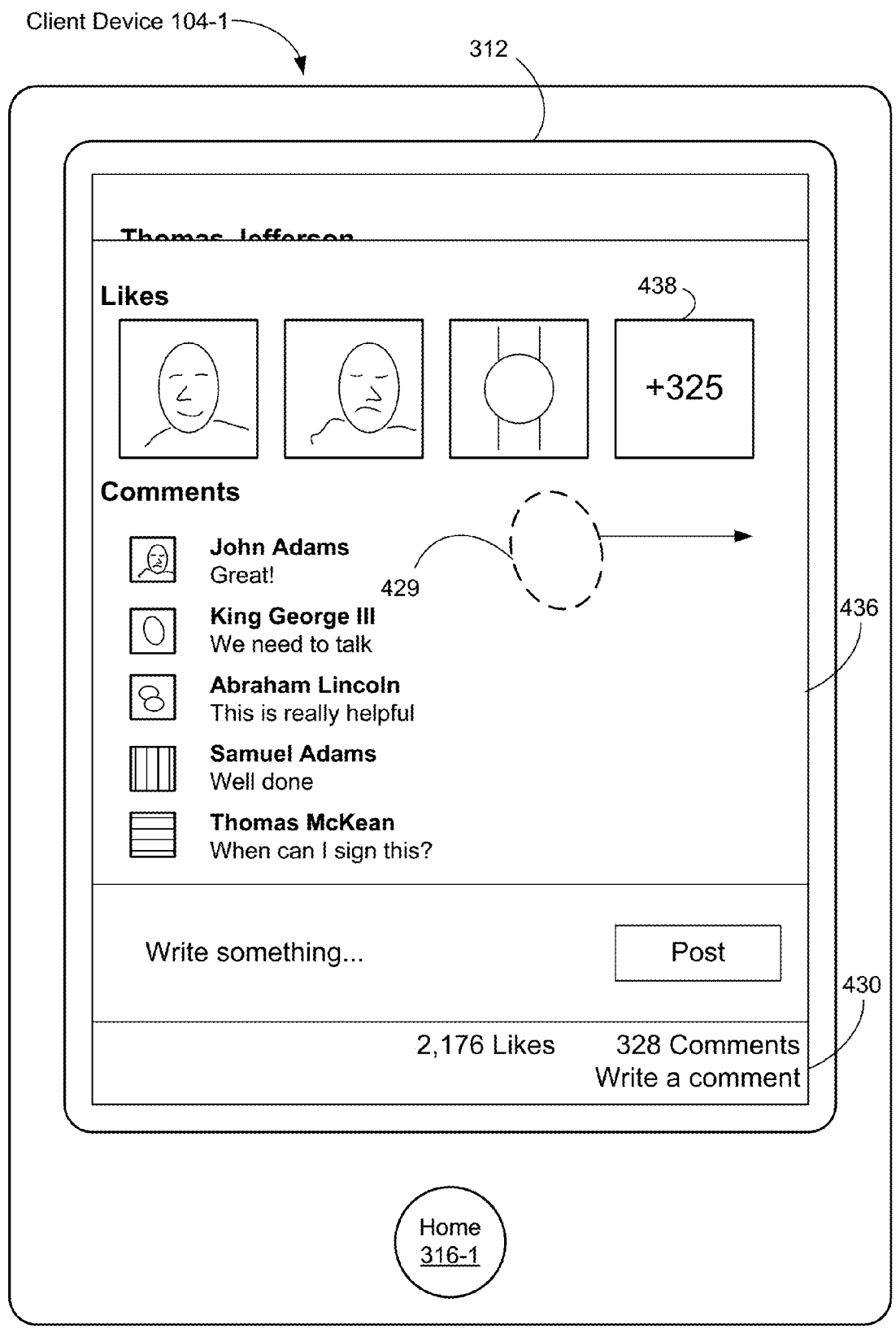
Figure 4A:
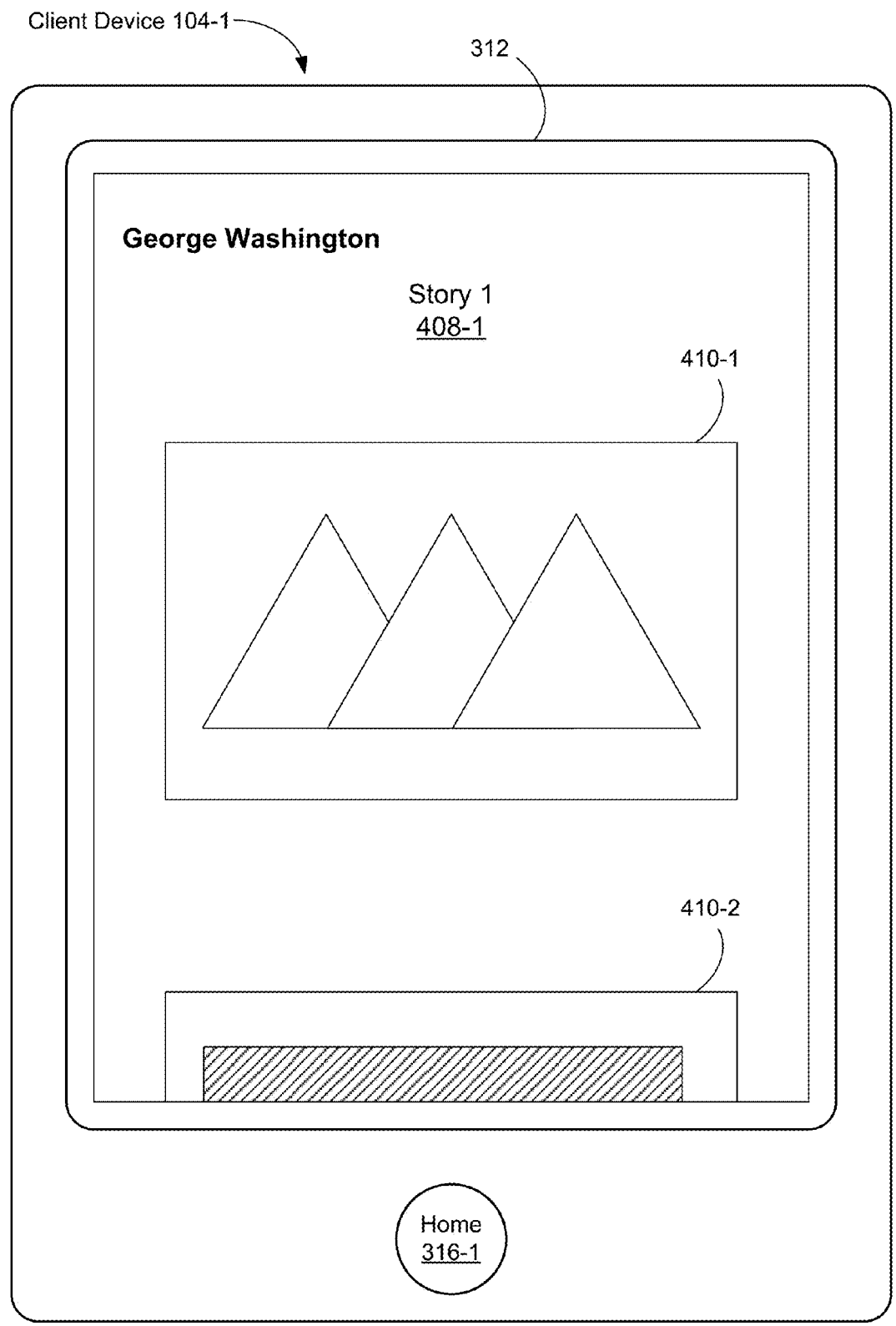
Figure 4B:
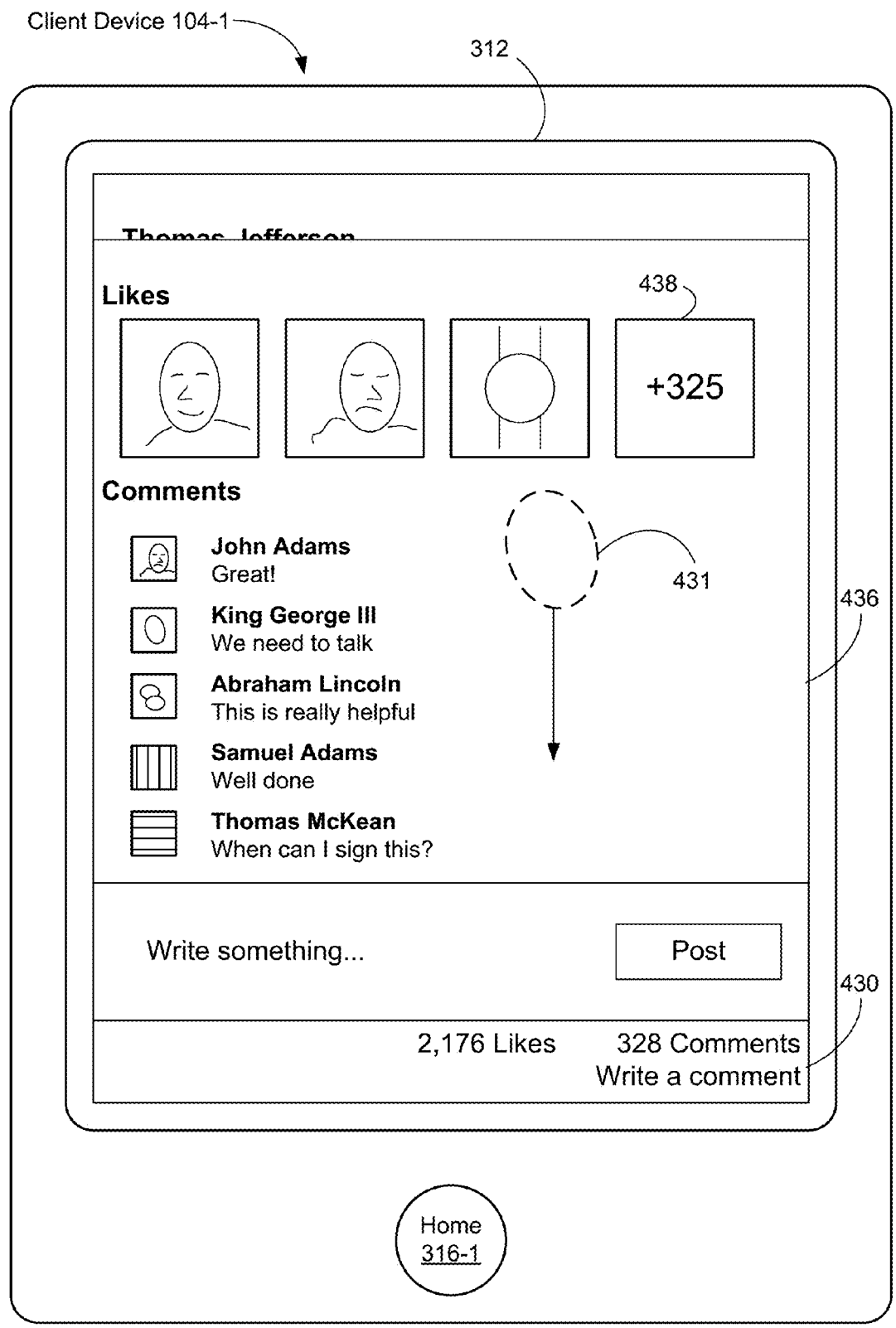
Figure 4C:
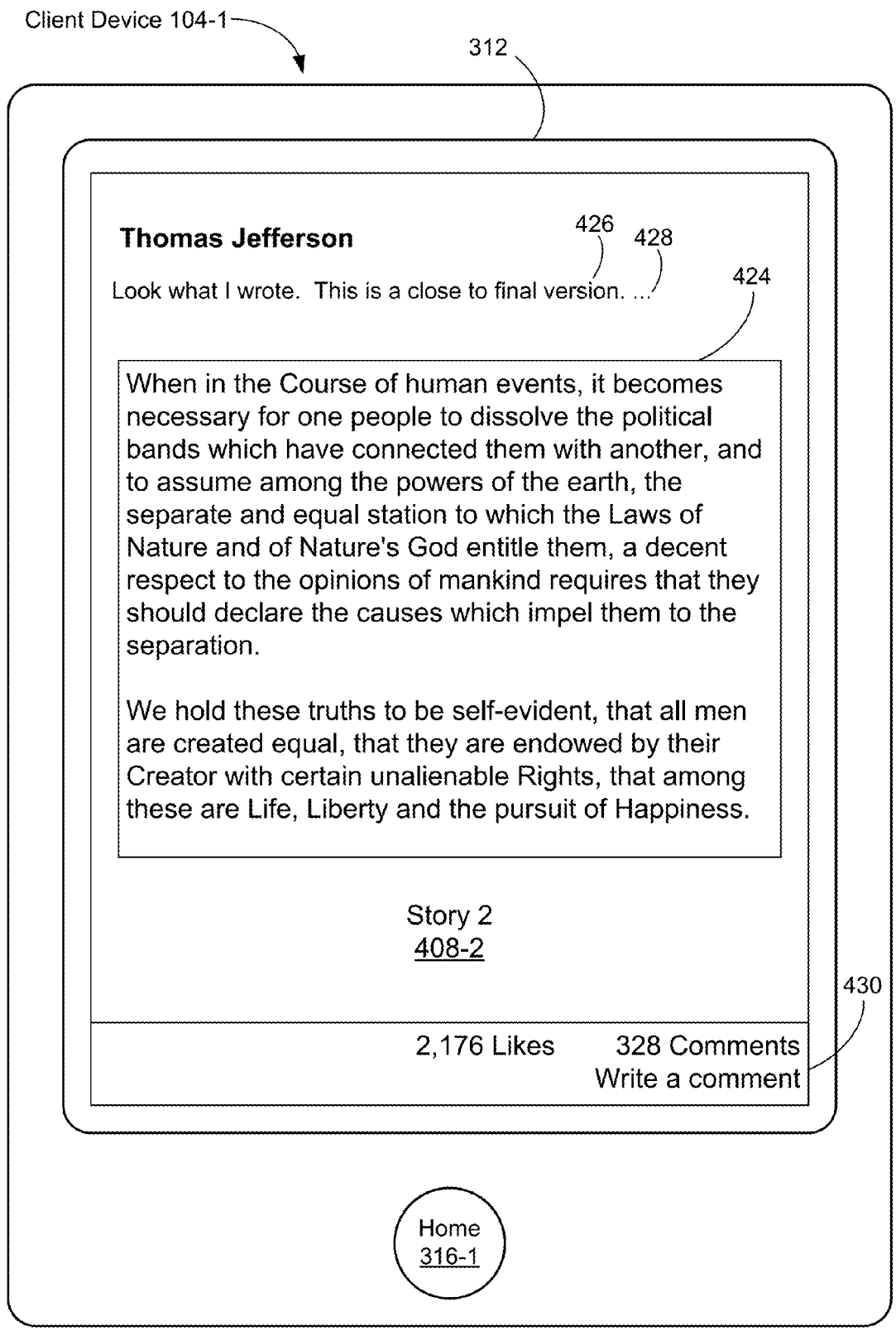

FIG. 4Z illustrates that, in response to detecting the touch input 427, a comments popover view 436 is displayed. In FIG. 4Z, the comments popover view 436 is overlaid over the full-screen-width image 408-2 that corresponds to Story 2 (FIG. 4Y). The comments popover view 436 includes user identifiers (e.g., user photos) that correspond to users who liked Story 2. The comments popover view 436 also includes user identifiers for users, who left comments on Story 2, and their comments on Story 2.

In FIG. 4Z, the comments popover view 436 includes a user interface icon 438 for displaying additional users (who liked Story 2). The user interface icon 438 indicates a number of additional users who liked Story 2. In some embodiments, the user interface icon 438, when selected (e.g., with a tap gesture), initiates rearranging the displayed user identifiers and displaying additional user identifiers that correspond to additional users who liked Story 2. For example, selecting the user interface icon 438 displays an animation in which the horizontally arranged user identifiers are rearranged to a vertically arranged scrollable list of user identifiers.

FIG. 4Z also illustrates that a horizontal gesture 429 (e.g., a rightward pan gesture or a rightward swipe gesture) is detected at a location on the touch-sensitive surface that corresponds to the comments popover view 436.

FIG. 4AA illustrates that, in response to the horizontal pan gesture 429, the display of the full-screen-width image 408-2 overlaid by the comments popover view 436 is replaced with the full-screen-width image 408-1.

FIG. 4BB illustrates that a vertical gesture 431 (e.g., a downward pan gesture or a downward swipe gesture) is detected at a location on the touch-sensitive surface that corresponds to the comments popover view 436.

FIG. 4CC illustrates that, in response to the vertical pan gesture 431, the comments popover view 436 ceases to be displayed, and the full-screen-width image 408-2 is displayed without an overlay. Alternatively or additionally, a touch input (e.g., a tap gesture) on the touch-sensitive surface at a location that does not correspond to the comments popover view 436 causes the popover view 436 to cease to be displayed, and initiates display of the full-screen-width image 408-2 without an overlay.

FIG. 5A is a diagram illustrating an exemplary hierarchy of content items in accordance with some embodiments.

Content items shown in FIG. 5A include parent content items, such as Parent 1 and Parent 2, at the same hierarchical level in the hierarchy of content items. The content items may include additional content items (e.g., parent 3, not shown) at the same hierarchical level as Parent 1 and Parent 2 in the hierarchy of content items.

Parent 1 has child content items, such as Child 1, Child 2, Child 3, and Child 4. Parent 1 may have additional child content items at the same hierarchical level as Child 1, Child 2, Child 3, and Child 4 in the hierarchy of content items. The child content items of Parent 1 are located on the same hierarchical level in the hierarchy of content items, which is immediately below the hierarchical level of Parent 1. Similarly, Parent 2 has child content items, such as Child 5, Child 6, and Child 7.

One or more child content items of a parent content item optionally have their own child content items. For example, FIG. 5A illustrates that Child 1 has its own child content items, such as Grand Child 1 and Grand Child 2 (also called herein "grandchild content items" of a parent content item). Grandchild content items are located on the same hierarchical level in the hierarchy of content items, which is immediately below the hierarchical level of Child 1, Child 2, Child 3, and Child 4 and two levels below the hierarchical level of Parent 1.

In FIG. 5A, the content items have three hierarchical levels (e.g., a parent content item level, a child content item level, and a grandchild content item level). In some embodiments, the content items have just two hierarchical levels (e.g., a parent content item level and a child content item level).

FIG. 5B is a diagram illustrating an exemplary hierarchy of content items in accordance with some embodiments.

FIG. 5B is similar to FIG. 5A. In FIG. 5B, content items include content sections, such as Section 1 and Section 2, at the parent content item level. Each of the content section items corresponds to a content section (e.g., social network content, news headlines, technology, business, etc.).

Content items in FIG. 5B also include stories, such as Story 1 through Story 7 at the child content item level.

In some embodiments, content items in FIG. 5B further include photos, such as Photo 1 and Photo 2, at the grandchild content item level.

FIGS. 5C and 5D together illustrate differences between discrete gesture recognizers and continuous gesture recognizers in accordance with some embodiments. As stated below, certain differences between discrete gesture recognizers and continuous gesture recognizers can be described with respect to their state transitions.

FIG. 5C illustrates an exemplary state machine for discrete gesture recognizers in accordance with some embodiments. Discrete gesture recognizers are typically used to detect a single discrete gesture (e.g., within a short distance, such as an inch or less, or during a short time period, such as 0.1, 0.2, 0.3, 0.4, 0.5, 0.6, 0.7, 0.8, or 0.9 second).

A discrete gesture recognizer is in a "Possible" state before a touch gesture is detected on a touch-sensitive surface.

Once a touch gesture is detected, the discrete gesture recognizer enters a "Recognized" state in accordance with a determination that the detected touch gesture matches a touch gesture that the discrete gesture recognizer is configured to recognize (e.g., a tap gesture, a right swipe gesture, or a double tap gesture). In some embodiments, the discrete gesture recognizer sends an action message to a target object (e.g., a view controller of a view associated with the discrete gesture recognizer) in association with entering the "Recognized" state (e.g., upon entering the "Recognized" state or immediately before or after entering the "Recognized" state). An action message indicates that the discrete gesture recognizer has recognized the detected touch gesture. In some embodiments, the action message includes information about the detected touch gesture (e.g., a coordinate of the detected touch gesture on the touch-sensitive surface, a number of contacts, etc.).

The discrete gesture recognizer enters a "Failed" state in accordance with a determination that the detected touch gesture does not match the touch gesture that the discrete gesture recognizer is configured to recognize (e.g., the detected touch gesture is a tap gesture when the discrete gesture recognizer is configured to recognize a double tap gesture or the detected touch gesture is a pan gesture when the discrete gesture recognizer is configured to recognize a tap gesture).

In some embodiments, the discrete gesture recognizer is reset (e.g., the state of the discrete gesture recognizer is set to the "Possible" state). This allows the discrete gesture recognizer to recognize a subsequent touch gesture (if the subsequent touch gesture matches the touch gesture that the discrete gesture recognizer is configured to recognize). In some embodiments, all gesture recognizers (including the discrete gesture recognizer) are reset when no touch is detected on a touch-sensitive surface.

FIG. 5D illustrates an exemplary state machine for continuous gesture recognizers in accordance with some embodiments. Continuous gesture recognizers are typically used to detect a continuous gesture (e.g., a pan gesture that remain on a touch-sensitive surface for at least a predefined time period, such as 0.4, 0.5, 0.6, 0.7, 0.8, or 0.9 seconds, or more).

A continuous gesture recognizer is in a "Possible" state before a touch gesture is detected on a touch-sensitive surface.

Once a touch gesture is detected, the continuous gesture recognizer enters a "Failed" state in accordance with a determination that the detected touch gesture (or at least a detected initial portion of the touch gesture) does not match a touch gesture that the continuous gesture recognizer is configured to recognize. For example, the continuous gesture recognizer enters the "Failed" state if the detected touch gesture is a discrete gesture, such as a tap gesture, a double tap gesture, or a swipe gesture (which is not a continuous gesture), or a continuous gesture other than the continuous gesture that the continuous gesture recognizer is configured to recognize (e.g., a vertical pan gesture when the continuous gesture recognizer is configured to recognize a horizontal pan gesture, or a horizontal pan gesture when the continuous gesture recognizer is configured to recognize a vertical pan gesture).

The continuous gesture recognizer enters a "Began" state in accordance with a determination that the detected touch gesture (or at least the detected initial portion of the touch gesture) matches the touch gesture that the continuous gesture recognizer is configured to recognize (e.g., a pinch gesture, a depinch gesture, a rotation gesture or a pan gesture). In some embodiments, the continuous gesture recognizer sends an action message to a target object (e.g., a view controller of a view associated with the discrete gesture recognizer) in association with entering the "Began" state (e.g., upon entering the "Began" state or immediately before or after entering the "Began" state).

After the continuous gesture recognize is in the "Began" state, the continuous gesture recognizer enters a "Changed" state in accordance with a determination that a movement in the touch gesture is detected. For example, when a touch in a pan gesture moves across the touch-sensitive surface, the continuous gesture recognizer enters the "Changed" state. In some embodiments, the continuous gesture recognizer sends an action message to the target object in association with entering the "Changed" state (e.g., upon entering the "Changed" state).

In some embodiments, the continuous gesture recognizer re-enters the "Changed" state (or remains in the "Changed" state) in accordance with a determination that a further movement in the touch gesture is detected. In some embodiments, the continuous gesture recognizer sends another action message to the target object in association with detecting the further movement in the touch gesture. In some embodiments, the continuous gesture recognizer repeats re-entering (or remains in) the "Changed" state as the touch gesture continues to move.

From the "Changed" state, the continuous gesture recognizer enters a "Recognized" state in accordance with a determination that the touch gesture ceases to be detected. Alternatively, in some embodiments, from the "Changed" state, the continuous gesture recognizer enters the "Recognized" state in accordance with a determination that the detected touch gesture in its entirety matches the touch gesture that the continuous gesture recognizer is configured to recognize. In some embodiments, the determination that the detected touch gesture in its entirety matches the touch gesture that the continuous gesture recognizer is configured to recognize is made when the touch gesture ceases to be detected on the touch-sensitive surface (e.g., the touch gesture has been released from the touch-sensitive surface). In some embodiments, the continuous gesture recognizer sends an action message, indicating that the continuous gesture recognizer has recognized the detected touch gesture, to the target object in association with entering the "Recognized" state.

In some embodiments, the continuous gesture recognizer enters the "Recognized" state directly from the "Began" state without entering the "Changed" state. For example, a gesture recognizer for a hold-and-release gesture enters the "Began" state when a touch is detected on the touch-sensitive surface for a predefined time period or more (e.g., a hold gesture). When the hold-and-release gesture does not include a lateral movement of the touch across the touch-sensitive surface, the gesture recognizer does not enter the "Changed" state. The gesture recognizer enters the "Recognized" state from the "Began" state when the touch is released from the touch-sensitive surface.

Alternatively, from the "Changed" state, the continuous gesture recognizer enters a "Canceled" state in accordance with a determination that the detected touch gesture no longer matches the touch gesture that the continuous gesture recognizer is configured to recognize. In some embodiments, from the "Changed" state, the continuous gesture recognizer enters the "Canceled" state in accordance with a determination that an electronic device (e.g., client device 104), which detects the touch gesture, has initiated a cancellation of the touch gesture. For example, the electronic device cancels processing of the touch gesture by a particular gesture recognizer to allow another gesture recognizer to process the touch gesture.

In some embodiments, an electronic device (e.g., client device 104) determines whether a detected touch gesture is a continuous gesture in accordance with a contact time of the detected touch gesture. For example, the electronic device determines that the detected touch gesture is a continuous gesture when the touch gesture has been detected on a touch-sensitive surface for a predefined time period (e.g., 0.3, 0.4, 0.5, 0.6, 0.7, 0.8, or 0.9 seconds) or more. In another example, the electronic device determines that the detected touch gesture is a discrete gesture when the touch gesture has been detected on a touch-sensitive surface for less than the predefined time period.

FIGS. 6A-6E are flow diagrams illustrating a method 600 of processing touch-based gestures on an electronic device, such as a client device 104, in accordance with some embodiments. The method identifies directional pan gestures and increases accuracy in gesture recognition, thereby reducing errors, increasing efficiency, increasing the device responsiveness, and improving the user experience.

FIGS. 6A-6E correspond to instructions stored in a computer memory or computer readable storage medium (e.g., memory 306). The computer memory or computer readable storage medium stores one or more programs.

The device displays (602) a first user interface of a software application (e.g., the user interface shown in FIGS. 4A and 4C). The software application has a hierarchy of user interfaces (e.g., a view hierarchy of section images and story thumbnails). The first user interface is associated with at least a first pan gesture recognizer and a second pan gesture recognizer (e.g., a pan gesture recognizer 346-1 and a pan gesture recognizer 346-2, FIG. 3). The first pan gesture recognizer (e.g., a horizontal pan gesture recognizer) is configured to recognize a pan gesture that has an initial direction along a first axis (e.g., a horizontal axis) on the touch-sensitive surface in a plurality of predefined axes (e.g., a horizontal axis and a vertical axis) and/or a first direction (e.g., left or right) on the touch-sensitive surface in a plurality of predefined directions (e.g., left, right, up, and down). The second pan gesture recognizer (e.g., a vertical pan gesture recognizer) is configured to recognize a pan gesture that has an initial direction along a second axis (e.g., a vertical axis) on the touch-sensitive surface in the plurality of predefined axes and/or a second direction (e.g., upward or downward) on the touch-sensitive surface distinct from the first direction, in the plurality of predefined directions.

As used herein, a pan gesture refers to a continuous touch gesture that is detected on the touch-sensitive surface over at least a predefined time interval. In some embodiments, a pan gesture includes a touch-down event, multiple touch-moved events, and a touch-up event. As used herein, a pan gesture is distinct from a swipe gesture because a pan gesture is a continuous gesture, whereas a swipe gesture is a discrete gesture. A pan gesture, being continuous, causes a pan gesture recognizer to keep sending action messages (e.g., touch-moved events) until the pan gesture ends. In contrast, a swipe gesture, being discrete, causes a swipe gesture recognizer to send a single action message (e.g., an action message indicating that the swipe gesture has been "Recognized"). Thus, a swipe gesture recognizer does not provide an action message that indicates changes in a direction of a detected touch gesture.

In some embodiments, the plurality of predefined axes includes a vertical axis on the touch-sensitive surface and a horizontal axis on the touch-sensitive surface. In some embodiments, the touch-sensitive surface is on the display; in other words, the display is a touch-sensitive display. In some embodiments, the plurality of predefined directions includes left, right, up, and down.

As used herein, an initial direction refers to a representative (e.g., average) direction of translation of a touch within a predefined distance and/or within a predefined time after initial contact of the touch with the touch-sensitive surface. In some embodiments, the initial direction is determined based on a measured initial movement of a touch across the touch-sensitive surface. In some embodiments, the initial direction is determined based on a measured velocity of the touch across the touch-sensitive surface. In some embodiments, the initial direction is determined based on both the measured initial movement and the measured velocity.

In some embodiments, the first pan gesture recognizer is configured to recognize (604) a pan gesture that has an initial direction along the first axis and the second pan gesture recognizer is configured to recognize a pan gesture that has an initial direction along the second axis, distinct from the first axis. In other words, in some embodiments, the first pan gesture recognizer and the second pan gesture recognizer are constrained to recognize pan gestures along different axes. In some embodiments, the second axis is perpendicular to the first axis. For example, the first pan gesture recognizer is configured to recognize a pan gesture that has an initial direction along a horizontal axis (e.g., a left pan gesture or a right pan gesture) and the second pan gesture recognizer is configured to recognize a pan gesture that has an initial direction along a vertical axis (e.g., an upward pan gesture or a downward pan gesture).

In some embodiments, the first pan gesture recognizer is configured to recognize (606) a pan gesture that has an initial direction along the first direction and the second pan gesture recognizer is configured to recognize a pan gesture that has an initial direction along the second direction, distinct from the first direction. In other words, in some embodiments, the first pan gesture recognizer and the second pan gesture recognizer are constrained to recognize pan gestures along different directions. For example, the first pan gesture recognizer is configured to recognize a pan gesture that has an initial upward direction and the second pan gesture recognizer is configured to recognize a pan gesture that has an initial downward direction. In another example, the first pan gesture recognizer is configured to recognize a pan gesture that has an initial upward direction and the second pan gesture recognizer is configured to recognize a pan gesture that has an initial rightward direction. However, the first pan gesture recognizer that is configured to recognize a pan gesture that has an initial upward direction does not recognize a pan gesture that has an initial downward direction. Similarly, the second pan gesture recognizer that is configured to recognize a pan gesture that has an initial rightward direction does not recognize a pan gesture that has an initial leftward direction.

In some embodiments, the first user interface includes (608) a plurality of views; and the first pan gesture recognizer and the second pan gesture recognizer are attached to a same view of the plurality of views. For example, a horizontal pan gesture recognizer and a vertical pan gesture recognizer are attached to a particular view so that both a horizontal pan gesture and a vertical pan gesture on the particular view can be recognized (e.g., a horizontal pan gesture 409 on a section image 404-1 in FIGS. 4F-4G and a vertical pan gesture 411 on the section image 404-1 in FIGS. 4H-4I). In some embodiments, all pan gesture recognizers of the software application are attached to a same view.

In some embodiments, the first user interface includes (610) a plurality of views; and the first pan gesture recognizer is attached to a first view of the plurality of views and the second pan gesture recognizer is attached to a second view of the plurality of views, distinct from the first view. For example, a horizontal pan gesture recognizer is attached to the section image 404-1 to recognize a horizontal pan gesture 409 as illustrated in FIGS. 4F-4G and a vertical pan gesture recognizer is attached to a thumbnail image 406-1 to recognize a vertical pan gesture as illustrated in FIGS. 4C-4E.

The device detects (612) a first pan gesture (e.g., a horizontal pan gesture 409, FIG. 4F) on the touch-sensitive surface while displaying the first user interface. The first pan gesture has an initial direction (e.g., leftward) across the touch-sensitive surface.

The device, while detecting the first pan gesture on the touch-sensitive surface, identifies (614), between the first pan gesture recognizer and the second pan gesture recognizer, a pan gesture recognizer that is configured to recognize the first pan gesture based at least on the initial direction of the first pan gesture. For example, the device identifies that, between a horizontal pan gesture recognizer and a vertical pan gesture recognizer, the horizontal pan gesture recognizer is configured to recognize the horizontal pan gesture 409.

The device processes (616) the first pan gesture using the identified pan gesture recognizer. For example, the horizontal pan gesture recognizer recognizes the horizontal pan gesture 409 and sends an action message to initiate a change to the user interface (e.g., the section images and associated story thumbnail images are replaced, FIGS. 4F-4G).

In some embodiments, after identifying the pan gesture recognizer that is configured to recognize the first pan gesture, the device detects (618) a movement, of the first pan gesture across the touch-sensitive surface, that is perpendicular to the initial direction (e.g., when the initial direction is vertical, a subsequent movement is horizontal or diagonal so that the subsequent movement includes a horizontal movement). Processing the first pan gesture includes processing the movement, of the first pan gesture, that is perpendicular to the initial direction using the identified pan gesture recognizer. In some embodiments, processing the first pan gesture includes moving a user interface element in accordance with a movement of the first pan gesture that is perpendicular to the initial direction. For example, in FIGS. 4L-4N, after an initial downward movement of a touch from the location 415-1, the touch continues to move in a diagonal direction and thumbnail images 406-1 and 406-2 are scrolled horizontally in accordance with a horizontal movement of the touch.

In some embodiments, the first pan gesture recognizer has (620) a tolerance value (e.g., threshold angle, a threshold ratio of a horizontal movement to a vertical movement, or a threshold distance in a perpendicular direction). The device determines whether a component of an initial movement of the first pan gesture, the component being in a direction perpendicular to the first axis or the first direction, satisfies one or more predefined criteria that are based on the tolerance value (e.g., a vertical component of the initial movement of the first pan gesture is less than the predefined criteria, such as a predefined distance or a predefined angle). For example, as shown in FIG. 4A, for a horizontal gesture recognizer, the device determines whether an angle formed by an initial direction 492 of the horizontal pan gesture 405 and a reference axis 490 (e.g., a horizontal axis) is within an angle formed by a predefined threshold direction 494 and the reference axis 490. The device, in accordance with determining that the component of the initial movement of the first pan gesture satisfies the one or more predefined criteria that are based on the tolerance value, recognizes the first pan gesture with the first pan gesture recognizer. For example, the horizontal gesture recognizer enters the "Began" state (FIG. 5D). Alternatively, in accordance with determining that the component of the initial movement of the first pan gesture does not satisfy the one or more predefined criteria that are based on the tolerance value, the horizontal gesture recognizer enters the "Failed" state (FIG. 5D).

In some embodiments, the software application is configured to access (622) a hierarchy of content items. The hierarchy of content items includes at least a first parent content item (e.g., a content section) and a plurality of child content items of the first parent content item (e.g., stories in the content section). For example, the hierarchy of content items in FIG. 5B includes a content section, Section 1, and child content items under the content section, Story 1, Story 2, Story 3, and Story 4. The first user interface includes a concurrent display of a first image that represents the first parent content item and a first set of thumbnail images that correspond to two or more child content items of the plurality of child content items of the first parent content item (e.g., the image 404-1 that represents Section 1 and thumbnail images 406-1, 406-2, and 406-3 that correspond to stories in Section 1, FIG. 4A). In some embodiments, the first user interface does not concurrently display thumbnail images that correspond to any child content item, other than the two or more child content items, of the plurality of child content items (e.g., not all of the plurality of child content times are displayed). The first pan gesture (e.g., a horizontal pan gesture 405, FIG. 4A) is detected initially at a location, on the touch-sensitive surface, that corresponds to a respective thumbnail image (e.g., a reduced-scale image of a respective child content item) of the first set of thumbnail images. The device determines an initial direction of the first pan gesture. The device, in accordance with a determination that the initial direction of the first pan gesture is horizontal, replaces, using the first pan gesture recognizer, a display of the first set of thumbnail images with a display of a second set of thumbnail images that correspond to two or more child content items of the plurality of child content items (e.g., FIG. 4B). The thumbnail images in the first set are distinct from the thumbnail images in the second set (e.g., story thumbnail images are scrolled). In some embodiments, at least one thumbnail image in the first set is not included in the second set (e.g., the thumbnail image 406-1 in FIG. 4A is not shown in FIG. 4B). In some embodiments, at least one thumbnail image in the second set is not included in the first set (e.g., the thumbnail image 406-4 in FIG. 4B is not shown in FIG. 4A). In some embodiments, the second set of thumbnail images is displayed concurrently with the first parent content item (e.g., in FIG. 4B, the thumbnail images 406-2, 406-3, and 406-4 are displayed concurrently with the image 404-1). In some embodiments, the first set of thumbnail images ceases to be displayed. In some embodiments, the second set of thumbnail images is displayed without displaying any thumbnail image, other than the thumbnail images in the second set, that corresponds to the plurality of child content items (e.g., not all of the thumbnail images that correspond to the plurality of child content items are displayed). On the other hand, in accordance with a determination that the initial direction of the first pan gesture is vertical (e.g., up), the device replaces, using the second pan gesture recognizer, the first user interface with a second user interface that includes at least a portion of a child content item that corresponds to the respective thumbnail image (e.g., a story corresponding to the selected thumbnail image is displayed). For example, in accordance with a determination that the initial direction of a pan gesture in FIG. 4C is vertical (rather than horizontal, as in FIG. 4A), the user interface in FIG. 4C is replaced with the user interface in FIG. 4E. In some embodiments, the first user interface ceases to be displayed (e.g., the user interface in FIG. 4C is not shown in FIG. 4E). In some embodiments, the second user interface is displayed without displaying the first image that represents the first parent content item (e.g., the image 404-1 is not shown in FIG. 4E). In some embodiments, the second user interface is displayed without displaying any child content item of the parent content item other than the child content item that corresponds to the respective thumbnail image (e.g., no other thumbnail images are displayed). In some embodiments, the device displays an animation that transitions the respective thumbnail image in the first user interface to the corresponding child content item in the second user interface (e.g., by moving the respective thumbnail image upward and concurrently expanding the respective thumbnail image to fill the second user interface with the corresponding child content item, such as illustrated in FIGS. 4C-4E). Thus, the respective thumbnail image in the first user interface, which has a reduced scale relative to the corresponding child content item in the second user interface, enlarges and becomes the corresponding child content item in the second user interface (e.g., FIGS. 4C-4E).

In some embodiments, the hierarchy of content items includes (624) a second parent content item (e.g., Section 2 in FIG. 5B), distinct from the first parent content item, and a plurality of child content items of the second parent content item (e.g., Story 5, Story 6, and Story 7 in FIG. 5B). The device detects a second pan gesture initially at a location, on the touch-sensitive surface, that corresponds to the first image that represents the first parent content it (e.g., the pan gesture 409, FIG. 4F). The device determines an initial direction of the second pan gesture. The device, in accordance with a determination that the initial direction of the second pan gesture is horizontal, replaces the first user interface with a third user interface that includes a concurrent display of a second image that represents the second parent content item and a set of thumbnail images that correspond to two or more child content items of the plurality of child content items of the second parent content item (e.g., the section image is scrolled out and story thumbnail images are scrolled accordingly). For example, in accordance with a determination that the initial direction of the pan gesture 409 is horizontal, the device replaces the user interface in FIG. 4F with the user interface in FIG. 4G. In some embodiments, the first user interface ceases to be displayed. In some embodiments, the third user interface is displayed without displaying the first parent content item or the first image (e.g., in FIG. 4G, the image 404-1 is not displayed). In some embodiments, the third user interface is displayed without displaying thumbnail images that correspond to any child content item of the first parent content item (e.g., in FIG. 4G, the thumbnail images 406-1, 406-2, 406-3, and 406-4 are not displayed). In some embodiments, the second image that represents the second parent content item replaces the first image that represents the first parent content item on the display and the set of thumbnail images that correspond to two or more child content items of the plurality of child content items of the second parent content item replaces the set of thumbnail images that correspond to two or more child content items of the plurality of child content items of the first parent content item on the display. For example, in FIG. 4G, the image 404-2 replaces the image 404-1 in FIG. 4F and the thumbnail images 406-5, 406-6, and 406-7 replace the thumbnail images 406-1, 406-2, and 406-3 in FIG. 4F.

In some embodiments, the first image that represents the first parent content item is selected (626) from images in the plurality of child content items of the first parent content item. For example, in FIG. 4G, the image that represents Section 2 is selected from an image in Story 6, which is a child content item of Section 2.

In some embodiments, the hierarchy of content items includes (628) a second parent content item (e.g., Section 2 in FIG. 5B), distinct from the first parent content item, and a plurality of child content items of the second parent content item (e.g., Story 5, Story 6, and Story 7 in FIG. 5B). The device detects a second pan gesture initially at a location, on the touch-sensitive surface, that corresponds to the first image that represents the first parent content item (e.g., the pan gesture 409, FIG. 4F). The device determines an initial direction of the second pan gesture. The device, in accordance with a determination that the initial direction of the second pan gesture is horizontal, replaces the first user interface with a third user interface that includes a concurrent display of a second image that represents the second parent content item and a set of thumbnail images that correspond to two or more child content items of the plurality of child content items of the second parent content item. For example, in accordance with a determination that the initial direction of the pan gesture 409 (FIG. 4F) is horizontal, the device replaces the user interface in FIG. 4F with the user interface in FIG. 4G. On the other hand, in accordance with a determination that the initial direction of the second pan gesture is vertical (e.g., downward), the device displays a user interface for the software application that includes a search input area (e.g., for searching within the software application). For example, in accordance with a determination that the initial direction of the pan gesture 411 (FIG. 4H) (rather than horizontal gesture 409, FIG. 4F) is downward, the device replaces the user interface in FIG. 4H with the user interface in FIG. 4I. In some embodiments, the first user interface slides down to reveal the user interface with the search input area. In some embodiments, a portion of the first user interface remains displayed (e.g., the portion 422 at the bottom of the display, FIG. 4I) while the user interface with the search input area is displayed, and an input on the portion of the first user interface that remains displayed (e.g., a tap gesture) causes the device to cease to display the user interface with the search input area and redisplay the entire first user interface. For example, a tap gesture on the portion 422 causes the device to cease to display the user interface in FIG. 4I and display the user interface in FIG. 4H. In some embodiments, the user interface includes (in addition to or in place of the search input area): a predefined area (e.g., area 414 with the user name "John Smith" in FIG. 4I) that when activated (e.g., with a tap gesture in the area) initiates display of a home page for a user of the software application; a predefined area (e.g., area 416 with the label "Create Post" in FIG. 4I) that when activated (e.g., with a tap gesture in the area) initiates display of a user interface for posting a message in the software application; a predefined area (e.g., area 418 with the label "Edit Sections" in FIG. 4I) that when activated (e.g., with a tap gesture in the area) initiates display of a user interface for editing the parent content items in the hierarchy of content items that are displayed in the software application; and/or a predefined area (e.g., area 420 with the label "Settings" in FIG. 4I) that when activated (e.g., with a tap gesture in the area) initiates display of a user interface for adjusting settings in the software application.

In some embodiments, the software application is configured to access (630) a hierarchy of content items. The hierarchy of content items includes at least a parent content item (e.g., a content section, such as Section 1, FIG. 5B) and a plurality of child content items of the parent content item (e.g., stories in the content section, such as Story 1, Story 2, Story 3, and Story 4, FIG. 5B). The first user interface includes a display of at least a portion of a first child content item of the plurality of child content items without displaying the parent content item or any child content item, other than the first child content item, of the plurality of child content items (e.g., the user interface in FIG. 4J includes a full-screen-width image 408-1 for Story 1 without an image that corresponds to a parent content item, such as the image 404-1, or a full-screen-width image or a thumbnail image for any other child content item). The device determines the initial direction of the first pan gesture. The device, in accordance with a determination that the initial direction of the first pan gesture is horizontal, replaces, using the first pan gesture recognizer, the first user interface with a second user interface that includes a display of at least a portion of a second child content item without displaying the parent content item or any child content item, other than the second child content item, of the plurality of child content items (e.g., a next story is displayed). For example, in accordance with a determination that the initial direction of the pan gesture 413 (FIG. 4J) is horizontal, the device replaces the user interface in FIG. 4J with the user interface in FIG. 4K. The user interface in FIG. 4K includes a full-screen-width image 408-2 for Story 2 without an image that corresponds to the parent content item (e.g., the image 404-1) or a full-screen-width image or a thumbnail image for any other child content item. In some embodiments, the first user interface ceases to be displayed. On the other hand, in accordance with a determination that the initial direction of the first pan gesture is vertical (e.g., downward), the device replaces, using the second pan gesture recognizer, the first user interface with a third user interface that includes a concurrent display of an image that represents the parent content item and a set of thumbnail images that correspond to two or more child content items of the plurality of child content items of the parent content item (e.g., the device displays the section view, rather than a story view). For example, in accordance with a determination that the initial direction of the pan gesture 415 illustrated in FIGS. 4L-4N is downward (rather than horizontal as for pan gesture 413 in FIG. 4J), the device replaces the user interface in FIG. 4L with the user interface in FIG. 4O. In some embodiments, the device displays an animation that transitions the first child content item in the first user interface to a corresponding thumbnail image in the third user interface (e.g., by moving the first child content item downward and concurrently shrinking the first child content item to the corresponding thumbnail image in the third user interface as illustrated in FIGS. 4L-4N). Thus, the first child content item in the first user interface shrinks and becomes the corresponding thumbnail image in the third user interface, which has a reduced scale relative to the first child content item in the first user interface (e.g., FIGS. 4L-4N).

In some embodiments, the set of thumbnail images includes (632) a first thumbnail image that corresponds to the first child content item. The device, subsequent to the determination that the initial direction of the first pan gesture is vertical, detects a movement, of the first pan gesture across the touch-sensitive surface, that is in a non-vertical direction. For example, the device detects an initially vertical gesture 415 (FIG. 4L) and a subsequent non-vertical (e.g., diagonal) movement of the touch gesture 415 (FIGS. 4M-4N). The device, in response to detecting the movement, of the first pan gesture across the touch-sensitive surface, that is in a non-vertical direction, moves the first thumbnail image in a horizontal direction in accordance with a horizontal movement of the first pan gesture across the touch-sensitive surface (e.g., the device moves the thumbnail image 406-1 horizontally in accordance with a horizontal movement of the pan gesture, FIGS. 4M-4O).

In some embodiments, the device, while displaying the second user interface, detects (634) a touch input on the second child content item (e.g., a tap gesture or a vertically upward swipe gesture on an icon in the second child content item). For example, while displaying the user interface in FIG. 4P, a tap gesture is detected on the user interface icon 424. In some embodiments, the touch input is detected after detecting the first pan gesture and determining that the initial direction of the first pan gesture is horizontal. The device, in response to detecting the touch input on the second child content item, replaces the second user interface with a fourth user interface that provides additional information in the second content item. For example, an animation transforms the icon (e.g., the user interface icon 424) in the second child content item to a user interface that is scrollable (e.g., via vertical pan gestures) to display additional portions of the second child content item (e.g., the user interface in FIG. 4Q). The device, while displaying the fourth user interface, detects a touch input on the second child content item. For example, a vertically downward swipe gesture (e.g., the gesture 419, FIG. 4Q) is detected on a user interface icon in the fourth user interface. The device, in response to detecting the touch input on the second child content item, replaces the fourth user interface (e.g., the user interface in FIG. 4Q) with the second user interface (e.g., the user interface in FIG. 4P). For example, an animation transforms the user interface that is scrollable to display additional portions of the second child content item (e.g., the user interface in FIG. 4Q) back to the icon in the second child content item (e.g., the user interface icon 424 in FIG. 4P). In some embodiments, the fourth user interface includes a user interface icon (e.g., an downward arrow icon 434, FIG. 4Q) that is displayed on top of the second child content item. In some embodiments, the downward arrow icon is displayed on top of the second child content item in response to detecting a downward pan gesture on the second child content item. The device, in response to detecting a touch input on the user interface icon (e.g., the downward arrow icon 434, FIG. 4Q), replaces the fourth user interface with the second user interface.

In some embodiments, the software application is configured to access (636) a hierarchy of content items. The hierarchy of content items includes at least a parent content item (e.g., a story, such as Story 1 in FIG. 5B) and a plurality of child content items (e.g., photos in the story, such as Photo 1 and Photo 2 in FIG. 5B) of the parent content item. The first user interface includes a display of at least a portion of a first child content item of the plurality of child content items without displaying the parent content item or any child content item, other than the first child content item, of the plurality of child content items. For example, the user interface in FIG. 4T includes the photo 410-1 without displaying the full-screen-width image 408-1 or any other photo (e.g., the photo 410-2) in Story 1. The device determines the initial direction of the first pan gesture. The device, in accordance with a determination that the initial direction of the first pan gesture is horizontal, replaces, using the first pan gesture recognizer, the first user interface with a second user interface that includes a display of a second child content item without displaying the parent content item or any child content item, other than the second child content item, of the plurality of child content items (e.g., a next photo is displayed). For example, in accordance with a determination that the initial direction of the pan gesture 423 is horizontal, the device replaces the user interface in FIG. 4T that includes the photo 410-1 with the user interface in FIG. 4U that includes the photo 410-2. In some embodiments, the first child content item ceases to be displayed. On the other hand, in accordance with a determination that the initial direction of the first pan gesture is vertical (e.g., downward), the device replaces, using the second pan gesture recognizer, the first user interface with a third user interface that includes at least a portion of the parent content item (e.g., the story is displayed). For example, in accordance with a determination that the initial direction of the pan gesture in FIG. 4V is downward (rather than horizontal, as in FIG. 4T), the device replaces the user interface in FIG. 4V with a user interface in FIG. 4X that includes at least a portion of the full-screen-width image 408-1 of Story 1. In some embodiments, the first user interface ceases to be displayed. In some embodiments, the third user interface includes at least a portion of the first child content item (e.g., at least a portion of the photo 410-1 in its full or reduced scale is displayed). In some embodiments, the third user interface includes at least a portion of the second child content item (e.g., a portion of the photo 410-2 in its full or reduced scale is displayed).

In some embodiments, while the first pan gesture is detected on the touch-sensitive surface, after determining that the initial direction of the first pan gesture is vertical, the device displays (638) at least a portion of the parent content item (e.g., the full-screen-width image 408-1) overlaid by the first child content item (e.g., the photo 410-1), and moves the first child content item in accordance with the first pan gesture (e.g., the photo 410-1 moves in accordance with the pan gesture in FIGS. 4V-4W). The device determines that the first pan gesture has ceased to be detected on the touch-sensitive surface; and, in response to determining that the first pan gesture has ceased to be detected on the touch-sensitive surface, replaces the first user interface with the third user interface (e.g., the user interface in FIG. 4V is replaced with the user interface in FIG. 4X).

In some embodiments, the software application is configured to access (640) a hierarchy of content items. The hierarchy of content items includes at least first and second content items (e.g., Story 1 and Story 2, FIG. 5B). The first user interface includes a display of at least a portion of a first content item overlaid by a popover view. For example, in FIG. 4Z, a full-screen-width image of Story 2 is overlaid by a comments popover view 436. The device determines the initial direction of the first pan gesture. The device, in accordance with a determination that the initial direction of the first pan gesture is horizontal, replaces, using the first pan gesture recognizer, the first user interface with a display of at least a portion of a second content item without displaying the first content item or the popover view (e.g., a next story is displayed). For example, in accordance with a determination that the initial direction of the pan gesture 429 in FIG. 4Z is horizontal, the device replaces the user interface in FIG. 4Z with the user interface in FIG. 4AA. On the other hand, in accordance with a determination that the initial direction of the first pan gesture is vertical, the device ceases to display, using the second pan gesture recognizer, the popover view. For example, in accordance with a determination that the initial direction of the pan gesture 431 in FIG. 4BB is downward (rather than horizontal, as for gesture 429 in FIG. 4Z), the device dismisses the comments popover over 436 and displays the full-screen-width image 408-2 of Story 2, without displaying the comments popover view 436, in FIG. 4CC.

In some embodiments, the software application is configured to access (642) a hierarchy of content items. The hierarchy of content items includes at least a parent content item (e.g., a section, such as Section 1 in FIG. 5B) and a plurality of child content items (e.g., stories in the section, such as Story 1, Story 2, Story 3, and Story 4 in FIG. 5B) of the parent content item, the plurality of child content items being in a sequence. The first user interface includes a display of a first child content item in the sequence of child content items, without displaying the parent content item. The first pan gesture is detected while the first child content item in the sequence of child content items is displayed. The device determines the initial direction of the first pan gesture. The device, in accordance with a determination that the initial direction of the first pan gesture is downward, displays a representation of the parent content item (e.g., a thumbnail image or a representative image). For example, in accordance with a determination that the initial direction of the pan gesture 415 in FIG. 4L is downward, the device displays the image 404-1 in FIG. 4M. In some embodiments, the first user interface ceases to be displayed. In some embodiments, the display of the representation of the parent content item does not include display of the child content item. In some embodiments, the display of the representation of the parent content item includes a thumbnail image that corresponds to the child content item (e.g., the thumbnail image 406-1 that corresponds to Story 1, FIG. 4N).

Some of the features discussed above with respect to the method 600 are applicable to method 700 in an analogous manner. For brevity, these details are not repeated below.

FIGS. 7A-7D are flow diagrams illustrating a method 700 of navigating in a software application (e.g., a social networking application) via touch gestures in accordance with some embodiments. FIGS. 7A-7D correspond to instructions stored in a computer memory or computer readable storage medium (e.g., memory 206). The method uses pan gestures to navigate in a software application. For example, a user can use various pan gestures to easily move between content items (e.g., stories) in a single content section, between individual stories and multiple stories and a representative image of the content section, and between different content sections. These methods reduce the time spent navigating through a large number of content items to find the desired content, thereby providing a more efficient human-machine interface and reducing power consumption by the electronic device.

The device displays (702) a first user interface of a software application (e.g., the user interface shown in FIGS. 4A and 4C for a social networking application). The software application is configured to access a hierarchy of content items (e.g., the hierarchy in FIG. 5B). The hierarchy of content items includes at least a first parent content item (e.g., Section 1, FIG. 5B) and a plurality of child content items of the first parent content item (e.g., Story 1, Story 2, Story 3, and Story 4, FIG. 5B). The first user interface includes a concurrent display of a first image that represents the first parent content item (e.g., the image 404-1, FIG. 4A or 4C) and a first set of thumbnail images that correspond to two or more child content items of the plurality of child content items of the first parent content item (e.g., thumbnail images 406-1, 406-2, and 406-3, FIG. 4A or 4C).

The device detects (704) a first pan gesture initially at a location, on the touch-sensitive surface, that corresponds to a respective thumbnail image of the first set of thumbnail images (e.g., pan gesture 405, FIG. 4A or pan gesture 407, FIG. 4C).

The device determines (706) an initial direction of the first pan gesture.

The device, in accordance with a determination that the initial direction of the first pan gesture is horizontal (e.g., pan gesture 405, FIG. 4A), replaces (708) a display of the first set of thumbnail images with a display of a second set of thumbnail images that correspond to two or more child content items of the plurality of child content items (e.g., a set of the thumbnail images 406-1, 406-2, and 406-3 in FIG. 4A is replaced with a set of the thumbnail images 406-2, 406-3, and 406-4 in FIG. 4B). The thumbnail images in the first set are distinct from the thumbnail images in the second set.

On the other hand, in accordance with a determination that the initial direction of the first pan gesture is vertical (e.g., upward pan gesture 407 in FIG. 4C, rather than pan gesture 405 in FIG. 4A), the device replaces (710) the first user interface with a second user interface that includes at least a portion of a child content item that corresponds to the respective thumbnail image (e.g., the user interface in FIG. 4C is replaced with the user interface in FIG. 4E).

In some embodiments, the hierarchy of content items includes (712) a second parent content item (e.g., Section 2 in FIG. 5B), distinct from the first parent content item, and a plurality of child content items of the second parent content item (e.g., Story 5, Story 6, and Story 7 in FIG. 5B). The device detects a second pan gesture (e.g., pan gesture 409, FIG. 4F) initially at a location, on the touch-sensitive surface, that corresponds to the first image that represents the first parent content item (e.g., the image 404-1, FIG. 4F). The device determines an initial direction of the second pan gesture. The device, in accordance with a determination that the initial direction of the second pan gesture is horizontal, replaces the first user interface with a third user interface that includes a concurrent display of a second image that represents the second parent content item and a set of thumbnail images that correspond to two or more child content items of the plurality of child content items of the second parent content item (e.g., the user interface in FIG. 4F is replaced with a user interface in FIG. 4G).

In some embodiments, the first image that represents the first parent content item is selected (714) from images in the plurality of child content items of the first parent content item. Similarly, in some embodiments, the second image that represents the second parent content item is selected from images in the plurality of child content items of the second parent content item. For example, in FIG. 4G, the image 404-2 that represents Section 2 is selected from an image in Story 6, which is a child content item of Section 2.

In some embodiments, the hierarchy of content items includes (716) a second parent content item (e.g., Section 2 in FIG. 5B), distinct from the first parent content item, and a plurality of child content items of the second parent content item (e.g., Story 5, Story 6, and Story 7 in FIG. 5B). The device detects a second pan gesture (e.g., pan gesture 409, FIG. 4F or pan gesture 411, FIG. 4H) initially at a location, on the touch-sensitive surface, that corresponds to the first image that represents the first parent content item. The device determines an initial direction of the second pan gesture. The device, in accordance with a determination that the initial direction of the second pan gesture is horizontal (e.g., pan gesture 409, FIG. 4F), replaces the first user interface with a third user interface that includes a concurrent display of a second image that represents the second parent content item and a set of thumbnail images that correspond to two or more child content items of the plurality of child content items of the second parent content item (e.g., the user interface in FIG. 4F is replaced with the user interface in FIG. 4G). On the other hand, in accordance with a determination that the initial direction of the second pan gesture is vertical (e.g., pan gesture 411, FIG. 4H), the device displays a user interface for the software application that includes a search input area (e.g., the user interface in FIG. 4H is replaced with a user interface in FIG. 4I in accordance with a determination that the initial direction of the pan gesture 411 is downward).

In some embodiments, the second user interface (e.g., the user interface shown in FIGS. 4E, 4J, and 4L) includes (718) a display of at least a portion of a first child content item of the plurality of child content items without displaying the first parent content item or any child content item, other than the first child content item, of the plurality of child content items (e.g., at least a portion of the full-screen-width image 408-1 is displayed without the image 404-1 in FIG. 4J). The device detects a second pan gesture (e.g., the pan gesture 413, FIG. 4J or pan gesture 415, FIG. 4L), and determines an initial direction of the second pan gesture. The device, in accordance with a determination that the initial direction of the second pan gesture is horizontal (e.g., pan gesture 413, FIG. 4J), replaces the second user interface with a third user interface that includes a display of at least a portion of a second child content item without displaying the parent content item or any child content item, other than the second child content item, of the plurality of child content items (e.g., the user interface in FIG. 4J is replaced with the user interface in FIG. 4K). On the other hand, in accordance with a determination that the initial direction of the second pan gesture is vertical (e.g., pan gesture 415, FIG. 4L), the device replaces the second user interface with a fourth user interface that includes a concurrent display of an image that represents the first parent content item and a set of thumbnail images that correspond to two or more child content items of the plurality of child content items of the first parent content item (e.g., the user interface in FIG. 4L is replaced with the user interface in FIG. 4O in accordance with the initially downward pan gesture 415 illustrated in FIGS. 4L-4N).

In some embodiments, the set of thumbnail images in the fourth user interface (e.g., FIG. 4O) includes (720) the respective thumbnail image (e.g., the thumbnail image 406-1 that corresponds to the first child content item, Story 1). The device, subsequent to the determination that the initial direction of the second pan gesture is vertical (e.g., pan gesture 415, FIG. 4L), detects a movement, of the second pan gesture across the touch-sensitive surface, that is in a non-vertical direction (e.g., a diagonal movement in pan gesture 415, as shown in FIGS. 4M and 4N). The device, in response to detecting the movement, of the second pan gesture across the touch-sensitive surface, that is in a non-vertical direction, moves the respective thumbnail image in a horizontal direction in accordance with a horizontal movement of the second pan gesture across the touch-sensitive surface (e.g., the thumbnail image 406-1 moves horizontally in accordance with the horizontal component of movement of the pan gesture 415).

In some embodiments, while displaying the third user interface (e.g., the user interface in FIGS. 4K, 4P, and 4R), the device detects (722) a touch input on the second child content item (e.g., a tap gesture 417 in FIG. 4P), and, in response to detecting the touch input on the second child content item, the device replaces the third user interface with a fifth user interface that provides additional information in the second content item (e.g., the user interface in FIG. 4P is replaced with the user interface in FIG. 4Q). While displaying the fifth user interface, the device detects a touch input on an icon (e.g., in FIG. 4Q, a tap gesture on icon 434 or a downward swipe or pan gesture 419 that starts on icon 434); and, in response to detecting the touch input on the icon, the device replaces the fourth user interface with the third user interface (e.g., the user interface in FIG. 4Q is replaced with the user interface in FIG. 4R).

In some embodiments, the device displays (724) a third user interface that includes at least a portion of a first grandchild content of the first parent content item (e.g., the user interface with photo 410-1 in FIG. 4T) without displaying the first parent content item, any child content item of the first parent content item, or any grandchild content item, other than the first grandchild content item, of a plurality of grandchild content items of the first parent content item. The device detects a second pan gesture (e.g., pan gesture 423, FIG. 4T or pan gesture 425, FIG. 4V), and determines an initial direction of the second pan gesture. The device, in accordance with a determination that the initial direction of the second pan gesture is horizontal (e.g., pan gesture 423, FIG. 4T), replaces the third user interface with a fourth user interface that includes a display of a second grandchild content item of the first parent content item without displaying the first parent content item, any child content item of the first parent content item, or any grandchild content item, other than the second grandchild content item, of the plurality of grandchild content items of the first parent content item (e.g., the user interface in FIG. 4T is replaced with the user interface in FIG. 4U). The first grandchild content item and the second grandchild content item are child content items of a same child content item of the first parent content item. On the other hand, in accordance with a determination that the initial direction of the second pan gesture is vertical (e.g., pan gesture 425, FIG. 4V), the device replaces the third user interface with a fifth user interface that includes at least a portion of the child content item (e.g., the user interface in FIG. 4V is replaced with the user interface in FIG. 4X in accordance with the pan gesture 425 illustrated in FIGS. 4V-4X).

In some embodiments, while the second pan gesture is detected on the touch-sensitive surface, after determining that the initial direction of the second pan gesture is vertical (e.g., pan gesture 425, FIG. 4V), the device displays (726) at least a portion of the child content item overlaid by the first grandchild content item, and moves the first grandchild content item in accordance with the second pan gesture. For example, in FIG. 4W, at least a portion of the child content item (e.g., the full-screen-width image 408-1) is displayed after determining that the initial direction of the pan gesture 425 in FIG. 4V is vertical. The portion of the child content item (e.g., the full-screen-width image 408-1) is overlaid with the photo 410-1, and the photo 410-1 is moved in accordance with the pan gesture 425. The device determines that the second pan gesture (e.g., pan gesture 425) has ceased to be detected on the touch-sensitive surface; and, in response to determining that the second pan gesture has ceased to be detected on the touch-sensitive surface, replaces the third user interface with the fifth user interface (e.g., the user interface in FIG. 4X is displayed).

In some embodiments, the hierarchy of content items includes (728) at least a first content item and a second content item (e.g., a full-screen-width image 408-2 in FIG. 4Y and a full-screen-width image 408-1 in FIGS. 4X and 4AA). The device displays a third user interface that includes a display of at least a portion of the first content item overlaid by a popover view (e.g., the full-screen-width image 408-2 is overlaid by a comments popover view 436 in FIGS. 4Z and 4BB). The device detects a second pan gesture (e.g., pan gesture 429, FIG. 4Z or pan gesture 431, FIG. 4BB), and determines an initial direction of the second pan gesture. The device, in accordance with a determination that the initial direction of the second pan gesture is horizontal (e.g., pan gesture 429, FIG. 4Z), replaces the third user interface with a display of at least a portion of a second content item without displaying the first content item or the popover view (e.g., the user interface in FIG. 4Z is replaced with the user interface in FIG. 4AA). On the other hand, in accordance with a determination that the initial direction of the second pan gesture is vertical (e.g., pan gesture 431, FIG. 4BB), the device ceases to display the popover view (e.g., in accordance with the downward pan gesture 431 in FIG. 4BB, the comments popover view 436 is no longer displayed in FIG. 4CC).

It should be noted that some of the operations described above may be performed without performing all of the above-described operations. Examples are described below. Some of the features discussed above with respect to the method 600 and the method 700 are applicable to the following operations in an analogous manner. For brevity, these details are not repeated below.

In some embodiments, a method is performed at an electronic device having a display, a touch-sensitive surface, one or more processors, and memory. The memory stores one or more programs for execution by the one or more processors. The method includes displaying a first user interface of a software application. The software application is configured to access a hierarchy of content items. The hierarchy of content items includes at least a first parent content item and a plurality of child content items of the first parent content item. The first user interface includes a display of at least a portion of a first child content item of the plurality of child content items without displaying the first parent content item or any child content item, other than the first child content item, of the plurality of child content items. The method also includes detecting a first pan gesture and determining an initial direction of the first pan gesture. The method further includes, in accordance with a determination that the initial direction of the first pan gesture is horizontal, replacing the first user interface with a second user interface that includes a display of at least a portion of a second child content item without displaying the parent content item or any child content item, other than the second child content item, of the plurality of child content items. The method further includes, in accordance with a determination that the initial direction of the first pan gesture is vertical, replacing the first user interface with a third user interface that includes a concurrent display of an image that represents the first parent content item and a set of thumbnail images that correspond to two or more child content items of the plurality of child content items of the first parent content item.

In some embodiments, a method is performed at an electronic device having a display, a touch-sensitive surface, one or more processors, and memory. The memory stores one or more programs for execution by the one or more processors. The method includes displaying a first user interface of a software application. The software application is configured to access a hierarchy of content items. The hierarchy of content items includes at least a first parent content item and a plurality of child content items of the first parent content item. The first user interface includes at least a portion of a first grandchild content of the first parent content item without displaying the first parent content item, any child content item of the first parent content item, or any grandchild content item, other than the first grandchild content item, of a plurality of grandchild content items of the first parent content item. The method also includes detecting a first pan gesture and determining an initial direction of the first pan gesture. The method further includes, in accordance with a determination that the initial direction of the first pan gesture is horizontal, replacing the first user interface with a second user interface that includes a display of a second grandchild content item of the first parent content item without displaying the first parent content item, any child content item of the first parent content item, or any grandchild content item, other than the second grandchild content item, of the plurality of grandchild content items of the first parent content item. The first grandchild content item and the second grandchild content item are child content items of a same child content item of the first parent content item. The method further includes, in accordance with a determination that the initial direction of the first pan gesture is vertical, replacing the first user interface with a third user interface that includes at least a portion of the child content item.

In some embodiments, a method is performed at an electronic device having a display, a touch-sensitive surface, one or more processors, and memory. The memory stores one or more programs for execution by the one or more processors. The method includes displaying a first user interface of a software application. The software application is configured to access a hierarchy of content items. The hierarchy of content items includes at least a first content item and a second content item. The first user interface includes a display of at least a portion of the first content item overlaid by a popover view. The method also includes detecting a first pan gesture and determining an initial direction of the first pan gesture. The method further includes, in accordance with a determination that the initial direction of the first pan gesture is horizontal, replacing the first user interface with a display of at least a portion of a second content item without displaying the first content item or the popover view. The method further includes, in accordance with a determination that the initial direction of the second pan gesture is vertical, ceasing to display the popover view.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art so drawings herein do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A non-transitory computer readable storage medium storing one or more programs, the one or more programs comprising instructions, which, when executed by an electronic device with a display, a touch-sensitive surface, and one or more processors, cause the device to:
    display a first user interface of a software application, wherein:
        the software application has a hierarchy of user interfaces,
        the first user interface is associated with at least a first pan gesture recognizer and a second pan gesture recognizer,
        the first pan gesture recognizer is configured to recognize a pan gesture that has an initial direction along a first axis on the touch-sensitive surface in a plurality of predefined axes and/or a first direction on the touch-sensitive surface in a plurality of predefined directions, and
        the second pan gesture recognizer is configured to recognize a pan gesture that has an initial direction along a second axis on the touch-sensitive surface in the plurality of predefined axes and/or a second direction on the touch-sensitive surface distinct from the first direction, in the plurality of predefined directions;
    detect a first pan gesture on the touch-sensitive surface while displaying the first user interface, wherein the first pan gesture has an initial direction across the touch-sensitive surface;
    while detecting the first pan gesture on the touch-sensitive surface, identify, between the first pan gesture recognizer and the second pan gesture recognizer, a pan gesture recognizer that is configured to recognize the first pan gesture based at least on the initial direction of the first pan gesture; and
    process the first pan gesture using the identified pan gesture recognizer.

2. The computer readable storage medium of claim 1, wherein the one or more programs include instructions, which, when executed by the electronic device with the display, the touch-sensitive surface, and the one or more processors, cause the device to:

after identifying the pan gesture recognizer that is configured to recognize the first pan gesture, detect a movement, of the first pan gesture across the touch-sensitive surface, that is perpendicular to the initial direction, wherein processing the first pan gesture includes processing the movement, of the first pan gesture, that is perpendicular to the initial direction using the identified pan gesture recognizer.

3. The computer readable storage medium of claim 1, wherein the first pan gesture recognizer is configured to recognize a pan gesture that has an initial direction along the first axis and the second pan gesture recognizer is configured to recognize a pan gesture that has an initial direction along the second axis, distinct from the first axis.

4. The computer readable storage medium of claim 1, wherein the first pan gesture recognizer is configured to recognize a pan gesture that has an initial direction along the first direction and the second pan gesture recognizer is configured to recognize a pan gesture that has an initial direction along the second direction, distinct from the first direction.

5. The computer readable storage medium of claim 1, wherein the first pan gesture recognizer has a tolerance value, and the one or more programs include instructions, which, when executed by the electronic device with the display, the touch-sensitive surface, and the one or more processors, cause the device to:

determine whether a component of an initial movement of the first pan gesture, the component being in a direction perpendicular to the first axis or the first direction, satisfies one or more predefined criteria that are based on the tolerance value; and, in accordance with determining that the component of the initial movement of the first pan gesture satisfies the one or more predefined criteria that are based on the tolerance value, recognize the first pan gesture with the first pan gesture recognizer.

6. The computer readable storage medium of claim 1, wherein:

the first user interface includes a plurality of views; and
the first pan gesture recognizer and the second pan gesture recognizer are attached to a same view of the plurality of views.

7. The computer readable storage medium of claim 1, wherein:

the first user interface includes a plurality of views; and
the first pan gesture recognizer is attached to a first view of the plurality of views and the second pan gesture recognizer is attached to a second view of the plurality of views, distinct from the first view.

8. An electronic device, comprising:

a display;
a touch-sensitive surface;
one or more processors; and
memory, the memory storing one or more programs that are configured to be executed by the one or more processors, the one or more programs including instructions for:

displaying a first user interface of a software application, wherein:
the software application has a hierarchy of user interfaces,
the first user interface is associated with at least a first pan gesture recognizer and a second pan gesture recognizer, the first pan gesture recognizer is configured to recognize a pan gesture that has an initial direction along a first axis on the touch-sensitive surface in a plurality of predefined axes and/or a first direction on the touch-sensitive surface in a plurality of predefined directions, and the second pan gesture recognizer is configured to recognize a pan gesture that has an initial direction along a second axis on the touch-sensitive surface in the plurality of predefined axes and/or a second direction on the touch-sensitive surface distinct from the first direction, in the plurality of predefined directions;

detecting a first pan gesture on the touch-sensitive surface while displaying the first user interface, wherein the first pan gesture has an initial direction across the touch-sensitive surface;

while detecting the first pan gesture on the touch-sensitive surface, identifying, between the first pan gesture recognizer and the second pan gesture recognizer, a pan gesture recognizer that is configured to recognize the first pan gesture based at least on the initial direction of the first pan gesture; and processing the first pan gesture using the identified pan gesture recognizer.

9. The device of claim 8, wherein the one or more programs include instructions for:

after identifying the pan gesture recognizer that is configured to recognize the first pan gesture, detecting a movement, of the first pan gesture across the touch-sensitive surface, that is perpendicular to the initial direction, wherein processing the first pan gesture includes processing the movement, of the first pan gesture, that is perpendicular to the initial direction using the identified pan gesture recognizer.

10. The device of claim 8, wherein the first pan gesture recognizer is configured to recognize a pan gesture that has an initial direction along the first axis and the second pan gesture recognizer is configured to recognize a pan gesture that has an initial direction along the second axis, distinct from the first axis.

11. The device of claim 8, wherein the first pan gesture recognizer is configured to recognize a pan gesture that has an initial direction along the first direction and the second pan gesture recognizer is configured to recognize a pan gesture that has an initial direction along the second direction, distinct from the first direction.

12. The device of claim 8, wherein the first pan gesture recognizer has a tolerance value, and the one or more programs include instructions for:

determining whether a component of an initial movement of the first pan gesture, the component being in a direction perpendicular to the first axis or the first direction, satisfies one or more predefined criteria that are based on the tolerance value; and, in accordance with determining that the component of the initial movement of the first pan gesture satisfies the one or more predefined criteria that are based on the tolerance value, recognizing the first pan gesture with the first pan gesture recognizer.

13. The device of claim 8, wherein:

the first user interface includes a plurality of views; and
the first pan gesture recognizer and the second pan gesture recognizer are attached to a same view of the plurality of views.

14. The device of claim 8, wherein:

the first user interface includes a plurality of views; and the first pan gesture recognizer is attached to a first view of the plurality of views and the second pan gesture recognizer is attached to a second view of the plurality of views, distinct from the first view.

15. A method, comprising:

at an electronic device having a display, a touch-sensitive surface, one or more processors, and memory, the memory storing one or more programs for execution by the one or more processors:

displaying a first user interface of a software application, wherein:

the software application has a hierarchy of user interfaces, the first user interface is associated with at least a first pan gesture recognizer and a second pan gesture recognizer, the first pan gesture recognizer is configured to recognize a pan gesture that has an initial direction along a first axis on the touch-sensitive surface in a plurality of predefined axes and/or a first direction on the touch-sensitive surface in a plurality of predefined directions, and the second pan gesture recognizer is configured to recognize a pan gesture that has an initial direction along a second axis on the touch-sensitive surface in the plurality of predefined axes and/or a second direction on the touch-sensitive surface distinct from the first direction, in the plurality of predefined directions;

detecting a first pan gesture on the touch-sensitive surface while displaying the first user interface, wherein the first pan gesture has an initial direction across the touch-sensitive surface;

while detecting the first pan gesture on the touch-sensitive surface, identifying, between the first pan gesture recognizer and the second pan gesture recognizer, a pan gesture recognizer that is configured to recognize the first pan gesture based at least on the initial direction of the first pan gesture; and processing the first pan gesture using the identified pan gesture recognizer.

16. The method of claim 15, including:

after identifying the pan gesture recognizer that is configured to recognize the first pan gesture, detecting a movement, of the first pan gesture across the touch-sensitive surface, that is perpendicular to the initial direction, wherein processing the first pan gesture includes processing the movement, of the first pan gesture, that is perpendicular to the initial direction using the identified pan gesture recognizer.

17. The method of claim 15, wherein the first pan gesture recognizer is configured to recognize a pan gesture that has an initial direction along the first axis and the second pan gesture recognizer is configured to recognize a pan gesture that has an initial direction along the second axis, distinct from the first axis.

18. The method of claim 15, wherein the first pan gesture recognizer is configured to recognize a pan gesture that has an initial direction along the first direction and the second pan gesture recognizer is configured to recognize a pan gesture that has an initial direction along the second direction, distinct from the first direction.

19. The method of claim 15, wherein the first pan gesture recognizer has a tolerance value, and the method includes:

determining whether a component of an initial movement of the first pan gesture, the component being in a direction perpendicular to the first axis or the first direction, satisfies one or more predefined criteria that are based on the tolerance value; and, in accordance with determining that the component of the initial movement of the first pan gesture satisfies the one or more predefined criteria that are based on the tolerance value, recognizing the first pan gesture with the first pan gesture recognizer.

20. The method of claim 15, wherein:

the first user interface includes a plurality of views; and the first pan gesture recognizer and the second pan gesture recognizer are attached to a same view of the plurality of views.

* * * * *